(12) United States Patent
Osbak

(10) Patent No.: US 11,873,646 B2
(45) Date of Patent: Jan. 16, 2024

(54) INTERLOCKABLE MODULAR FLOOR TILE AND METHOD OF ASSEMBLING SAME

(71) Applicant: Gordon A. Osbak, Caley (CA)

(72) Inventor: Gordon A. Osbak, Caley (CA)

( * ) Notice: Subject to any disclaimer, the term of this patent is extended or adjusted under 35 U.S.C. 154(b) by 31 days.

(21) Appl. No.: 17/335,465

(22) Filed: Jun. 1, 2021

(65) Prior Publication Data
US 2021/0372141 A1 Dec. 2, 2021

Related U.S. Application Data

(60) Provisional application No. 63/032,719, filed on May 31, 2020.

(51) Int. Cl.
*E04F 15/02* (2006.01)

(52) U.S. Cl.
CPC ............ *E04F 15/02038* (2013.01); *E04F 2201/0184* (2013.01); *E04F 2201/021* (2013.01); *E04F 2201/0523* (2013.01)

(58) Field of Classification Search
CPC ........... E04F 15/02038; E04F 15/087; E04F 2201/0184; E04F 2201/021; E04F 2201/0523; E04C 2/38
See application file for complete search history.

(56) References Cited

U.S. PATENT DOCUMENTS

| | | |
|---|---|---|
| 2,142,305 A | 1/1939 | Davis |
| 4,807,412 A * | 2/1989 | Frederiksen .......... E04F 15/105 52/180 |
| 5,616,389 A * | 4/1997 | Blatz ................. E04F 15/105 428/44 |
| 6,684,592 B2 | 2/2004 | Martin |
| 8,242,257 B2 | 8/2012 | Beigelman et al. |
| 8,424,257 B2 * | 4/2013 | Jenkins ............ E04F 15/225 52/180 |

(Continued)

FOREIGN PATENT DOCUMENTS

CN 211850535 U 11/2020

OTHER PUBLICATIONS

Notification of Transmittal of the International Search Report and the Written Opinion of the International Searching Authority in corresponding PCT Application No. PCT/CA2021/050735, dated Aug. 16, 2021.

(Continued)

*Primary Examiner* — Gisele D Ford
(74) *Attorney, Agent, or Firm* — Harness, Dickey & Pierce, P.L.C.; Stephen T. Olson

(57) ABSTRACT

A modular floor tile has a first side and a second side opposite to the first side. The first side has a first male locking structure with a male locking end. The second side has a female locking structure with a locking receptacle, which has a receiving groove, a locking notch vertically adjacent the receiving groove, and a female locking end adjacent the locking notch, such that the male locking end of a first one of the floor tile is insertable into the receiving groove of a second one of the floor tile, and vertically movable from the receiving groove into the locking notch to engage with the female locking end of the second one of the floor tile, thereby engaging the first male locking structure of the first one of the floor tile with the female locking structure of the second one of the floor tile.

39 Claims, 40 Drawing Sheets

(56) References Cited

U.S. PATENT DOCUMENTS

| | | |
|---|---|---|
| 9,187,910 B2 | 11/2015 | Tortorella et al. |
| 9,771,725 B2 | 9/2017 | Matchung |
| 2009/0282769 A1 | 11/2009 | Moller, Jr. |
| 2010/0275541 A1 | 11/2010 | Prinz |
| 2011/0107706 A1 | 5/2011 | Fleishman |
| 2012/0324816 A1* | 12/2012 | Huang ............... E04B 5/02 52/311.2 |
| 2015/0107177 A1* | 4/2015 | Khongbantabam ............... E04F 13/0894 52/311.2 |
| 2017/0326833 A1* | 11/2017 | Neill ............... B29C 65/08 |
| 2019/0119863 A1 | 4/2019 | Penland, Jr. et al. |
| 2022/0178141 A1* | 6/2022 | Löfholm ............... F24D 13/024 |

OTHER PUBLICATIONS

International Preliminary Report on Patentability for corresponding PCT Application No. PCT/CA2021/050735 dated Dec. 6, 2022.

* cited by examiner

INTERLOCKABLE MODULAR FLOOR TILE AND METHOD OF ASSEMBLING SAME

CROSS-REFERENCE TO RELATED APPLICATIONS

This application claims the benefit of U.S. Provisional Patent Application Ser. No. 63/032,719, filed May 31, 2020, the content of which is incorporated herein by reference in its entirety.

FIELD OF THE DISCLOSURE

The present invention relates generally to a modular floor structure, and in particular to a floor framing structure using interlocked components for preventing disassembling under external forces such as earthquakes and a method of assembling same.

BACKGROUND OF THE INVENTION

Modular floor titles or panels are known. Generally, modular floor tiles are used for forming a floor in an indoor site such as a residential or business room or an outdoor site such as a yard for decorative purposes and/or for providing a comfort experience for people moving or staying thereon. Modular floor tiles are also used for quickly forming a floor in a site such as in a shelter built for responding to an emergency event. Such a site may be a temporary site or permanent site, and may be a movable site or a fixed site.

Various types of modular floor tiles are available. For example, interlockable floor tiles generally comprise mating edges and may be coupled to each other by engaging corresponding mating edges thereof to form a floor generally without using any fastening means such as glue, nails, screws, bolts, and/or the like. Depending on the implementation and/or use scenario, such as floor may be a "floating" floor movable with a delimiting boundary for adapting to e.g., heat-caused expansion and contraction, or may be fixed in the site by fastening a plurality of mounting points of the floor to a plurality of mounting structures. The mounting points of the floor are usually of a small number and generally distributed about the perimeter thereof.

U.S. Pat. No. 9,771,725 to Matchung teaches a first floor panel that is connectable to a second floor panel in an array having a contiguous channel for retainably housing a cable. The array includes repeating units, each including one or more floor panels. The contiguous channel is formed through, between or through and between respective units. The first floor panel includes a body having a generally planar top surface, a bottom surface defining a bottom plane, and a first side. The first side includes an upper cable-retaining lip and a lower interlocking support. The interlocking support includes an interlocking support that is shaped to interlock with a corresponding side of the second floor panel to form a channel segment between the first side and the corresponding side of the second floor panel. The channel segment is adapted to retainably house the cable, spaced apart from the bottom plane. A modular flooring system is also provided involving a plurality of interconnectable floor panels.

US Patent Application Publication No. 2009/0282769 to Moller teaches floor tiles for forming modular floors. The floor tiles may include a locking system that allows adjacent tiles to interlock, while also permitting a predetermined amount of lateral sliding relative to one another. The modular tiles may be injection molded, and a minor change in the mold facilitates variation to the amount of lateral slide allowed between interlocked tiles. The floor tiles may also provide three layers of traction, providing more sure footing than previous flooring systems. In addition, the floor tiles may comprise a two-tier suspension system that yields a flex or spring-like effect.

US Patent Application Publication No. 2010/0275541 to Prinz teaches a tile for covering an area and which interlocks with an adjacent tile. The tile includes a main body having a top surface and a bottom surface disposed opposite the top surface. The main body has at least a first lateral side and a second lateral side. The tile includes at least one male connector situated on at least one of the first lateral side and the second lateral side of the main body and extending outwardly therefrom. The tile further includes at least one female receptacle situated on at least one of the first lateral side and the second lateral side of the main body and extending outwardly therefrom. The male connector of the tile is engageable with a female receptacle of an adjacent tile so that the tile may interlock with the adjacent tile.

US Patent Application Publication No. 2011/0107706 to Fleishman teaches a system of interlocking building blocks which includes one or more building blocks having a generally right triangular planform, a generally rectangular elevation form, and a periphery generally defined by respective generally rectangular side panels. Each building block has alternating male and female fastener elements arrayed generally around the periphery. The male fastener elements on opposed edges of the same generally rectangular side panel are offset generally diagonally from one another. Each male fastener element is aligned generally normally with a female fastener element on an opposed edge of the same generally rectangular side panel. The building blocks may be formed by folding single flat sheets, and may be made from cardboard, plastic, metal or other conventional materials. Each building block may be coated or filled with structurally reinforcing or insulative material. Two interlocked building blocks may be geometrically distinctive in a manner which optimizes the system for simplified and efficient construction of walled and roofed structures.

There is always a need for modular tiles with improved interlocking structures for assembling a floor in various conditions with reduced assembling time and improved engagement structure for preventing accidental disassembly and/or disconnection due to applied external forces such as by earthquakes, bomb blasts, and the like.

SUMMARY OF THE INVENTION

According to one aspect of this disclosure, there is provided a coupling system (100) for coupling a plurality of modular floor tiles (102). The coupling system (100) comprises: a male locking structure (142C1, 142D1, 732) having a male locking end (236, 376, 736) extending outwardly from a first side of a first floor tile (102-1) of the plurality of modular floor tiles (102); and a female locking structure (142A1, 142B1, 700) on a second side of a second floor tile (102-2) of the plurality of modular floor tiles (102), the female locking structure (142A1, 142B1, 700) comprising a locking receptacle (172, 272, 706), the locking receptacle (172, 272, 706) comprising a receiving groove (174, 274, 710), a locking notch (178, 278, 712) vertically adjacent the receiving groove (174, 274, 710) and in communication therewith, and a female locking end (180, 280, 713) adjacent the locking notch (178, 278, 712).

The male locking end (236, 376, 736) of the male locking structure (142C1, 142D1, 732) of the first floor tile (102-1)

is insertable into the receiving groove (174, 274, 710) of the locking receptacle (172, 272, 706) of the second modular floor tile (102-2), vertically movable from the receiving groove (174, 274, 710) into the locking notch (178, 278, 712) of the locking receptacle (172, 272, 706) of the second floor tile (102-2) to engage with the female locking end (180, 280, 713) of the locking receptacle (172, 272, 706) of the second floor tile (102-2), thereby engaging the male locking structure (142C1, 142D1, 732) of the first floor tile (102-1) with the female locking structure (142A1, 142B1, 700) of the second floor tile (102-2).

In some embodiments, the female locking structure (142A1, 142B1, 700) comprises a first U-shape bracket (162, 262) having two legs ((168A, 268A) and (168B, 268B)) thereof coupled to the second side of the second floor tile (102-2); and the locking receptacle (172, 272, 706) of the female locking structure (142A1, 142B1, 700) is formed on the first U-shape bracket (162, 262).

In some embodiments, the male locking structure (142C1, 142D1, 732) comprises a second U-shape bracket (222, 362) and a locking tongue (233, 373, 734) coupled to the male locking end (236, 376, 736) of the male locking structure (142C1, 142D1, 732); the second U-shape bracket (222, 362) comprises two legs ((226A, 364A) and (226B, 364B)) coupled to the first side of the first floor tile (102-1); the locking tongue (233, 373, 734) is coupled to the first side of the first floor tile (102-1) at a position between the two legs ((226A, 364A) and (226B, 364B)) of the second U-shape bracket (222, 362) and extends out of a body (228, 366) of the second U-shape bracket (222, 362) such that the second U-shape bracket (222, 362) provides support to the locking tongue (233, 373, 734); and a distal end of the locking tongue (233, 373, 734) outside the body (228, 366) of the second U-shape bracket (222, 362) forms the male locking end (236, 376, 736).

In some embodiments, the male locking structure (142C1, 142D1) comprises a hook (234, 374) having a tip (236, 376), the tip (236, 376) forming the male locking end (236, 376) of the male locking structure (142C1, 142D1) for engaging the female locking end (180, 280) of the locking receptacle (172, 272).

In some embodiments, the hook (234, 374) is a plate-form hook.

In some embodiments, the male locking structure (732) comprises a locking tongue (734) and a vertically expanded male locking end (736) coupled to a distal end of the locking tongue (734), the vertically expanded male locking end (736) forming the male locking end of the male locking structure (732) for engaging the female locking end (713) of the locking receptacle (706).

In some embodiments, the vertically expanded male locking end (736) of the male locking structure (732) comprises a rod (736) with a diameter or thickness greater than the thickness of the locking tongue (734) and having a circular or chamfered side surface coupled to the locking tongue (734), thereby forming one or more circular or chamfered shoulders between the locking tongue (734) and the vertically expanded male locking end (736) of the male locking structure (732).

In some embodiments, the rod (736) is a cylindrical rod.

In some embodiments, the coupling system further comprises a male securing structure (408, 752) having a securing end (410, 756) extending outwardly from a corner of a third floor tile (102-3) of the plurality of modular floor tiles (102).

When the male locking end (236, 376, 736) of the male locking structure (142C1, 142D1, 732) of the first floor tile (102-1) engaging the female locking end (180, 280, 713) of the locking receptacle (172, 272, 706) of the second floor tile (102-2), the securing end (410, 756) of the male securing structure (408, 752) is insertable to a securing position vertically overlapping the male locking end (236, 376, 736) of the male locking structure (142C1, 142D1, 732) of the first floor tile (102-1) and preventing the male locking end (236, 376, 736) of the male locking structure (142C1, 142D1, 732) of the first floor tile (102-1) from vertically moving from the locking notch (178, 278, 712) of the locking receptacle (172, 272, 706) of the second floor tile (102-2) into the receiving groove (174, 274, 710) of the locking receptacle (172, 272, 706) of the second floor tile (102-2) and disengaging the male locking structure (142C1, 142D1, 732) of the first floor tile (102-1) with the female locking structure (142A1, 142B1, 700) of the second floor tile (102-2).

In some embodiments, the securing end (410, 756) of the male securing structure (408, 752), when at the securing position, engages the male locking end (236, 376, 736) of the male locking structure (142C1, 142D1, 732) of the first floor tile (102-1).

In some embodiments, the coupling system further comprises a female securing structure (282, 724) having a securing receptacle (282, 724) on the second side of the second floor tile (102-2) adjacent the female locking structure (142B1, 700); the securing end (410, 756) of the male securing structure (408, 752) is insertable through the securing receptacle (282, 724) to the securing position.

In some embodiments, the securing position is in the receiving groove (274, 710) of the locking receptacle (272, 706) of the second floor tile (102-2).

In some embodiments, the male locking end (236, 376, 736) of the male locking structure (142C1, 142D1, 732) of the first floor tile (102-1) is movable in the locking receptacle (172, 272, 706) of the second floor tile (102-2) between a disengaged position disengaging with the female locking end (180, 280, 713) of the locking receptacle (172, 272, 706) of the second floor tile (102-2) and an engaged position within the locking notch (178, 278, 712) and engaging with the female locking end (180, 280, 713) of the locking receptacle (172, 272, 706) of the second floor tile (102-2).

In some embodiments, the coupling system further comprises: a first delimiting structure on the first side of the first floor tile (102-1) at a distance to the male locking structure (142C1, 142D1, 732); and a second delimiting structure on the second side of the second floor tile (102-1) at a distance to the female locking structure (142A1, 142B1, 700); the first and second delimiting structures are a male delimiting structure (142C2, 142D2) and a first female delimiting structure (142A2, 142B2, 486), or are the first female delimiting structure (142A2, 142B2, 486) and the male delimiting structure (142C2, 142D2); the male delimiting structure (142C2, 142D2) comprises a delimiting tongue (408C, 408D, 502); the first female delimiting structure (142A2, 142B2, 486) comprises a delimiting receptacle (220, 346, 500); the delimiting tongue (408C, 408D, 502) of the male delimiting structure (142C2, 142D2) is at a disengaged position disengaging with the delimiting receptacle (220, 346, 500) of the first female delimiting structure (142A2, 142B2, 486) when the male locking end (236, 376, 736) of the male locking structure (142C1, 142D1, 732) is at the disengaged position thereof; and the delimiting tongue (408C, 408D, 502) of the male delimiting structure (142C2, 142D2) is at an engaged position engaging with the delimiting receptacle (220, 346, 500) of the first female delimiting structure (142A2, 142B2, 486) when the male locking end (236, 376, 736) of the male locking structure (142C1, 142D1, 732) is at the engaged position thereof.

In some embodiments, the first female delimiting structure (142A2) further comprises a horizontal guide (216) adjacent the delimiting receptacle (220) for supporting the delimiting tongue (408C) of the male delimiting structure (142C2) when the delimiting tongue (408C) of the male delimiting structure (142C2) is at the disengaged position thereof.

In some embodiments, the delimiting tongue (502) of the male delimiting structure (142D2) comprises a male locking end for engaging a corresponding female locking end of the delimiting receptacle (500) of the first female delimiting structure (142B2).

In some embodiments, the first female delimiting structure (142A2, 142B2, 486) comprises the securing end (410, 756) of the male securing structure (408, 752).

In some embodiments, the coupling system further comprises: a first bolting structure (602) extending outwardly from the first side of the first floor tile (102-1), the first bolting structure (602) comprising a first bolting hole; and a second bolting structure (604) extending outwardly from the second side of the second floor tile (102-2), the second bolting structure (604) comprising a second bolting hole; the first bolting hole overlaps the second bolting hole for receiving a bolt therethrough when the first side of the first floor tile (102-1) is adjacent the second side of the second floor tile (102-2) and engages therewith.

According to one aspect of this disclosure, there is provided a modular floor tile (102) comprising: a first side; and a second side opposite to the first side; the first side comprises a first male locking structure (142D1, 732), the first male locking structure (142D1, 732) comprising a male locking end (236, 736) extending outwardly from the first side; the second side comprises a female locking structure (142B1, 700), the female locking structure (142B1, 700) comprising a locking receptacle (272, 706); and the locking receptacle (272, 706) comprises a receiving groove (274, 710), a locking notch (278, 712) vertically adjacent the receiving groove (274, 710) and in communication therewith, and a female locking end (280, 713) adjacent the locking notch (278, 712), such that the male locking end (236, 736) of the first male locking structure (142D1, 732) of a first one of the modular floor tile (102-1) is: insertable into the receiving groove (274, 710) of the locking receptacle (272, 706) of a second one of the modular floor tile (102-2), and vertically movable from the receiving groove (274, 710) into the locking notch (278, 712) of the locking receptacle (272, 706) of the second one of the modular floor tile (102-2) to engage with the female locking end (280, 713) of the locking receptacle (272, 706) of the second one of the modular floor tile (102-2), thereby engaging the first male locking structure (142D1, 732) of the first one of the modular floor tile (102-1) with the female locking structure (142B1, 700) of the second one of the modular floor tile (102-2).

In some embodiments, the female locking structure (142B1, 700) comprises a first U-shape bracket (262) having two legs (268A and 268B) thereof coupled to the second side of the second floor tile (102-2); and the locking receptacle (272, 706) of the female locking structure (142B1, 700) is formed on the first U-shape bracket (262).

In some embodiments, the first male locking structure (142D1, 732) comprises a second U-shape bracket (222) and a locking tongue (233, 734) coupled to the male locking end (236, 736) of the first male locking structure (142D1, 732); the second U-shape bracket (222) comprises two legs (226A and 226B) coupled to the first side of the first floor tile (102-1); the locking tongue (233, 734) is coupled to the first side of the first floor tile (102-1) at a position between the two legs (226A and 226B) of the second U-shape bracket (222) and extends out of a body (228) of the second U-shape bracket (222) such that the second U-shape bracket (222) provides support to the locking tongue (233, 734); and a distal end of the locking tongue (233, 734) outside the body (228) of the second U-shape bracket (222) forms the male locking end (236, 736).

In some embodiments, the first male locking structure (142D1) comprises a hook (234) having a tip (236), the tip (236) forming the male locking end (236) of the first male locking structure (142D1) for engaging the female locking end (280) of the locking receptacle (272).

In some embodiments, the hook (234) is a plate-form hook.

In some embodiments, the first male locking structure (732) comprises a locking tongue (734) and a vertically expanded male locking end (736) coupled to a distal end of the locking tongue (734), the vertically expanded male locking end (736) forming the male locking end of the first male locking structure (732) for engaging the female locking end (713) of the locking receptacle (706).

In some embodiments, the vertically expanded male locking end (736) of the first male locking structure (732) comprises a rod (736) with a diameter or thickness greater than the thickness of the locking tongue (734) and having a circular or chamfered side surface coupled to the locking tongue (734), thereby forming one or more circular or chamfered shoulders between the locking tongue (734) and the vertically expanded male locking end (736) of the first male locking structure (732).

In some embodiments, the rod (736) is a cylindrical rod.

In some embodiments, the modular floor tile further comprises: a male securing structure (408, 752) having a securing end (410, 756) extending outwardly from a corner of the first side and a third side extending between the first and second sides thereof such that when the male locking end (236, 736) of the first male locking structure (142D1, 732) of the first one of the modular floor tile (102-1) engaging the female locking end (280, 713) of the locking receptacle (272, 706) of the second one of the modular floor tile (102-2), the securing end (410, 756) of the male securing structure (408, 752) of a third one of the modular floor tile (102-3) is insertable to a securing position vertically overlapping the male locking end (236, 736) of the first male locking structure (142D1, 732) of the first one of the modular floor tile (102-1) and preventing the male locking end (236, 736) of the first male locking structure (142D1, 732) of the first one of the modular floor tile (102-1) from vertically moving from the locking notch (278, 712) of the locking receptacle (272, 706) of the second one of the modular floor tile (102-2) into the receiving groove (274, 710) of the locking receptacle (272, 706) of the second one of the modular floor tile (102-2) and disengaging the first male locking structure (142D1, 732) of the first floor tile (102-1) with the female locking structure (142B1, 700) of the second one of the modular floor tile (102-2).

In some embodiments, the securing end (410, 756) of the male securing structure (408, 752), when at the securing position, engages the male locking end (236, 736) of the first male locking structure (142D1, 732) of the first floor tile (102-1).

In some embodiments, the modular floor tile further comprises a female securing structure (282, 724) having a securing receptacle (282, 724) on the second side adjacent the female locking structure (142B1, 700) such that the securing end (410, 756) of the male securing structure (408, 752) of the third one of the modular floor tile (102-3) is insertable through the securing receptacle (282, 724) of the second one of the modular floor tile (102-2) to the securing position.

In some embodiments, the securing position is in the receiving groove (274, 710) of the locking receptacle (272, 706).

In some embodiments, the male locking end (236, 736) of the first male locking structure (142D1, 732) and the locking receptacle (172, 272, 706) are configured such that the male locking end (236, 736) of the first male locking structure (142D1, 732) of the first one of the modular floor tile (102-1) is movable in the locking receptacle (172, 272, 706) of the second one of the modular floor tile (102-2) between a disengaged position disengaging with the female locking end (180, 280, 713) of the locking receptacle (172, 272, 706) of the second one of the modular floor tile (102-2) and an engaged position within the locking notch (178, 278, 712) engaging with the female locking end (180, 280, 713) of the locking receptacle (172, 272, 706) of the second one of the modular floor tile (102-2).

In some embodiments, the modular floor tile further comprises: a first male delimiting structure (142D2) on the first side at a distance to the first male locking structure (142D1, 732); and a first female delimiting structure (142B2, 486) on the second side at a distance to the female locking structure (142B1, 700); the first male delimiting structure (142D2) comprises a delimiting tongue (408D, 502); the first female delimiting structure (142B2, 486) comprises a delimiting receptacle (346, 500); the first male delimiting structure (142D2) and the first female delimiting structure (142B2, 486) are configured such that the delimiting tongue (408D, 502) of the first male delimiting structure (142D2) of the first one of the modular floor tile (102-1) is at a disengaged position disengaging with the delimiting receptacle (346, 500) of the first female delimiting structure (142B2, 486) of the second one of the modular floor tile (102-2) when the male locking end (236, 736) of the first male locking structure (142D1, 732) is at the disengaged position thereof; and the delimiting tongue (408D, 502) of the first male delimiting structure (142D2) of the first one of the modular floor tile (102-1) is at an engaged position engaging with the delimiting receptacle (346, 500) of the first female delimiting structure (142B2, 486) of the second one of the modular floor tile (102-2) when the male locking end (236, 736) of the first male locking structure (142D1, 732) is at the engaged position thereof.

In some embodiments, the modular floor tile further comprises: a second male locking structure (142C1, 732) on the third side at a distance to the first male delimiting structure (142D2); and a second female locking structure (142A1) on a fourth side opposite to the third side and at a distance to the first male locking structure (142D1, 732) such that the second male locking structure (142C1, 732) of the first one of the modular floor tile (102-1) and the second female locking structure (142A1) of the third one of the modular floor tile (102-3) are engageable for engaging the first one of the modular floor tile (102-1) with the third one of the modular floor tile (102-3).

In some embodiments, the modular floor tile further comprises: a second male delimiting structure (142C2) on the third side adjacent the first male delimiting structure (142D2), the second male delimiting structure (142C2) comprising a delimiting tongue (408C); and a second female delimiting structure (142A2) on the fourth side adjacent the first male locking structure (142D1, 732) such that the second male delimiting structure (142C2) of the first one of the modular floor tile (102-1) and the second female delimiting structure (142A2) of the third one of the modular floor tile (102-3) are engageable for vertically aligning the first one of the modular floor tile (102-1) with the third one of the modular floor tile (102-3).

In some embodiments, the second female delimiting structure (142A2) further comprises a horizontal guide (216) adjacent the delimiting receptacle (220) such that the horizontal guide (216) of the first one of the modular floor tile (102-1) provides support to the delimiting tongue (408C) of the second male delimiting structure (142C2) of the third one of the modular floor tile (102-3) when the delimiting tongue (408C) of the second male delimiting structure (142C2) of the third one of the modular floor tile (102-3) is at a disengaged position.

In some embodiments, the delimiting tongue (502) of the first male delimiting structure (142D2) comprises a male locking end, and the delimiting receptacle (500) of the first female delimiting structure (142B2) comprises a corresponding female locking end, such that the male locking end of the delimiting tongue (502) of the first male delimiting structure (142D2) of the first one of the modular floor tile (102-1) is engageable with the corresponding female locking end of the delimiting receptacle (500) of the first female delimiting structure (142B2) of the second one of the modular floor tile (102-1).

In some embodiments, the first female delimiting structure (142B2, 486) comprises the securing end (410, 756) of the male securing structure (408, 752).

In some embodiments, the modular floor tile further comprises: a first bolting structure (602) extending outwardly from the first side, the first bolting structure (602) comprising a first bolting hole; and a second bolting structure (604) extending outwardly from the second side, the second bolting structure (604) comprising a second bolting hole, such that the first bolting hole of the first one of the modular floor tile (102-1) overlaps the second bolting hole of the second one of the modular floor tile (102-2) for receiving a bolt therethrough when the first side of the first one of the modular floor tile (102-1) is adjacent the second side of the second one of the modular floor tile (102-2) and engages therewith.

BRIEF DESCRIPTION OF THE DRAWINGS

FIGS. 28A to 28D show a process of engaging a hook of a first floor tile with a locking receptacle of a second floor tile, wherein FIG. 28A shows that the hook of a first floor tile is positioned outside the locking receptacle of a second floor tile and align with the receiving groove of the second floor tile, FIG. 28B shows that the first floor tile and thus the hook thereof move towards the second floor tile, FIG. 28C shows that the first floor tile and thus the hook thereof then move forward to position the male locking end of the hook of the first floor tile behind the female locking end of the locking receptacle of the second floor tile, and FIG. 28D shows the hook of the first floor tile engages with the locking receptacle of the second floor tile;

FIGS. 29A to 29F show a process of assembling a floor tile shown in FIG. 3 to a partially assembled floor, wherein FIG. 29A shows a floor tile 102-3 moves toward three assembled floor tiles 102-1, 102-2, and 102-4, FIG. 29B shows engaging the floor tile 102-3 with the floor tiles 102-1 and 102-4, FIG. 29C is a side view of the floor tiles shown in FIG. 29B viewed from a viewing angle indicated by the arrow 443, FIG. 29D is a side view of the floor tiles shown in FIG. 29B viewed from a viewing angle indicated by the arrow 445, FIG. 29E is a schematic plan view of the assembled floor tiles 102-1 to 102-4, and FIG. 29F shows an enlarged portion D of FIG. 29E;

DETAILED DESCRIPTION OF SOME PREFERRED EMBODIMENTS OF THE INVENTION

Figure 1:
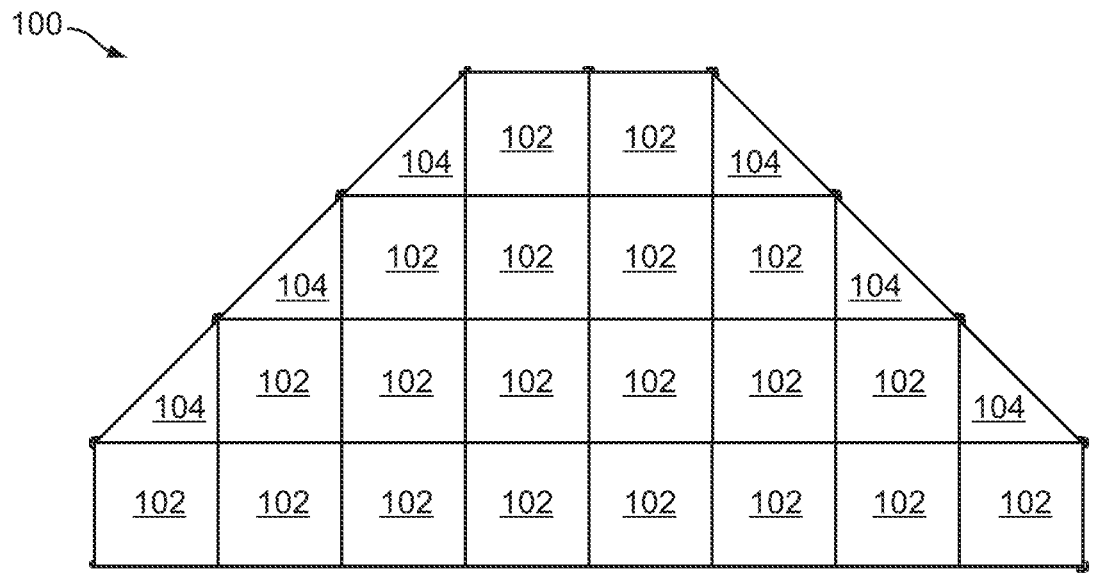
FIG. 1 is a plan view of a portion of a floor formed by a plurality of interlocking modular floor tiles, according to some embodiments of this disclosure, each modular floor tile comprising a panel component coupled to a frame structure thereunder.

Turning now to FIGS. 1 to 10, a portion of a floor in some embodiments of this disclosure is shown and is generally identified using reference numeral 100. The floor 100 is in a non-rectangular polygonal shape and is formed by a plurality of interlockable modular floor tiles 102 and 104. In these embodiments, the floor tiles 102 are rectangular-shape tiles for forming the majority of the floor 102 and the floor tiles 104 are triangular-shape tiles for forming some edges of the floor 102 as needed.

Figure 2:
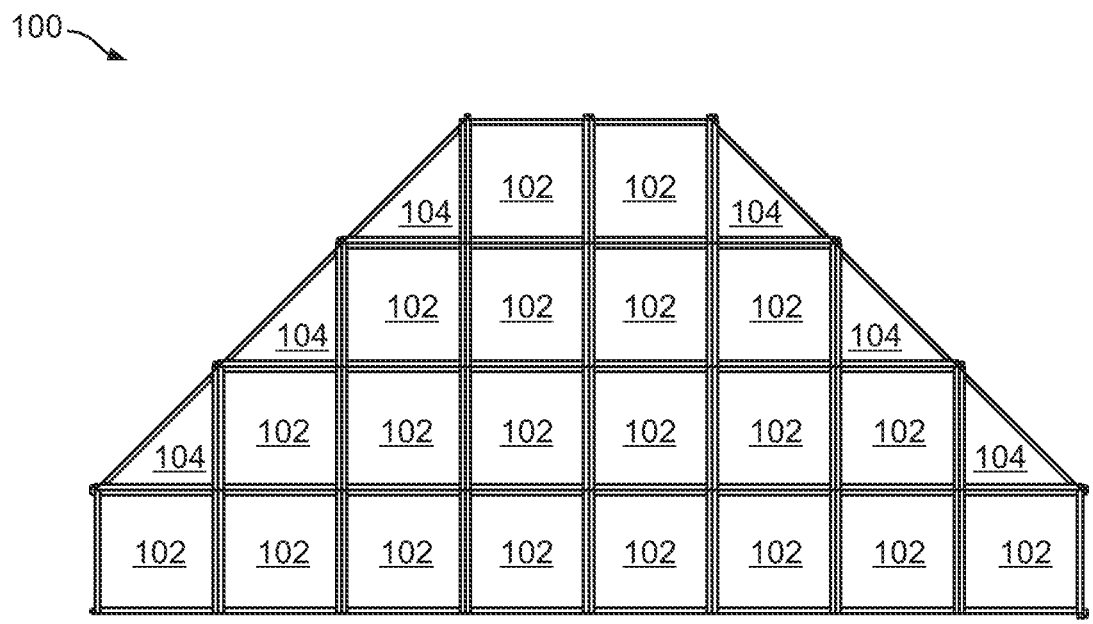
FIG. 2 is a plan view of the floor shown in FIG. 1 with omission of the panel component for showing the frame structure thereunder.

In these embodiments, each floor tile 102, 104 comprises a panel component coupled to a frame structure thereunder. FIG. 2 shows the portion of the floor 100 with the panel component omitted for better illustrating the frame structure.

Figure 3:
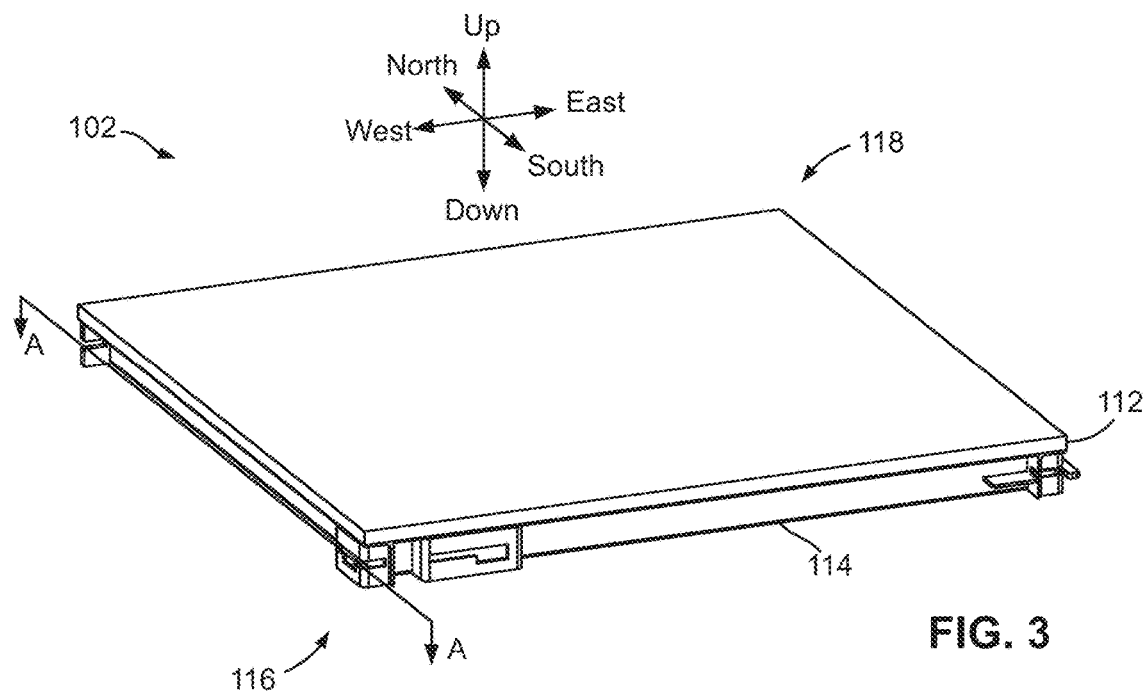
FIG. 3 is a perspective view of one rectangular floor tile of the rectangular floor tiles comprising the floor shown in FIG. 1.

FIG. 3 is a perspective view of a rectangular floor tile 102. As shown, the rectangular floor tile 102 comprises a flat floor panel component 112 coupled to a frame structure 114 thereunder via suitable fastening means such as glue, nails, screws, staples, bolts, and/or the like. The floor panel component 112 may be made of a suitable material such as wood, plastic, metal, and/or the like. Depending on the implementation, the floor panel component 112 may comprise a single layer or may comprise a plurality of coupled layers of same or different materials (e.g., an engineered floor panel component comprising a plurality of layers of wood-based materials).

The frame structure 114 may be made of suitable material such as metal (e.g., steel), rigid plastic, rigid polymer, hardwood, and/or the like, with sufficient strength for supporting the load thereabove and for resisting external forces that may otherwise cause it to deform or disassemble.

For ease of illustration and description, a coordinate system is defined for the floor tile 102 and the frame structure 114 thereof. As shown in FIG. 3, the coordinate system comprises mutually orthogonal directions of "Up" and "Down" along a vertical axis, "North" and "South" along a longitudinal axis, and "East" and "West" along a lateral axis. It is noted that the terms North, South, East, and West used hereinafter does not have any geographic meaning.

Figure 4:
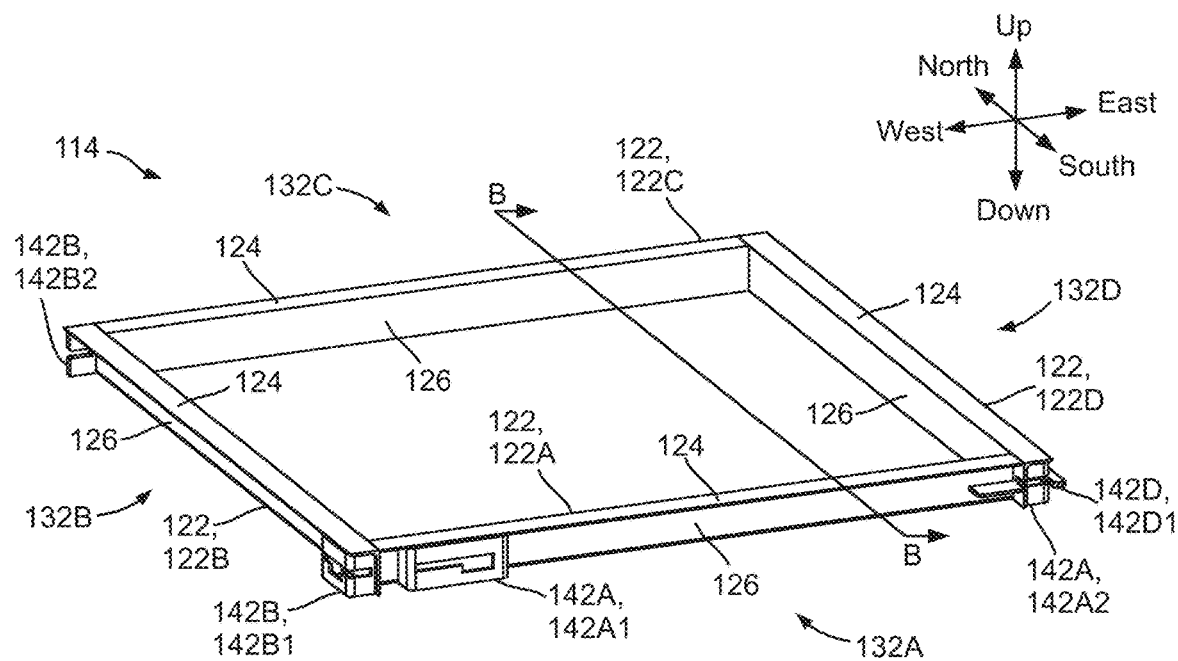
FIG. 4 is a perspective view of the frame structure of the rectangular floor tile shown in FIG. 3 viewed from a location above a first corner thereof and at a downward viewing angle.
Figure 5:
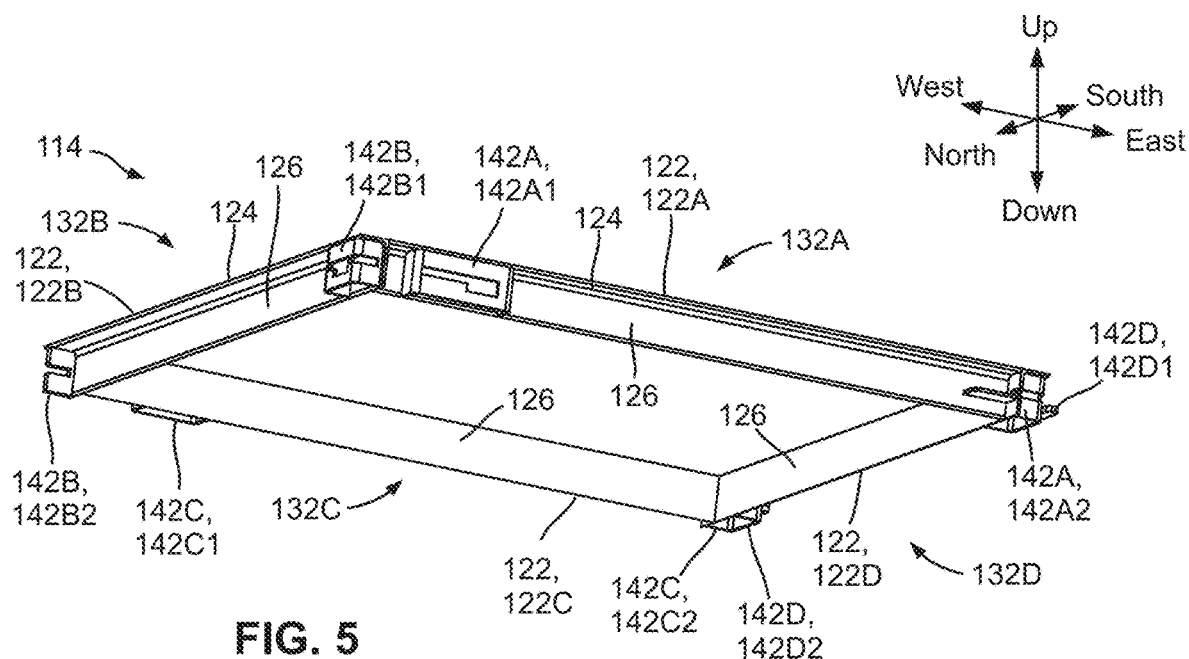
FIG. 5 is a perspective view of the frame structure shown in FIG. 3 viewed from a location below the first corner thereof and at an upward viewing angle.
Figure 6:
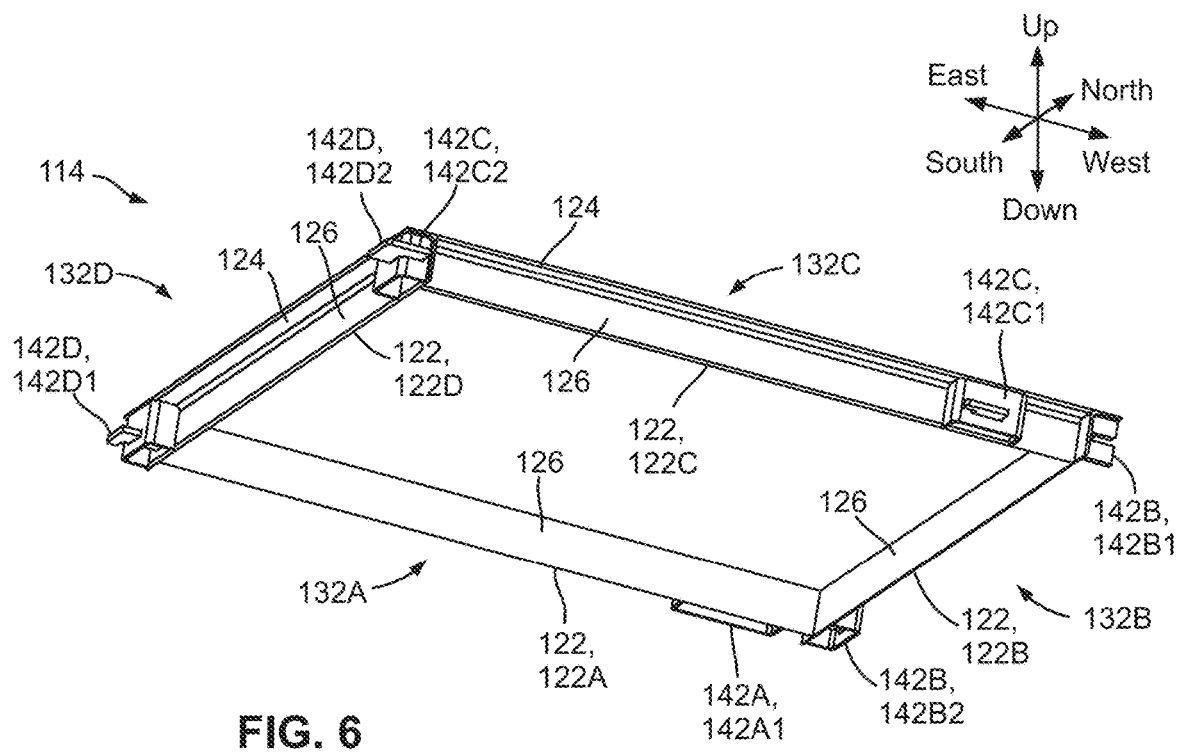
FIG. 6 is a perspective view of the frame structure shown in FIG. 3 viewed from a location below a second corner thereof opposite to the first corner and at an upward viewing angle.
Figure 7:
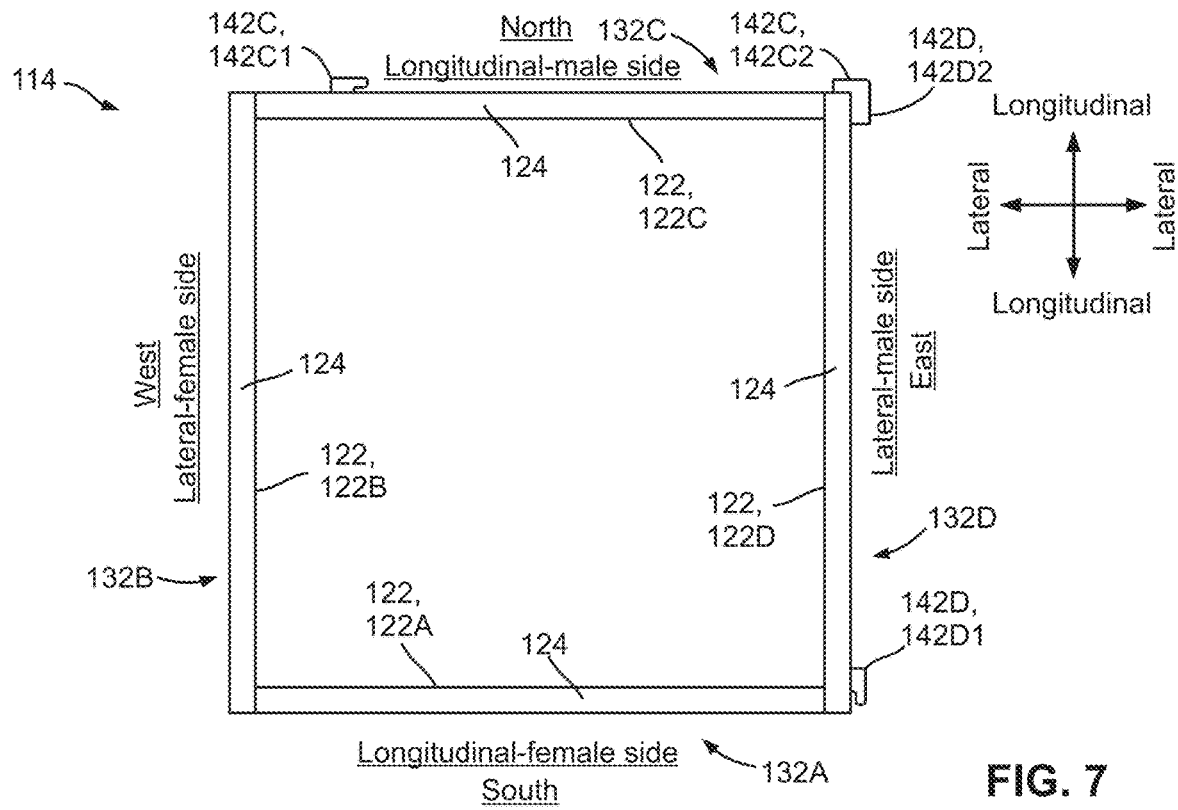
FIG. 7 is a plan view of the frame structure shown in FIG. 3.
Figure 8:
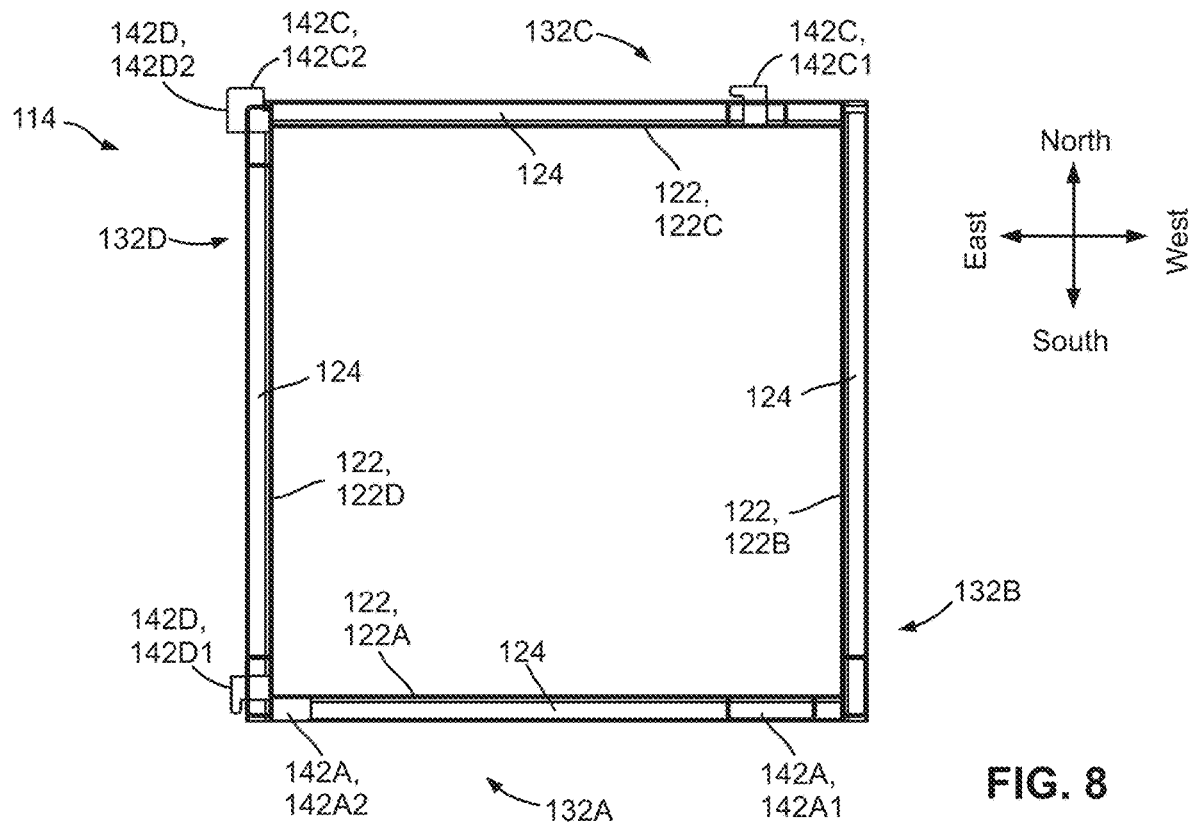
FIG. 8 is a bottom view of the frame structure shown in FIG. 3.
Figure 9A:
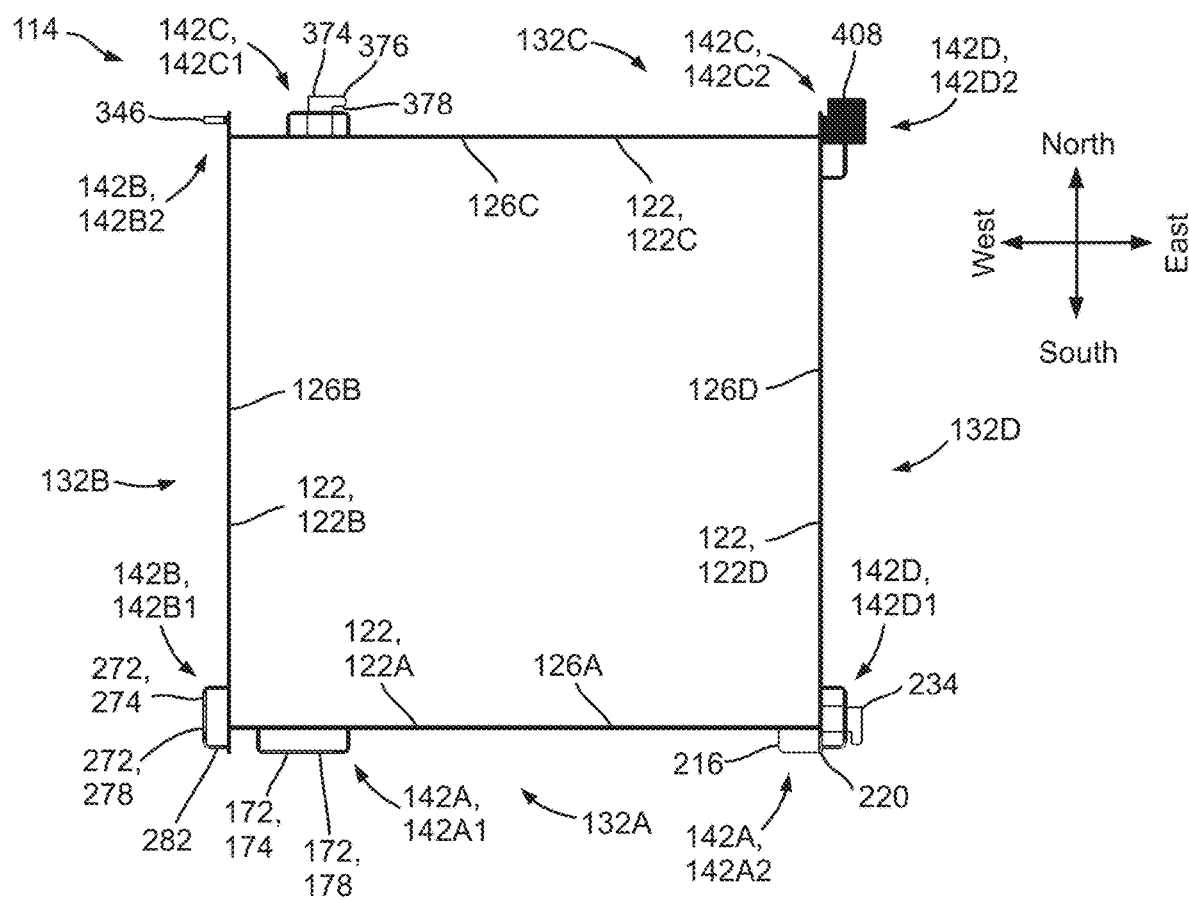
FIG. 9A is a cross-sectional view of the frame structure shown in FIG. 3 along the cross-section line A-A.
Figure 9B:
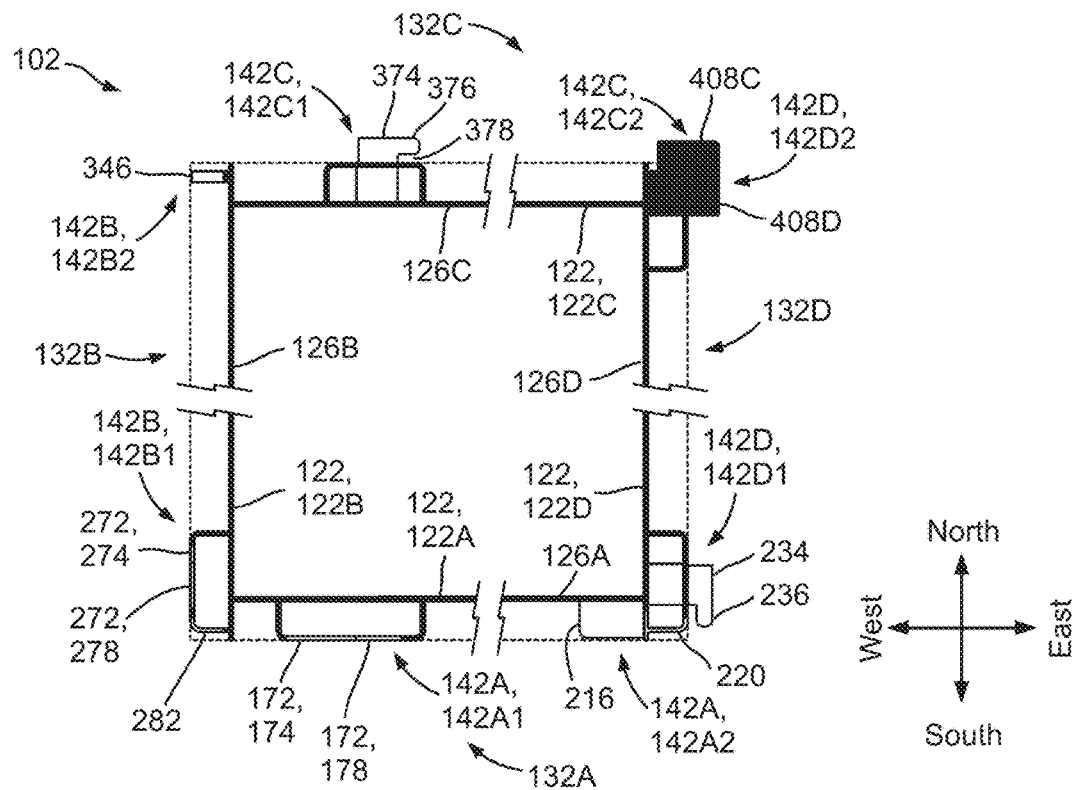
FIG. 9B is a schematic representation of the frame structure shown in FIG. 3 with broken lines indicating the outer sidewalls thereof.
Figure 10:
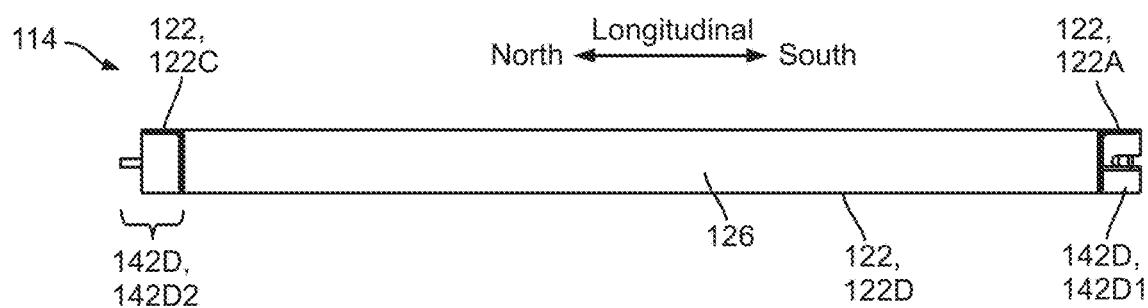
FIG. 10 is cross-sectional view of the frame structure shown in FIG. 4 along the cross-section line B-B.

FIGS. 4 to 6 are perspective views of the frame structure 114 of the floor tile 102, wherein FIG. 4 shows the perspective view of the frame structure 114 of the floor tile 102 shown in FIG. 3, viewed from a location above the corner 116 thereof and at a downward viewing angle; FIG. 5 shows the perspective view of the frame structure 114 of the floor tile 102 shown in FIG. 3, viewed from a location below the corner 116 thereof and at an upward viewing angle; and FIG. 6 shows the perspective view of the frame structure 114 of the floor tile 102 shown in FIG. 3, viewed from a location below the corner 118 thereof opposite to the corner 116 and at an upward viewing angle.

As shown, the frame structure 114 in these embodiments comprises four elongated structural bars 122 (also denoted "reinforcement bars" or "re-bars") coupled to neighboring ones using suitable coupling means such as welding, bolts, screws, nails, glue, and/or the like, to form a rectangular-shape supporting structure. Each elongated structural bar 122 has an inverted L-shape cross-section (see FIG. 10) and forms a respective portion of a top wall 124 for receiving and supporting the floor panel 112 and an inner sidewall 126 for supporting the top wall 124.

Among the four elongated structural bars 122, the elongated structural bars 122A and 122C are arranged on longitudinally opposite sides 132A and 132C (i.e., South and North sides) and extend laterally between the elongated structural bars 122B and 122D. The elongated structural bar 122A on the South side 132A comprises a female coupling structure 142A (thus the side 132A is also denoted the "longitudinal-female side" hereinafter), and the elongated structural bar 122C on the North side comprises a male coupling structure 142C (thus the side 132C is also denoted the "longitudinal-male side" hereinafter) for engaging the female coupling structure 142A of another floor tile 102.

Similarly, the elongated structural bars 122B and 122D are arranged on laterally opposite sides 132B and 132D (i.e., West and East sides) and extend longitudinally between the elongated structural bars 122A and 122C, wherein the elongated structural bar 122B on the West side 132B comprises a female coupling structure 142B (thus the side 132B is also denoted the "lateral-female side" hereinafter), and the elongated structural bar 122D on the East side 132D comprises a male coupling structure 142D (thus the side 132D is also denoted the "lateral-male side" hereinafter) for engaging the female coupling structure 142B of another floor tile 102.

The coupling structures 142A to 142D (collectively identified using reference numeral 142) thus form a coupling system for coupling a plurality of floor tiles 102 together. Each of the coupling structures 142A to 142D comprises a locking structure 142A1 to 142D1 and a delimiting structure 142A2 to 142D2. In particular and as will be described in more detail below, the female coupling structure 142A comprises a female locking structure 142A1 and a female delimiting structure 142A2. The female coupling structure 142B comprises a female locking structure 142B1 and a female delimiting structure 142B2. The male coupling structure 142C comprises a male locking structure 142C1 and a male delimiting structure 142C2. The male coupling structure 142D comprises a male locking structure 142D1 and a male delimiting structure 142D2.

Figure 11:
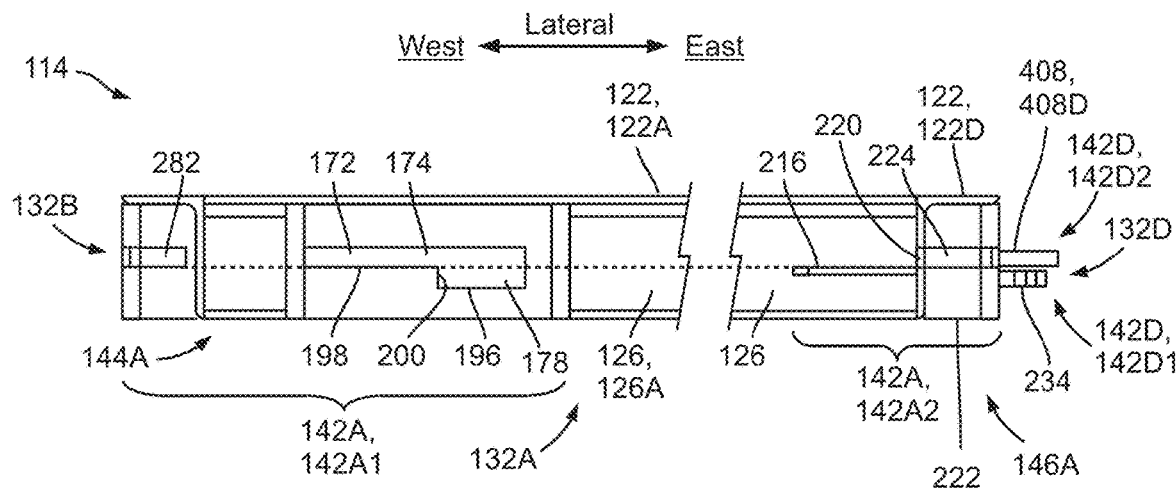
FIG. 11 is a South side view of the frame structure shown in FIG. 4.

As shown in FIG. 11, the South side 132A of the frame structure 114 comprises the female coupling structure 142A having the female locking structure 142A1 about or at the West end 144A (i.e., the end adjacent the West side 132B of the frame structure 114) and the female delimiting structure 142A2 about or at the East end 146A (i.e., the end adjacent the East side 132D of the frame structure 114).

Figure 15:
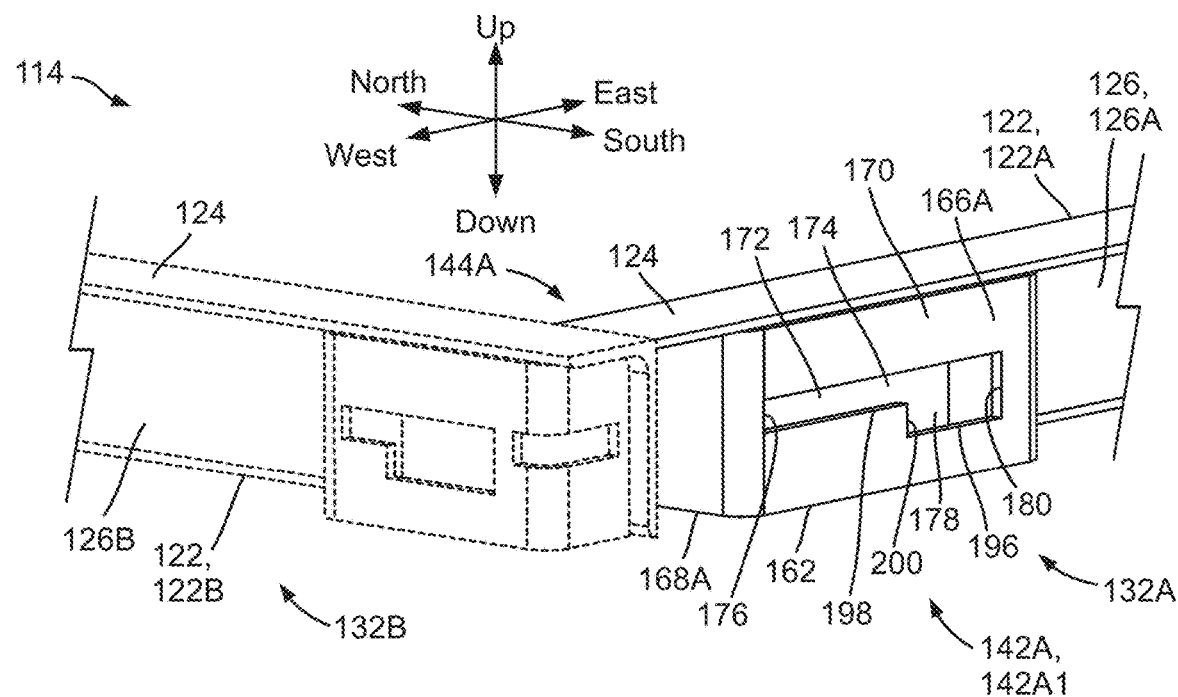
FIG. 15 is a perspective of the Southwest corner of the frame structure shown in FIG. 4, for showing the South side thereof.
Figure 16:
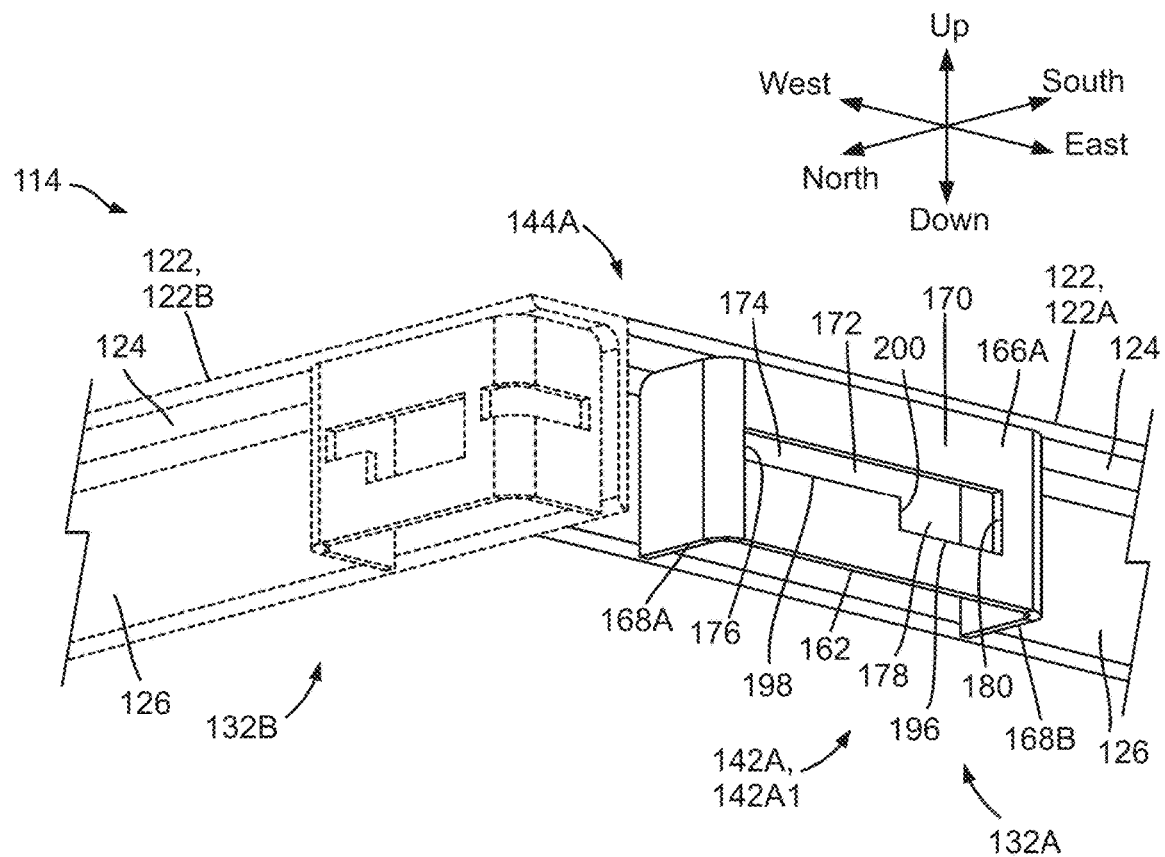
FIG. 16 is a perspective of the Southwest corner of the frame structure shown in FIG. 4, viewed from another view angle, for showing the South side thereof.
Figure 17:
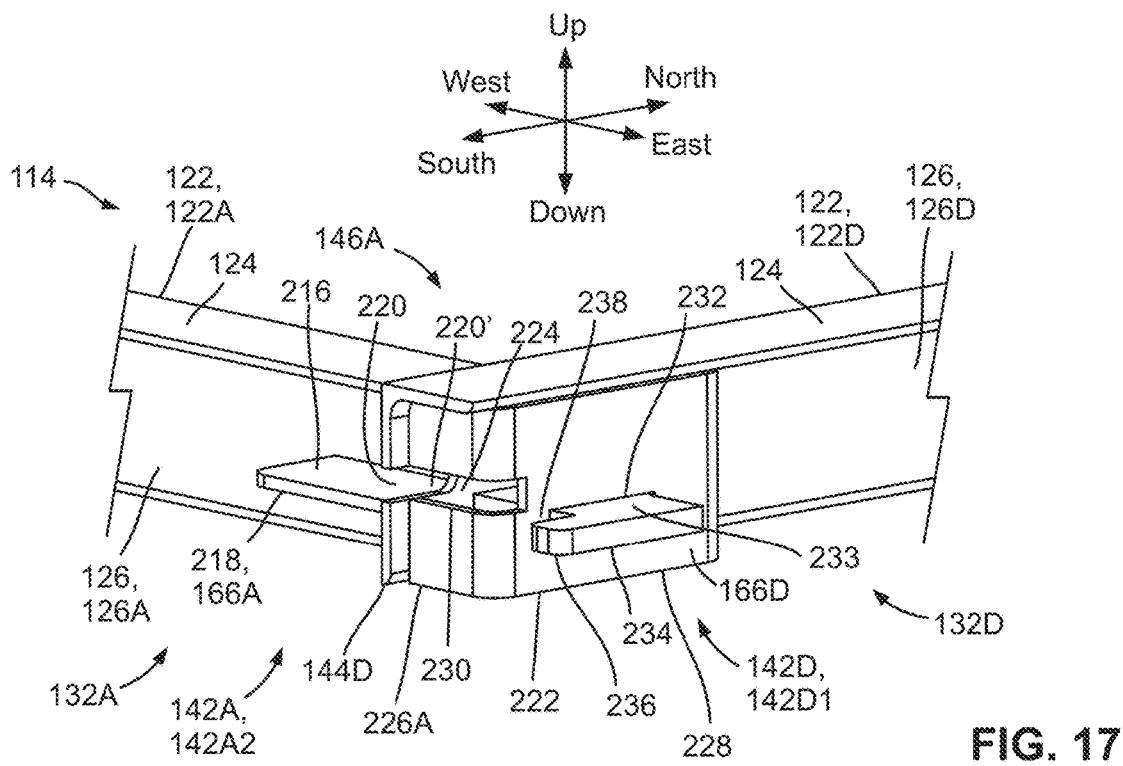
FIG. 17 is a perspective of the Southeast corner of the frame structure shown in FIG. 4.
Figure 18:
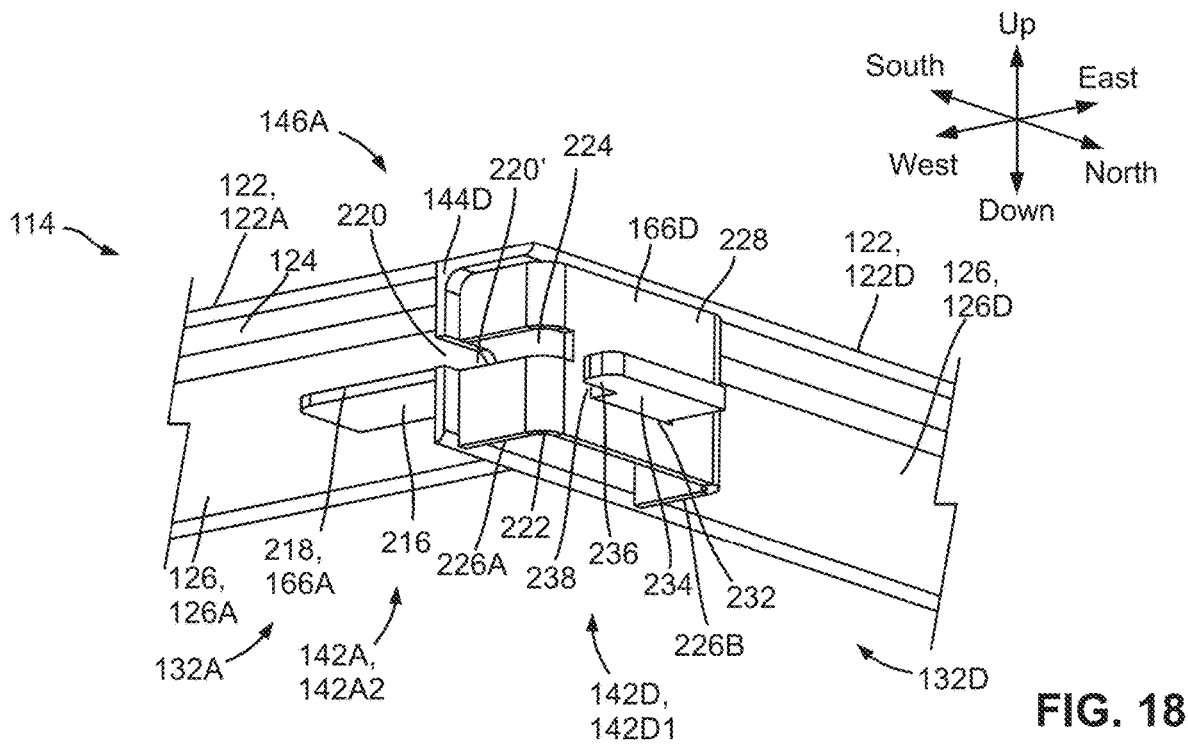
FIG. 18 is a perspective of the Southeast corner of the frame structure shown in FIG. 4, viewed from another view angle.
Figure 19:
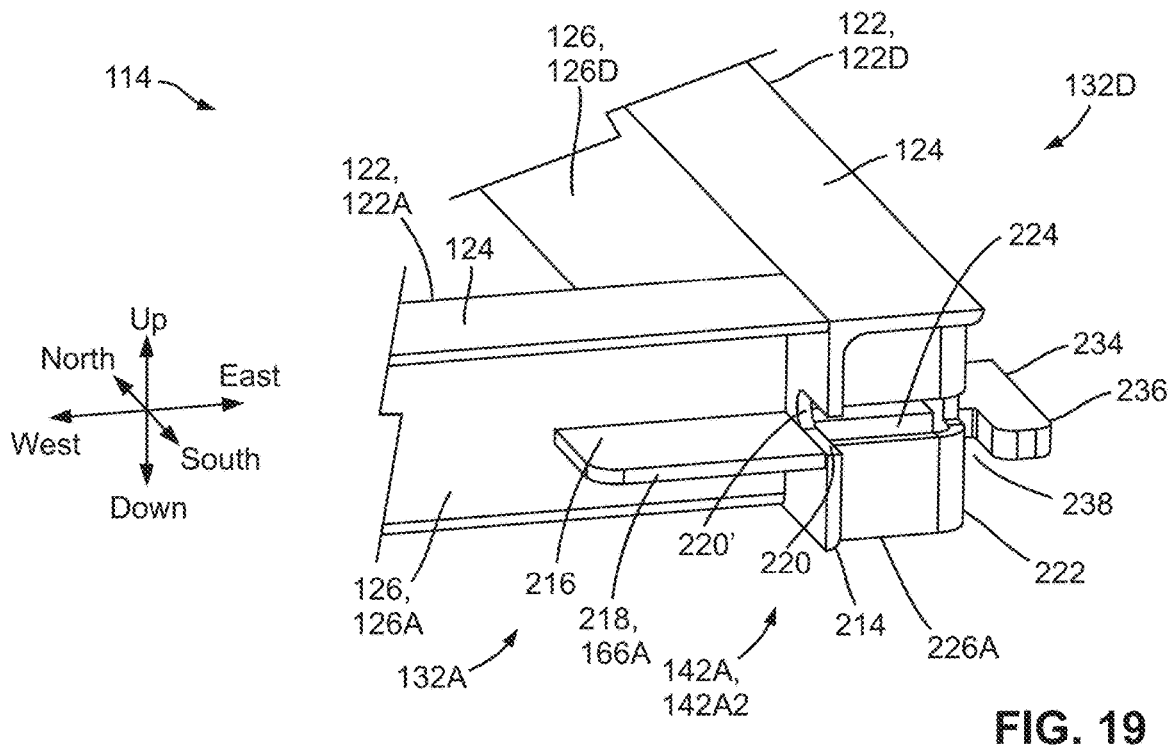
FIG. 19 is a perspective of the Southeast corner of the frame structure shown in FIG. 4, viewed from yet another view angle.

As shown in FIGS. 15 and 16, the female locking structure 142A1 of the female coupling structure 142A comprises a U-shape bracket 162 having a body 170 coupled to two legs 168A and 168B at opposite ends thereof, with the two legs 168A and 168B thereof coupled to the outer surface of the inner sidewall 126A of the elongated structural bar 122A about or at the West end 144A such that the body 170 of the U-shape bracket 162 forms a portion of the outer sidewall 166A along the South side 132A of the frame structure 114.

On the outer sidewall 166A, the female locking structure 142A1 comprises a locking window or receptacle 172 which comprises a receiving portion or receiving groove 174 and a locking portion or locking notch 178 under the receiving groove 174. The receiving groove 174 longitudinally extends East from a receiving end 176 about the West end 144A to a female locking end 180. The locking notch 178 laterally extends East from a shoulder 200 intermediate the receiving end 176 and the female locking end 180 to the female locking end 180. Thus, the locking notch 178 of the locking receptacle 172 has a bottom edge 196 lower than the bottom edge 198 of the receiving groove 174, and form a "step" structure with the shoulder 200.

The receiving groove 174 has a width suitable for receiving a hook 374 (described in more detail later) and the locking notch 178 has a width smaller than that of the hook 374 and is sufficient for receiving a neck portion of the hook 374 after the tip or male locking end 376 thereof is positioned behind the locking receptacle 172.

The locking receptacle 172 and the hollow interior space enclosed within the U-shape bracket 162 form a groove with a portion thereof behind the female locking end 180 thereby forming a locking anchor for engaging with a respective hook during floor assembling (described in more detail later).

Referring to FIGS. 11, and 17 to 19, the female delimiting structure 142A2 is partially formed by a U-shape bracket 222 coupled to the South end 144D (i.e., the South end of the East-side structural bar 122D adjacent the South side 132A of the frame structure 114) of the elongated structural bar 122D. In particular, the delimiting structure 142A2 comprises a horizontal guide 216 extending outwardly from the inner sidewall 126A and coupled to the South end 144D of the elongated structural bar 122D. The top surface of the guide 216 is flush with the bottom edge 198 of the receiving groove 174 of the locking receptacle 172 (see FIG. 11) and the outer edge 218 thereof also forms a portion of the outer sidewall 166A.

On the South end 144D of the elongated structural bar 122D, the female delimiting structure 142A2 comprises an opening or notch 220 with the bottom edge thereof flush to the upper surface of the guide 216. Moreover, the elongated structural bar 122D also comprises a U-shape bracket 222 having a body 228 coupled to two legs 226A and 226B at opposite ends thereof, with the two legs 226A and 226B thereof coupled to the outer surface of the inner sidewall 126D of the elongated structural bar 122D at or about the South end 144D, such that the body 228 of the U-shape bracket 222 forms a portion of the outer sidewall 166D of the frame structure 114 on the East side 132D thereof, and the U-shape bracket 222 enclosed a portion 220' of the notch 220.

The U-shape bracket 222 comprises a delimiting window 224 extending from the body 228 of the U-shape bracket 222 through the leg 226A to the notch 220 and in communication therewith. The delimiting window 224 has a bottom edge 230 flush with that of the notch 220 and the upper surface of the guide 216. The notch 220, the delimiting window 224, and the hollow interior space enclosed within the U-shape bracket 222 thus form a delimiting receptacle or groove (also identified using reference numeral 220) of the delimiting structure 142A2 on the South side 132A.

The U-shape bracket 222 also comprises an opening 232 on the outer sidewall 166D. A locking tongue 233 is coupled to the inner sidewall 126D using suitable means such as welding and outwardly extends therefrom through the opening 232. A tip or male locking end 236 extends from the locking tongue 233 towards the South end 144D and spaced from the outer sidewall 166D (i.e., having a gap 238 therebetween) thereby forming a hook 234. The top surface of the hook 234 is flush with or lower than the bottom edge 230 of the delimiting window 224. The hook 234 and the U-shape bracket 222 form the male locking structure 142D1.

Figure 12:
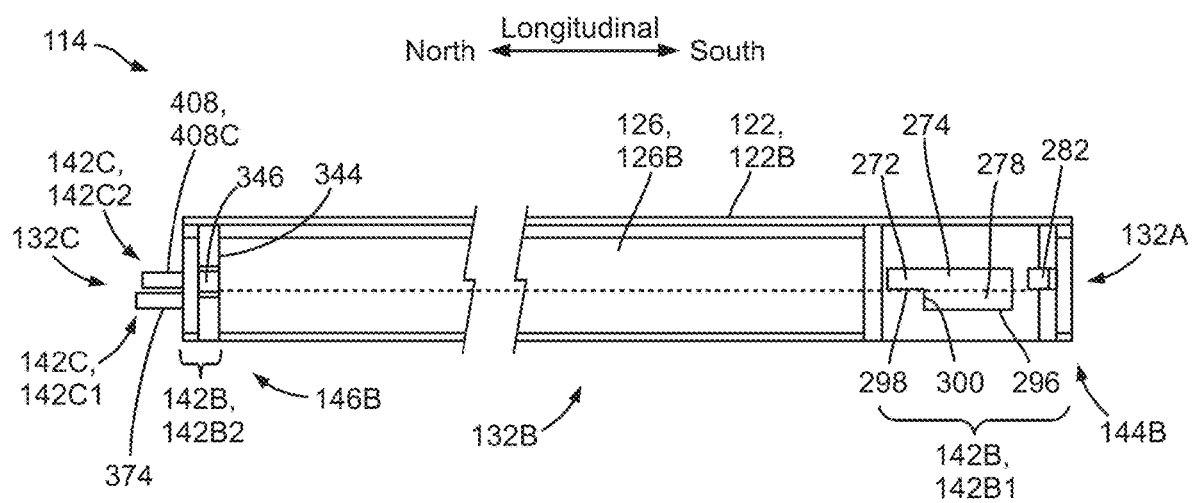
FIG. 12 is a West side view of the frame structure shown in FIG. 4.

Referring to FIG. 12, the West side 132B of the frame structure 114 comprises the female coupling structure 142B having the female locking structure 142B1 about or at the South end 144B (i.e., the end adjacent the South side 132A of the frame structure 114) and the female delimiting structure 142B2 about or at the North end 146B (i.e., the end adjacent the North side 132C of the frame structure 114).

Figure 20:
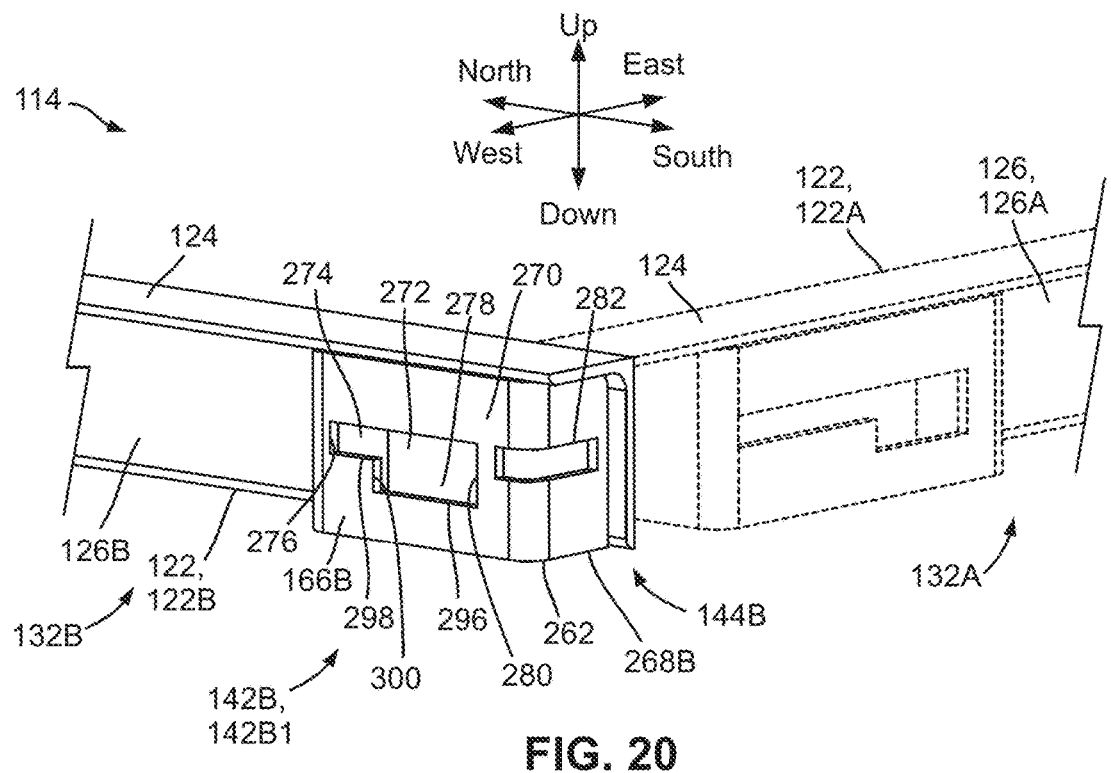
FIG. 20 is a perspective of the Southwest corner of the frame structure shown in FIG. 4, for showing the West side thereof.
Figure 21:
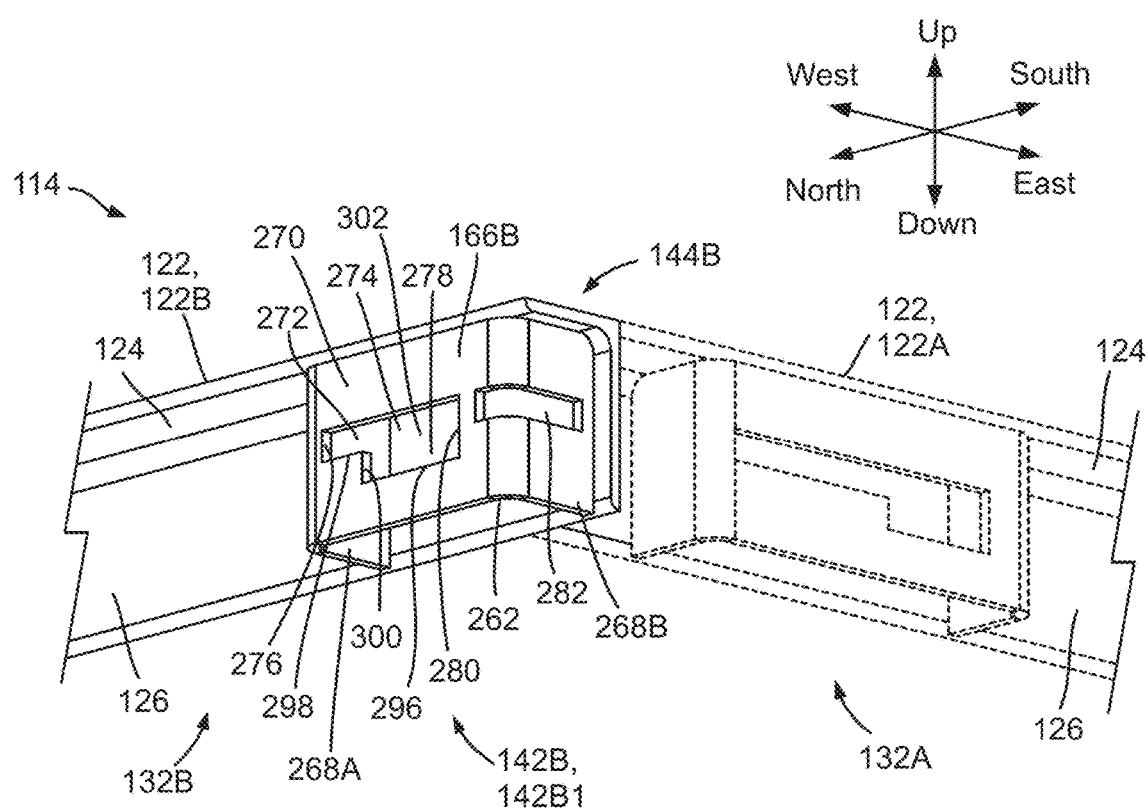
FIG. 21 is a perspective of the Southwest corner of the frame structure shown in FIG. 4, viewed from another view angle, for showing the West side thereof.

As shown in FIGS. 20 and 21, the female locking structure 142B1 of the female coupling structure 142B comprises a U-shape bracket 262 having a body 270 coupled to two legs 268A and 268B at opposite ends thereof, with the two legs 268A and 268B thereof coupled to the outer surface of the inner sidewall 126B of the elongated structural bar 122B at or about the South end 144B such that the body 270 of the U-shape bracket 262 forms a portion of the outer sidewall 166B along the West side 132B of the frame structure 114.

On the outer sidewall 166B, the U-shape bracket 262 comprises a locking window or receptacle 272 which comprises a receiving portion or receiving groove 274 and a locking portion or locking notch 278 under the receiving groove 274. The receiving groove 274 longitudinally extends South from a receiving end 276 to a female locking end 280 about the South end 144B. The locking notch 278 longitudinally extends from a shoulder 300 intermediate the receiving end 276 and the female locking end 280 to the female locking end 280. Thus, the locking notch 278 of the locking receptacle 272 has a bottom edge 296 lower than the bottom edge 298 of the receiving groove 274, and form a "step" structure with the shoulder 300.

The receiving groove 274 has a width suitable for receiving a hook 234 (described in more detail later) and the locking notch 278 has a width smaller than that of the hook 234 and is sufficient for receiving a neck portion of the hook 234 after the male locking end 236 of the hook 234 is positioned behind the locking receptacle 272.

The locking receptacle 272 and the hollow interior space between the inner and outer sidewalls 126B and 166B form a groove with a portion thereof behind the female locking end 280 thereby forming a locking anchor for engaging with a respective hook during floor assembling.

In these embodiments, the U-shape bracket 262 further comprises a securing window 282 extending from a location adjacent the female locking end 280 of the locking receptacle 272 to the neighboring leg 268B thereof. The securing window 282 and the hollow interior space enclosed within the U-shape bracket 262 form a securing receptacle or groove (also called a female securing structure and identified using reference numeral 282) adjacent the female locking structure 142B1.

Figure 22:
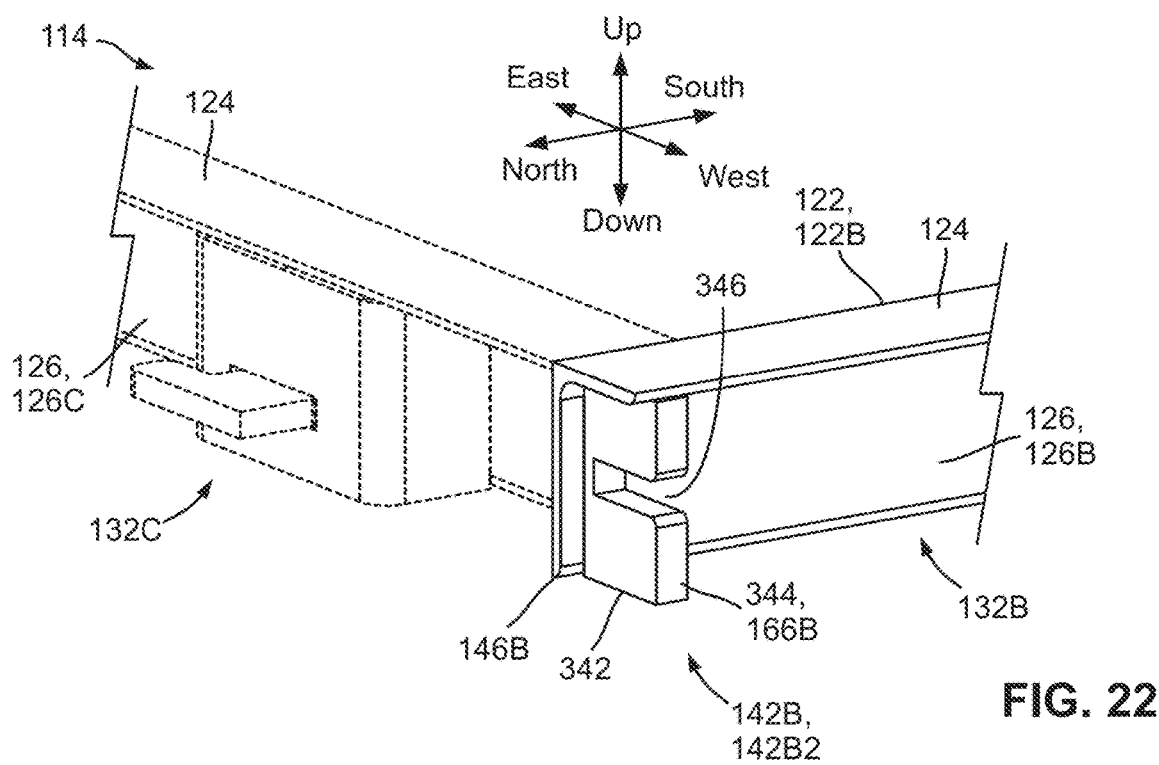
FIG. 22 is a perspective of the Northwest corner of the frame structure shown in FIG. 4.

Referring to FIGS. 12 and 22, the female delimiting structure 142B2 in these embodiments comprises a vertical plate 342 extending outwardly from the inner sidewall 126B about the North end 146B of the elongated structural bar 122B, with the outer edge 344 thereof forming a portion of the outer sidewall 166B. The plate 342 comprises a delimiting opening or delimiting notch 346 forming a delimiting receptacle (also identified using reference numeral 346) on the outer edge thereof with the bottom edge of the delimiting receptacle 346 flush with the bottom edge 298 of the receiving groove 274 of the locking receptacle 272 (see FIG. 12).

Figure 13:
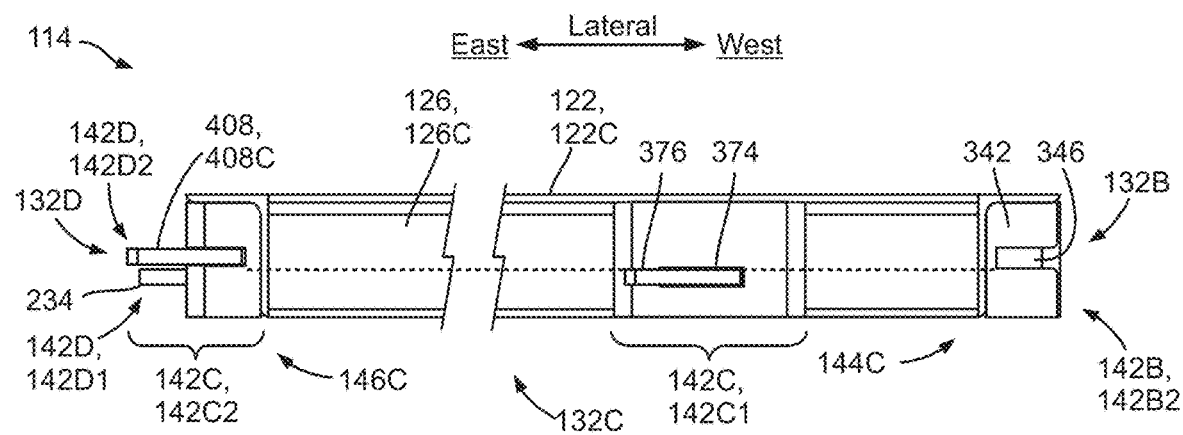
FIG. 13 is a North side view of the frame structure shown in FIG. 4.

Referring to FIG. 13, the North side 132C of the frame structure 114 comprises the male coupling structure 142C having the male locking structure 142C1 and the male delimiting structure 142C2. The male locking structure 142C1 is at a location intermediate the West end 144C (i.e., the end adjacent the West side 132B of the frame structure 114) and the East end 146C (i.e., the end adjacent the East side 132D of the frame structure 114), and closer to the West end 144C. The male delimiting structure 142C2 is at the East end 146C.

Figure 23:
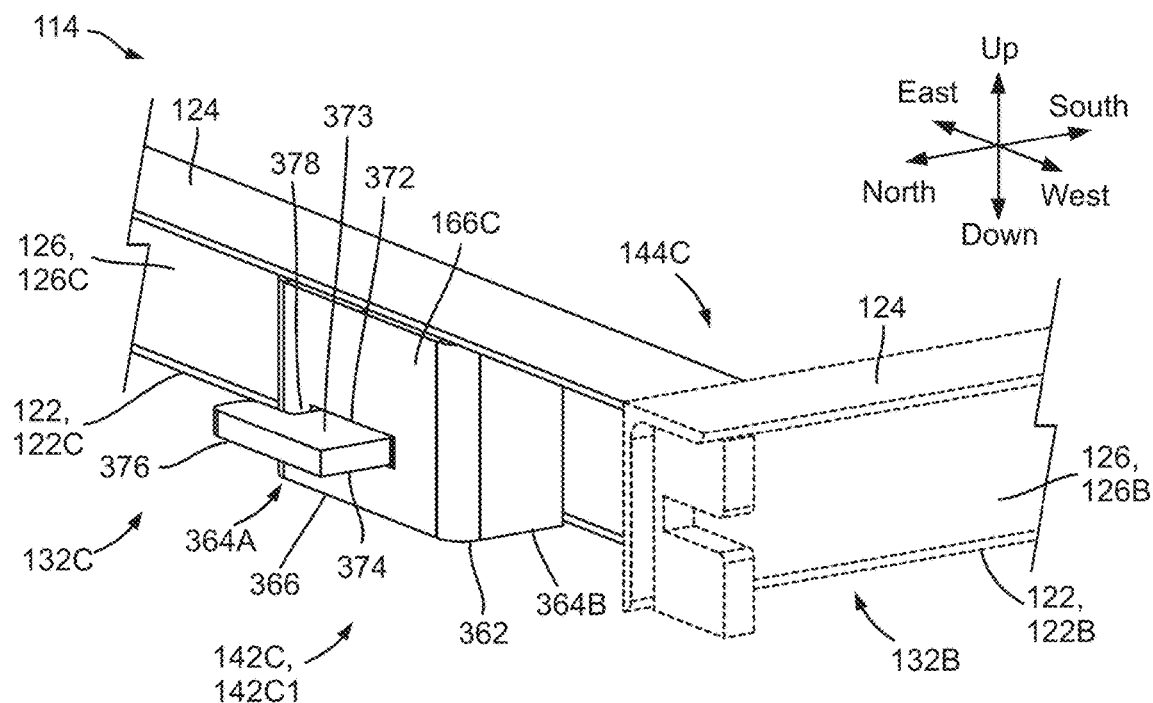
FIG. 23 is a perspective of the Northwest corner of the frame structure shown in FIG. 4, viewed from another view angle.

As shown in FIGS. 13 and 23, the male locking structure 142C1 of the male coupling structure 142C comprises a U-shape bracket 362 having a body 366 coupled to two legs 364A and 364B at opposite ends thereof, with the two legs 364A and 364B thereof coupled to the outer surface of the inner sidewall 126C of the elongated structural bar 122C such that the body 366 of the U-shape bracket 362 forms a portion of the outer sidewall 166C of the frame structure 114 on the North side 132C thereof.

The U-shape bracket 362 comprises an opening 372 on the outer sidewall 166C. A tongue 374 is coupled to the inner sidewall 126C using suitable means such as welding and outwardly extends therefrom through the opening 372 (also see FIG. 9). The hook 374 forms the male locking structure 142C1 and comprises a tip or male locking end 376 extending East (i.e., away from the West end 144C) and spaced from the outer sidewall 166C (i.e., having a gap 378 therebetween). The top surface of the hook 234 is flush with or lower than the bottom edge of the delimiting receptacle 346 of the plate 342 on the West side 132B (see FIG. 13).

Figure 24:
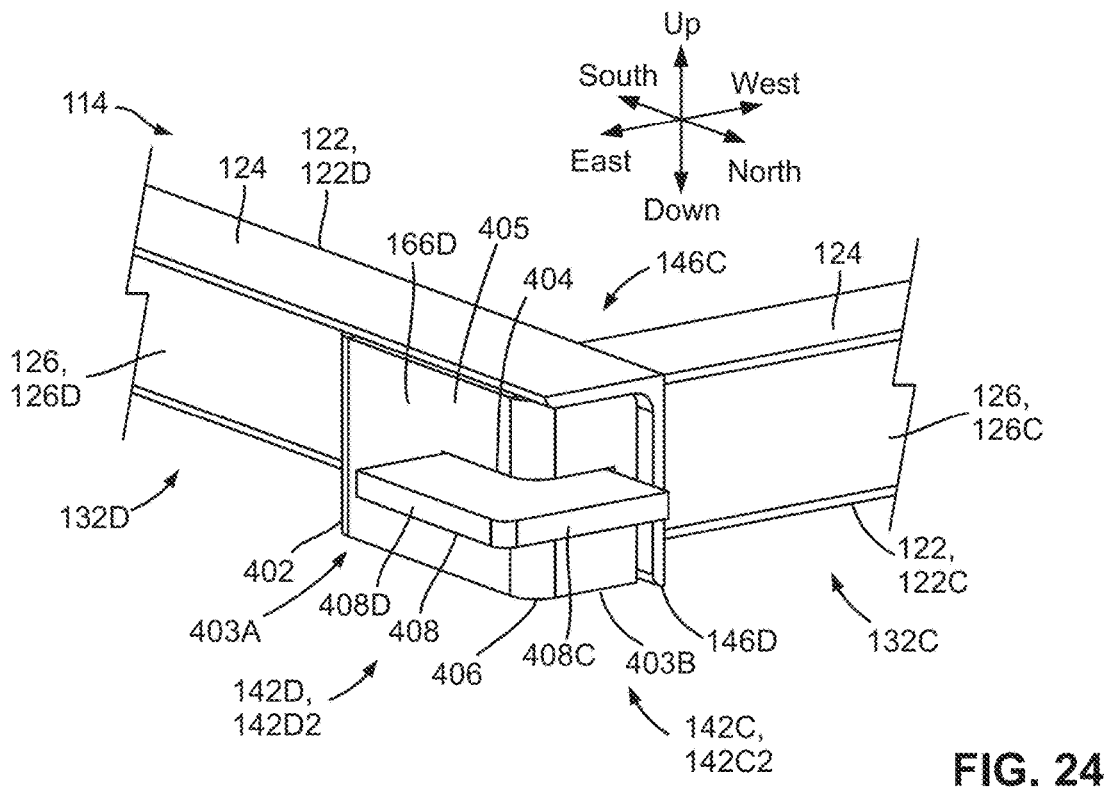
FIG. 24 is a perspective of the Northeast corner of the frame structure shown in FIG. 4.
Figure 25:
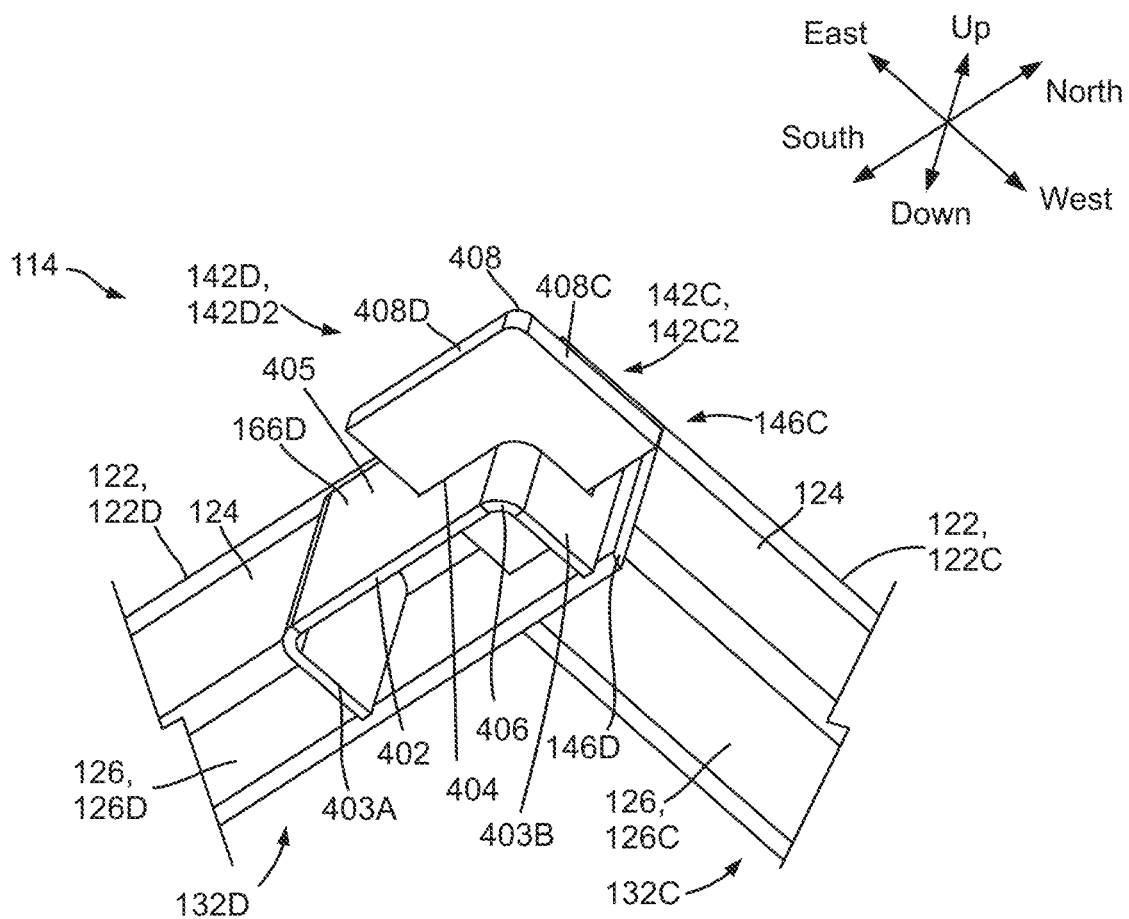
FIG. 25 is a perspective of the Northeast corner of the frame structure shown in FIG. 4, viewed from another view angle.

Referring to FIGS. 12, 24, and 25, in these embodiments, a U-shape bracket 402 forms the male delimiting structures 142C2 and 142D2. The U-shape bracket 402 comprises a body 405 coupled to two legs 403A and 403B at opposite ends thereof, with the two legs 403A and 403B thereof coupled to the outer surface of the inner sidewall 126D of the elongated structural bar 122D about or at the North end 146D thereof (i.e., the end adjacent the North side 132C of the frame structure 114) such that the body 405 of the U-shape bracket 402 forms a portion of the outer sidewall 166D of the frame structure 114 on the East side 132D thereof.

The U-shape bracket 402 comprises a horizontal opening 404 across the Northeast corner 406 thereof. A horizontal plate 408 is coupled to the inner sidewall 126D using suitable means such as welding and longitudinally outwardly and laterally outwardly extends therefrom through the opening 404. The portion 408C of the horizontal plate 408 on the North side 132C thus forms a delimiting tongue (also identified using reference numeral 408C) of the male delimiting structure 142C2.

Figure 14:
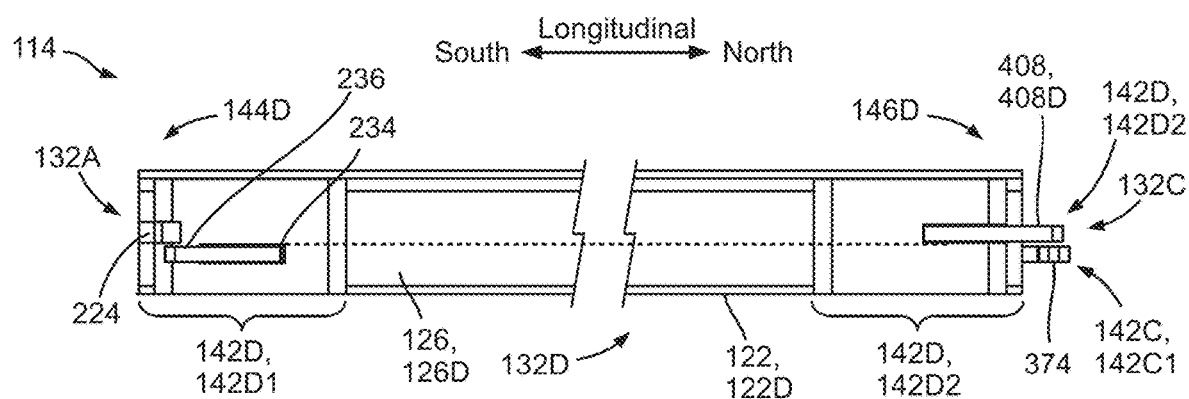
FIG. 14 is an East side view of the frame structure shown in FIG. 4.

Referring to FIG. 14, the East side 132D of the frame structure 114 comprises the male coupling structure 142D having the male locking structure 142D1 about or at the South end 144D and the male delimiting structure 142D2 at the North end 146D.

As described above and shown in FIGS. 17 to 19, the hook 234 forms the locking structure 142D1. As shown in FIGS. 24 and 25, the portion 408D the horizontal plate 408 on the East side 132D forms a delimiting tongue (also identified using reference numeral 408D) of the male delimiting structure 142D2.

By engaging the above-described male and female coupling structures and male and female delimiting structures of different floor tiles 102, and more specifically, by engaging the receptacles with respective mating hooks and tongues, a plurality of floor tiles 102 may be engaged with each other for assembling a rectangular-shape floor. The coupling structures and delimiting structures, and more specifically the receptacles, hooks, and tongues, are arranged in carefully designed locations along the perimeter of the frame structure 114 to facilitate the engagement therebetween. Below is a summary of the relationship of their locations.

As shown in FIG. 11, on the South side 132A of the frame structure 114, the bottom edge 196 of the locking notch 178 of the locking receptacle 172 is lower than the bottom edge 198 of the receiving groove 174 thereof. The bottom edge 198 of the receiving groove 174 of the locking receptacle 172 is flush with the top surface of the guide 216, the bottom edge of the notch 220, and the bottom edge of the delimiting receptacle 224.

The bottom edge 198 of the receiving groove 174 of the locking receptacle 172 is also flush with or lower than the bottom edge of the securing receptacle 282 on the West side 132B of the frame structure 114.

The bottom edge of the delimiting receptacle 224 is flush with or lower than the bottom surface of the delimiting tongue 408D on both the North side 132C and the East side 132D of the frame structure 114.

The bottom edge of the delimiting receptacle 224 is flush with or higher than the top surface of the hook 234 on the East side 132D of the frame structure 114.

As shown in FIG. 12, on the West side 132B of the frame structure 114, the bottom edge 296 of the locking notch 278 of the locking receptacle 272 is lower than the bottom edge 298 of the receiving groove 274 thereof. The bottom edge 298 of the receiving groove 274 of the locking receptacle 272 is flush with the bottom edge of the securing receptacle 282, and the bottom edge of the delimiting receptacle 346.

The bottom edge of the delimiting receptacle 346 is flush with or lower than the bottom surface of the delimiting tongue 408C on both the North side 132C and the East side 132D of the frame structure 114.

The bottom edge of the delimiting receptacle 346 is flush with or higher than the top surface of the hook 374 on the North side 132C of the frame structure 114.

As shown in FIG. 13, on the North side 132C of the frame structure 114, the top surface of the hook 374 is flush with or lower than the bottom surface of the delimiting tongue 408C.

The top surface of the hook 374 is also flush with the bottom edge of the delimiting receptacle 346 on the West side 132B of the frame structure 114.

The bottom edge of the delimiting tongue 408C is flush with or higher than the top surface of the hook 234 on the East side 132D of the frame structure 114.

As shown in FIG. 14, on the East side 132D of the frame structure 114, the top surface of the hook 234 is flush with or lower than the bottom surface of the delimiting tongue 408D. In other words, the tongue 408D is above the hook 234 and may engage therewith.

The top surface of the hook 234 is flush with or lower than the bottom edge of the delimiting receptacle 224 on the South side 132A of the frame structure 114.

The bottom surface of the delimiting tongue 408D is flush with or higher than the top surface of the hook 374 on the North side 132C of the frame structure 114. In other words, the delimiting tongue 408D is above the hook 374 and may engage therewith.

Figure 26:
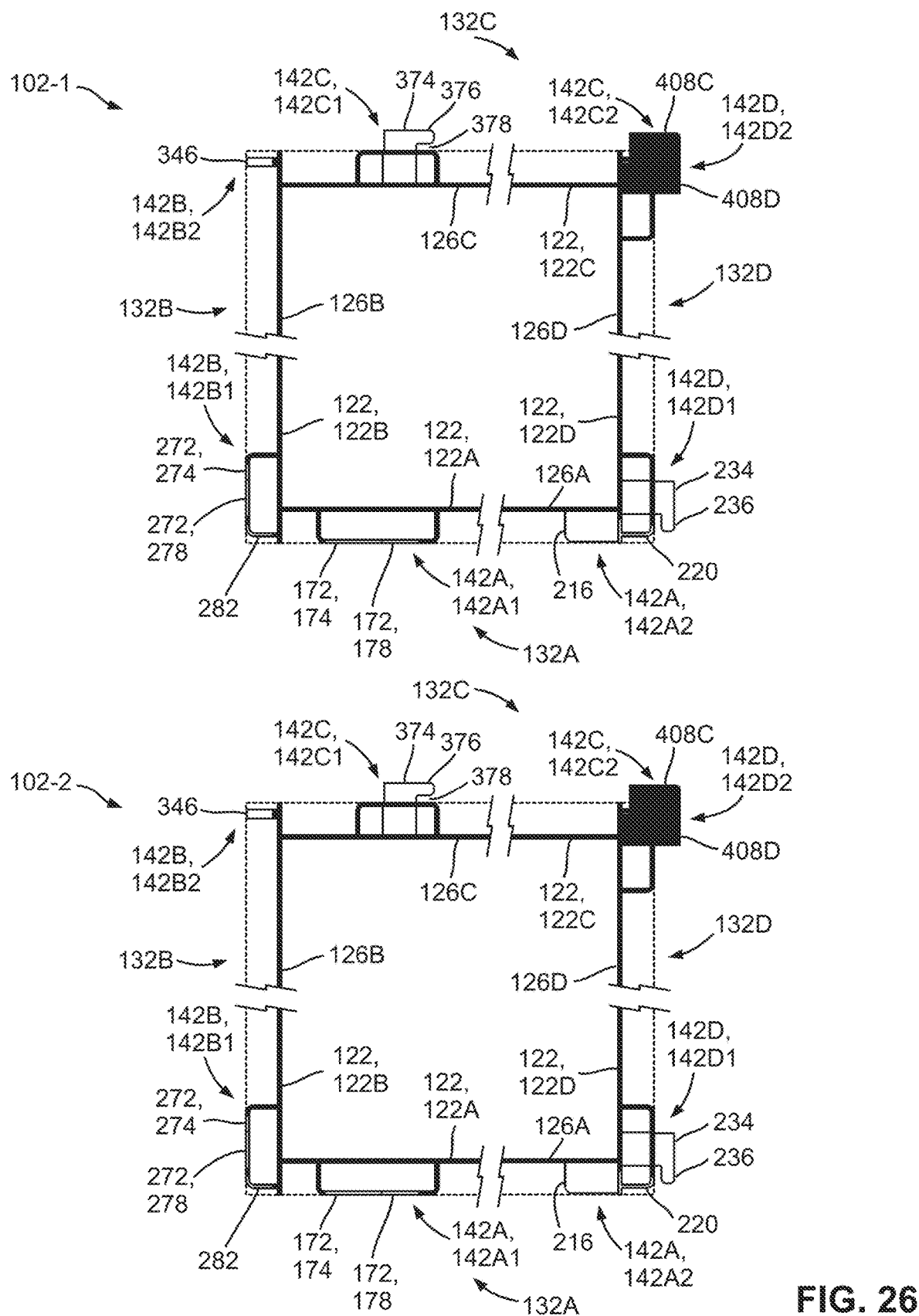
FIG. 26 is schematic diagram showing the engagement relationship of the receptacles with respective mating hooks and tongues when engaging two floor tiles 102 along the longitudinal direction.

FIG. 26 shows the engagement relationship of the receptacles with respective mating hooks and tongues when engaging two floor tiles 102-1 and 102-2 along the longitudinal direction (the floor panel component 112 is omitted for ease of illustration).

As shown, when engaging two floor tiles 102-1 and 102-2 along the longitudinal direction, the neighboring South side 132A of the floor tile 102-1 and North side 132C of the floor tile 102-2 are engaged with each other after the hook 374 and the delimiting tongue 408C on the North side 132C of the floor tile 102-2 are received in and engage, respectively, the locking receptacle 172 and the delimiting receptacle 220 on the South side 132A of the floor tile 102-1, with the tip 376 of the hook 374 engaging the anchor of the locking receptacle 172.

The engagement of the hook 374 and the locking receptacle 172 prevents the tiles 102-1 and 102-2 from being longitudinally disassembled, and the engagement of the delimiting tongue 408C and the delimiting receptacle 220 limits the vertical relative movement between the tiles 102-1 and 102-2 thereby preventing disassembling of tiles 102-1 and 102-2 that may be otherwise caused by such movement.

Figure 27:
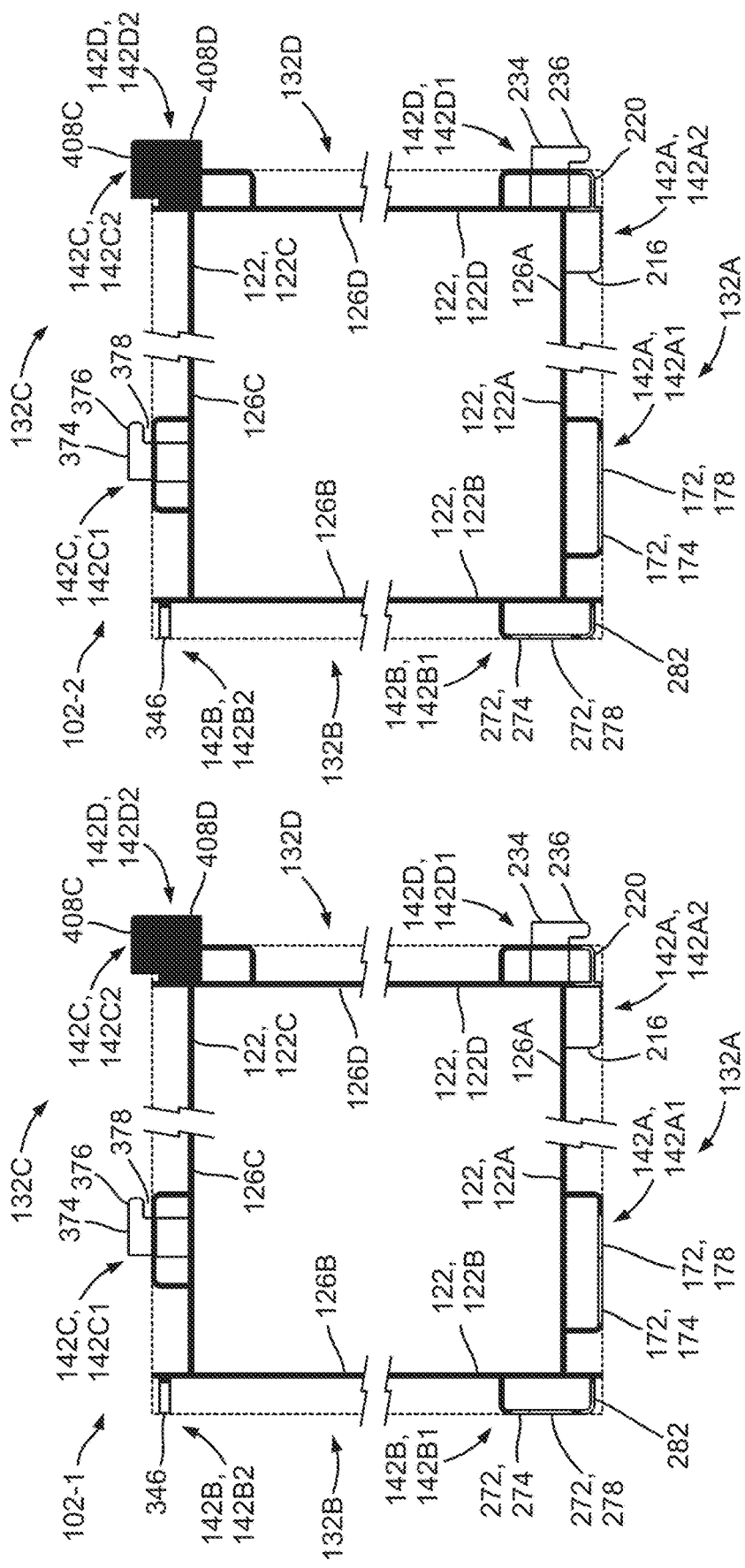
FIG. 27 is schematic diagram showing the engagement relationship of the receptacles with respective mating hooks and tongues when engaging two floor tiles along the lateral direction.

FIG. 27 shows the engagement relationship of the receptacles with respective mating hooks and tongues when engaging two floor tiles 102-1 and 102-2 along the lateral direction.

As shown, when engaging two floor tiles 102-1 and 102-2 along the lateral direction, the neighboring East side 132D of the floor tile 102-1 and West side 132B of the floor tile 102-2 are engaged with each other after the hook 234 and the delimiting tongue 408D on the East side 132D of the floor tile 102-1 are received in and engage, respectively, the locking receptacle 272 and the delimiting receptacle 346 on the West side 132B of the floor tile 102-2, with the male locking end 236 of the hook 234 engaging the anchor of the locking receptacle 272.

The engagement of the hook 234 and the locking receptacle 272 prevents the tiles 102-1 and 102-2 from being laterally disassembled, and the engagement of the delimiting tongue 408D and the delimiting receptacle 346 limits the vertical relative movement between the tiles 102-1 and 102-2 thereby preventing disassembling of tiles 102-1 and 102-2 that may be otherwise caused by such movement.

The floor tiles 102 leverage the "step" structures in the locking receptacles 172 and 272 to respectively receive and lock the respective hooks 374 and 234. For example, FIGS. 28A to 28D show a process of engaging the hook 234 of the floor tile 102-1 with the locking receptacle 272 of the floor tile 102-2 (the rest of the floor tile 102-2 is omitted for ease of illustration).

Figure 28A:
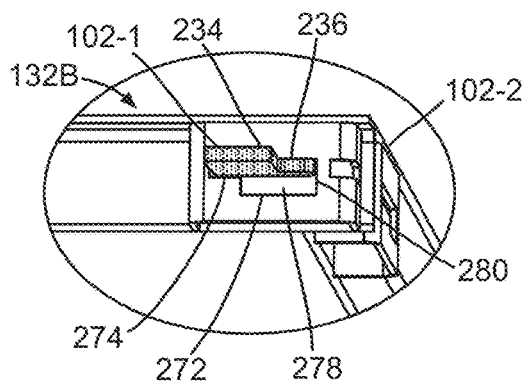

As shown in FIG. 28A, the floor tile 102-2 is first laid on the ground, Then, the hook 234 of the floor tile 102-1 may be positioned outside the locking receptacle 272 of the floor tile 102-2 and align with the receiving groove 274 of the locking receptacle 272 which has a dimension (e.g., width and height) sufficient for receiving the hook 234.

Figure 28B:
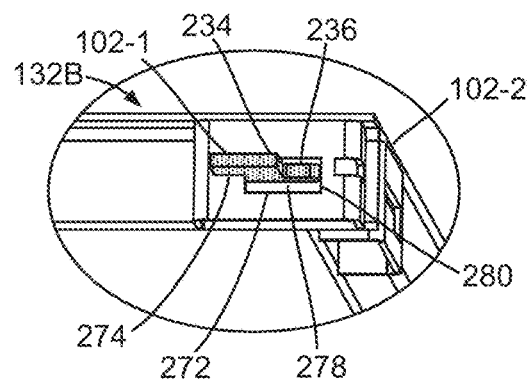

As shown in FIG. 28B, the floor tile 102-1 and thus the hook 234 move towards the floor tile 102-2 to position the male locking end 236 of the hook 234 inside the receiving groove 274 of the locking receptacle 272.

Figure 28C:
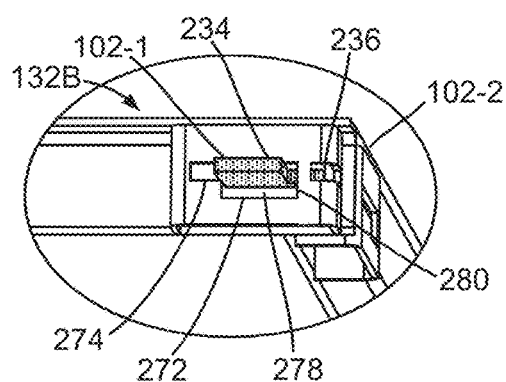

As shown in FIG. 28C, the floor tile 102-1 and thus the hook 234 then move forward to position the male locking end 236 of the hook 234 behind the female locking end 280 of the locking receptacle 272.

Figure 28D:
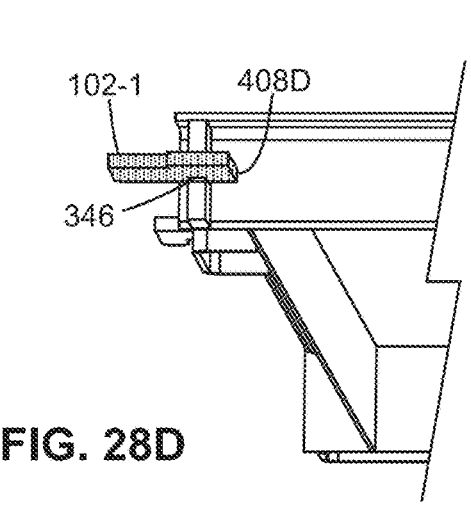
Figure 28D:
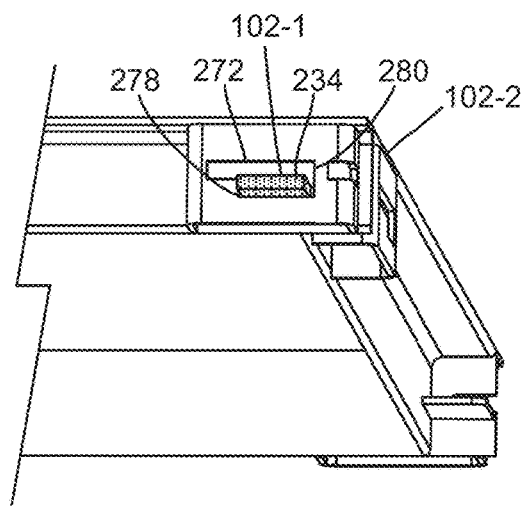

As shown in FIG. 28D, the floor tile 102-1 and thus the hook 234 are then moved downwardly (manually or caused by the weight of the floor tile 102-1 (i.e., caused by gravity)) to position the male locking end 236 of the hook 234 into the locking notch 278 of the locking receptacle 272. The female locking end 280 and the shoulder 300 of the locking receptacle 272 lock the hook 234 in place.

At this stage, the delimiting tongue 408D of the floor tile 102-1 also engages the delimiting receptacle 346 of the floor tile 102-2.

Figure 29A:
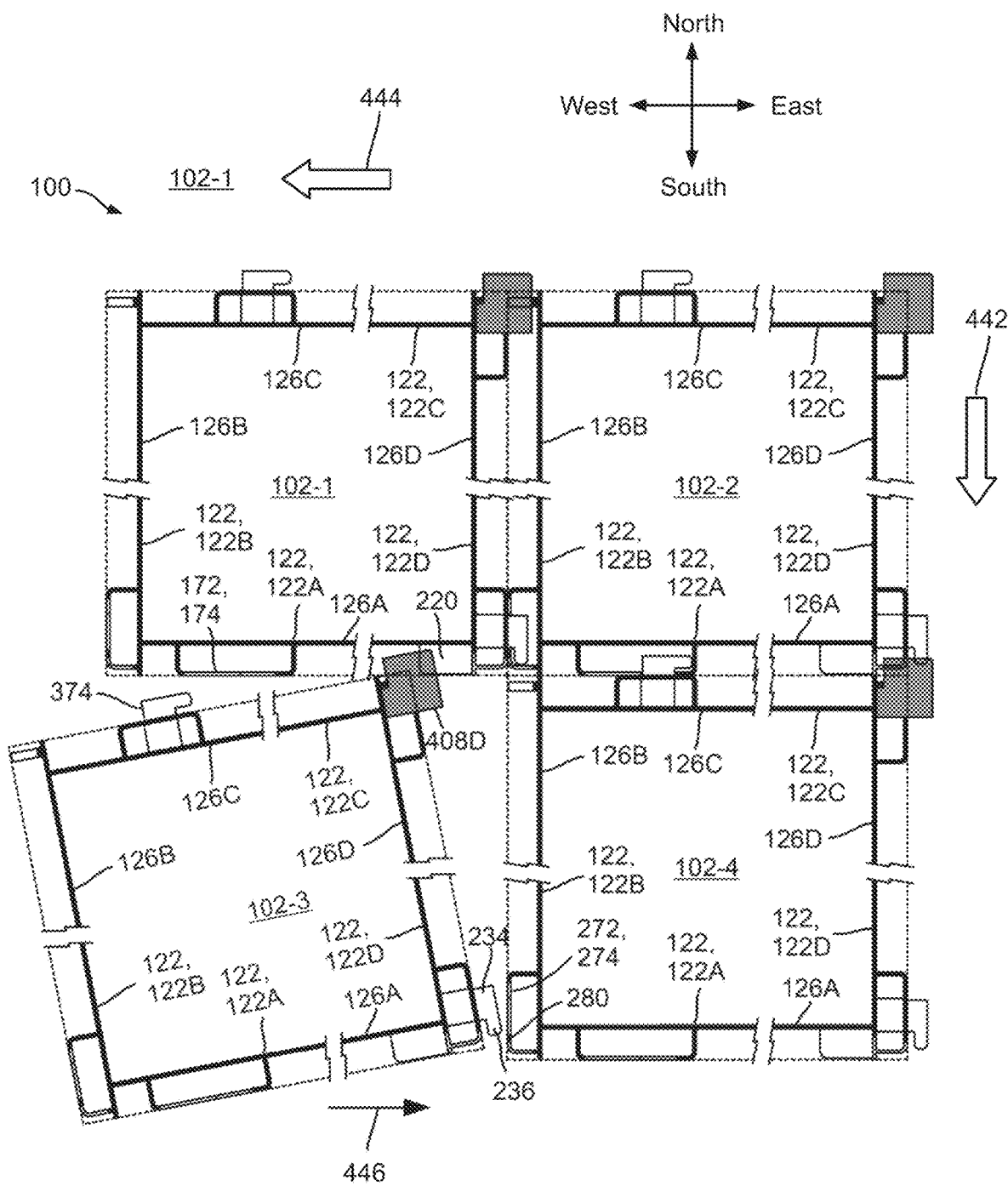

As shown in FIG. 29A, a floor 100 may be assembled using the floor tiles 102 from North to South as indicated by the arrow 442 and from East to West as indicated by the arrow 444.

For example, when adding a new floor tile 102-3 to a partially assembled floor 100 (having at least three engaged tiles 102-1, 102-2, and 102-4), the floor tile 102-3 is first tilted with the Southeast corner lower than the other three corners thereof, and is rotated to arrange the delimiting tongue 408D further away to the floor tile 102-4 than the hook 234. The floor tile 102-3 is moved toward the floor tile 102-4 as indicated by the arrow 446 to insert the hook 234 into the receiving groove 274 of the locking receptacle 272. Then, the floor tile 102-3 is moved slightly South to locate the tip or male locking end 236 of the hook 234 behind the female locking end 280 of the locking receptacle 272.

Figure 29B:
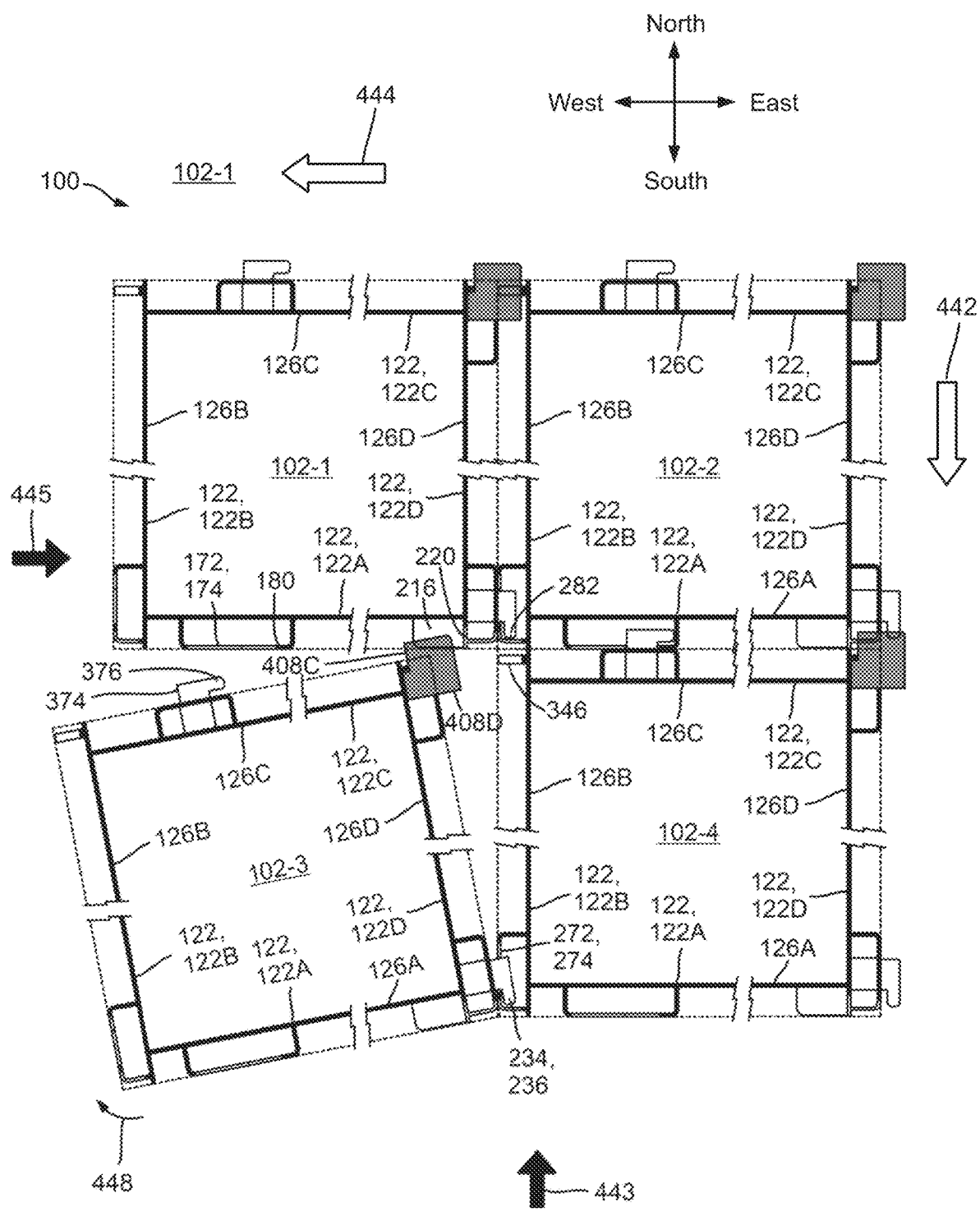
Figure 29C:
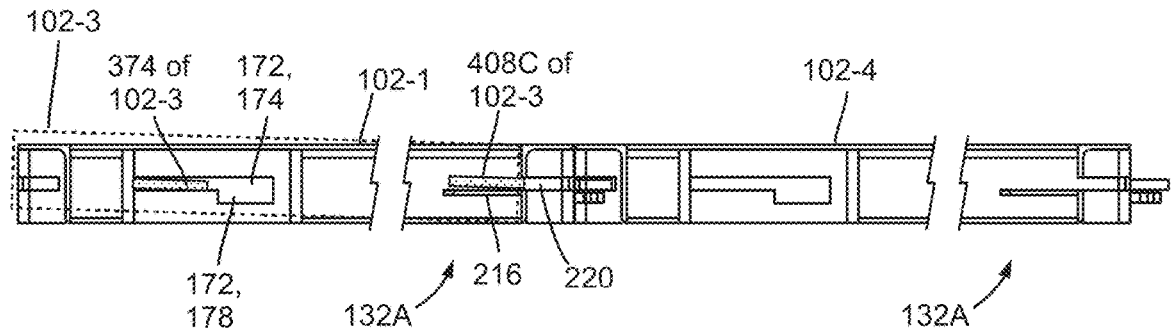
Figure 29D:
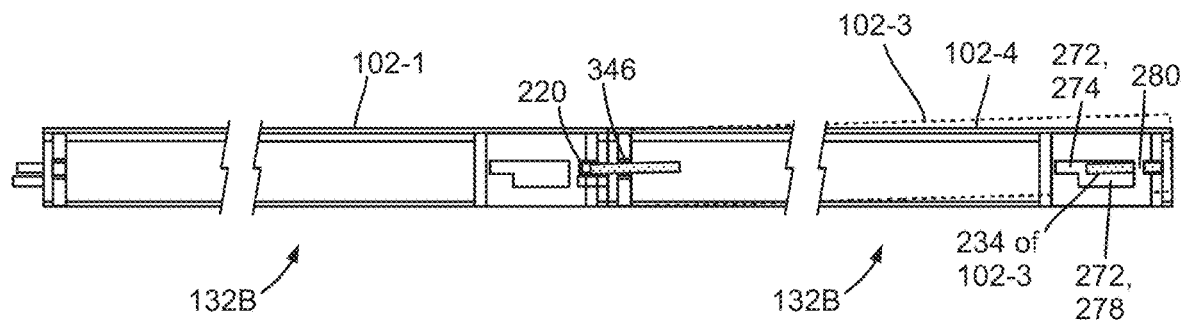

As shown in FIG. 29B, the floor tile 102-3 is tilted with the Northeast corner lower than the other three corners thereof such that:

the hook 374 on the North side of the floor tile 102-3 is aligned with the receiving groove 174 of the locking receptacle 172 on the South side of the floor tile 102-1 (also see FIG. 29C, viewing from the South side of the floor tiles 102-1 to 102-4 shown in FIG. 29A as indicated by the arrow 443 therein); in these embodiments, the receiving groove 174 of the locking receptacle 172 has sufficient size for receiving the tilted hook 374; and the delimiting plate 408 of the floor tile 102-3 is aligned with the delimiting receptacle 220 on the South side of the floor tile 102-1, the securing receptacle 282 on the West side of the floor tile 102-2, and the delimiting receptacle 346 on the West side of the floor tile 102-4 (also see FIG. 29D, viewing from the West side of the floor tiles 102-1 to 102-4 shown in FIG. 29A as indicated by the arrow 445 therein); in these embodiments, the delimiting receptacle 220, the securing receptacle 282, and the delimiting receptacle 346 have sufficient size for receiving the tilted delimiting plate 408.

Then, the tilted floor tile 102-3 is rotated about the hook 234 towards the assembled floor tiles 102-1, 102-2, and 102-4 as indicated by the arrow 448, and at the same time, gradually level the floor tile 102-3 to:

insert the hook 374 into the locking receptacle 172, move the tip or male locking end 376 behind the female locking end 180, and move the hook 374 downwardly (manually or caused by the weight of the floor tile 102-3 (i.e., caused by gravity)) into the locking notch 178 of the locking receptacle 172;

position the delimiting plate 408 into the delimiting receptacle 220, the securing receptacle 282, and the delimiting receptacle 346; and move the tip or male locking end 236 of the hook 234 downwardly (manually or caused by the weight of the floor tile 102-3 (i.e., caused by gravity)) into the locking notch 278 of the locking receptacle 272.

Figure 29E:
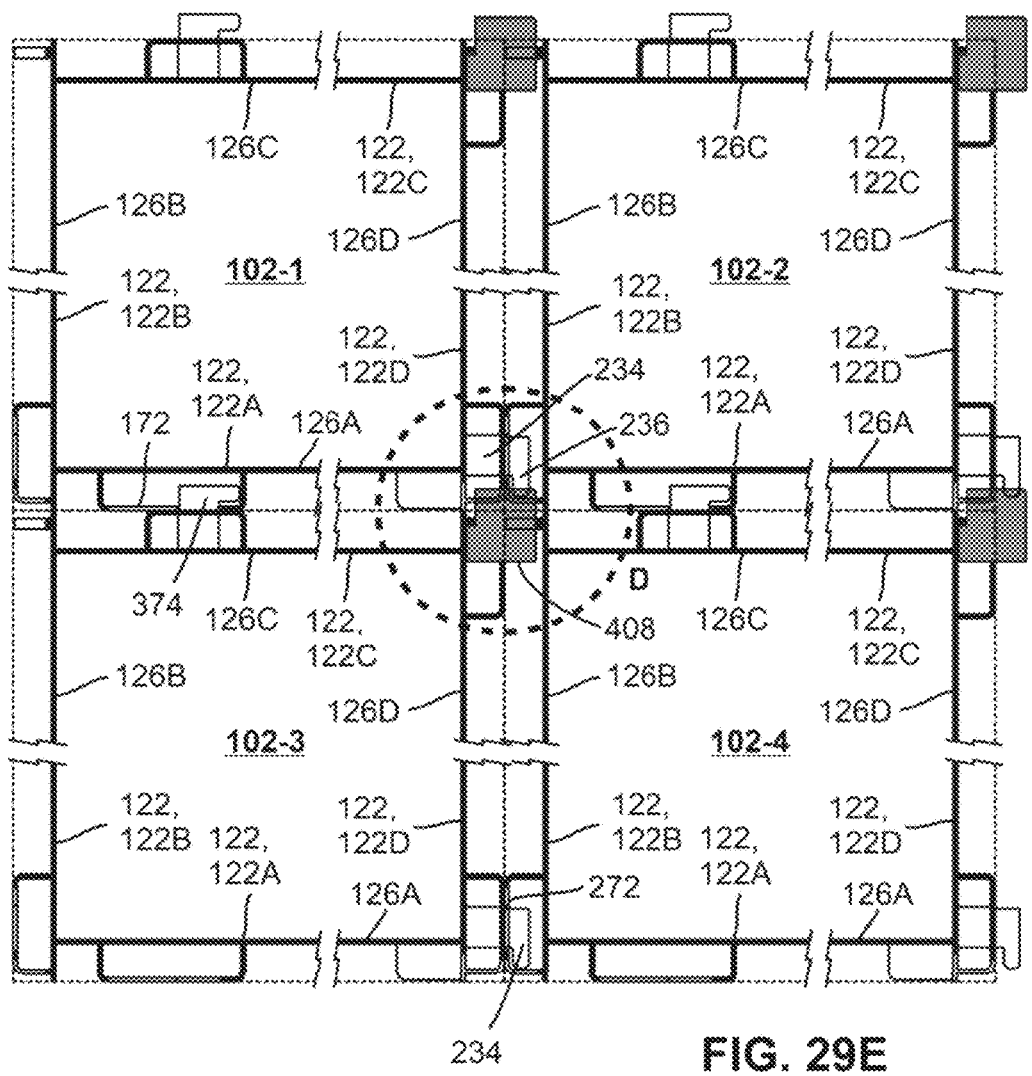
Figure 29F:
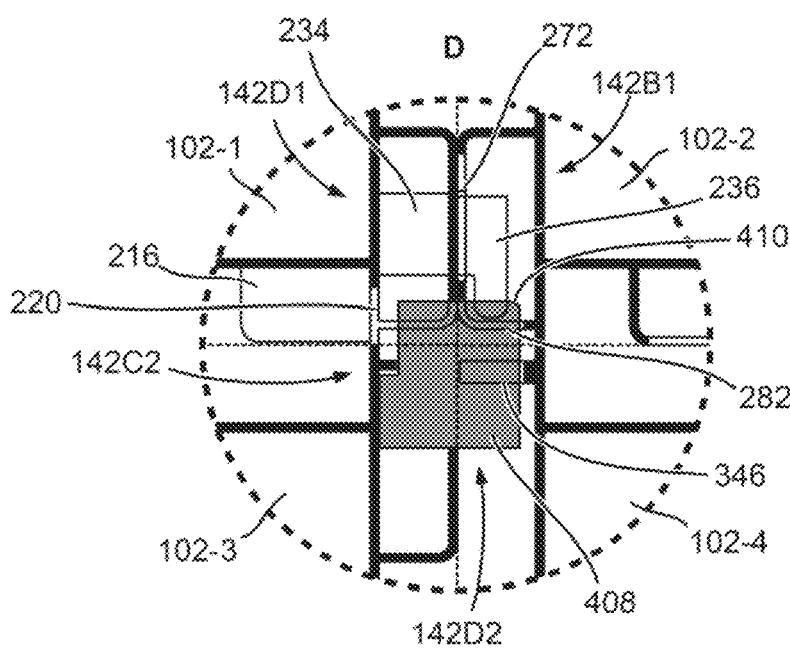

As shown in FIGS. 29E and 29F, the tile 102-3 is coupled to the floor 102-1 with the hook 374 locked in the locking receptacle 172 of the floor tile 102-1, the hook 234 locked in the locking receptacle 272 of the floor tile 102-4, and the delimiting plate 408 received in the delimiting receptacles 220 (of the floor tile 102-1) and 346 (of the floor tile 102-4) for vertical alignment of the floor tiles 102-1, 102-3, and 102-4.

As shown in FIG. 29F, the securing end 410 of the delimiting plate 408 (of the floor tile 102-3) is also inserted through the securing receptacle 282 of the floor tile 102-2 and positioned vertically overlapping (for example, above) the male locking end 236 of the hook 234 of the floor tile 102-1 and thus preventing vertical (for example, upward) movement of the male locking structure 142D1 of the floor tile 102-1 from the locking notch 178 of the locking receptacle 172 of the floor tile 102-1, thereby preventing the male locking end 236 of the male locking structure 142D1 of the floor tile 102-1 vertically moving from the locking notch 278 of the locking receptacle 272 of the floor tile 102-2 into the receiving groove 274 thereof and disengaging with the female locking end 280 of the locking receptacle 272 of the floor tile 102-2.

Thus, the delimiting plate 408 (of the floor tile 102-3) is also a male securing structure for inserting through the female securing structure 282 (of the floor tile 102-2) into the locking receptacle 272 (of the floor tile 102-2) to prevent the male locking structure 142D1 (of the floor tile 102-1) from vertically moving from the locking notch 278 (of the floor tile 102-2) into the locking receptacle 272 (of the floor tile 102-2) and disengaging with the female locking structure 142B1 (of the floor tile 102-2). Such a relative vertical movement between the male locking structure 142D1 (of the floor tile 102-1) and the female locking structure 142B1 (of the floor tile 102-2) may be triggered by accidental events such as earthquakes and may cause disengagement of the male locking structure 142D1 (of the floor tile 102-1) and the female locking structure 142B1 (of the floor tile 102-2). By using the male securing structure (of the floor tile 102-3) and the female securing structure 282 (of the floor tile 102-2) described herein, such accidental relative vertical movement is then prevented and thereby preventing the disengagement of the male locking structure 142D1 (of the floor tile 102-1) and the female locking structure 142B1 (of the floor tile 102-2).

Figure 30A:
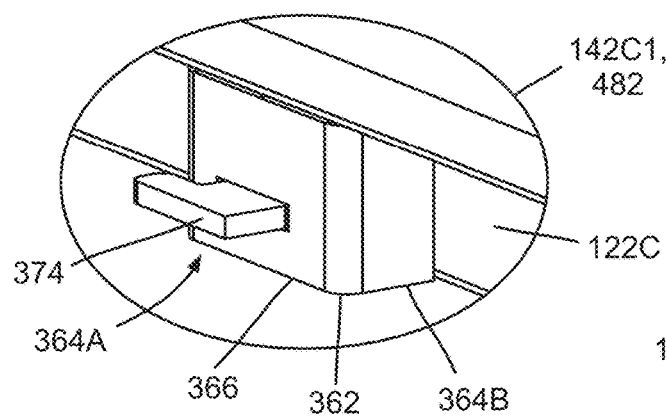
FIG. 30A is a perspective view of a male locking structure.
Figure 30B:
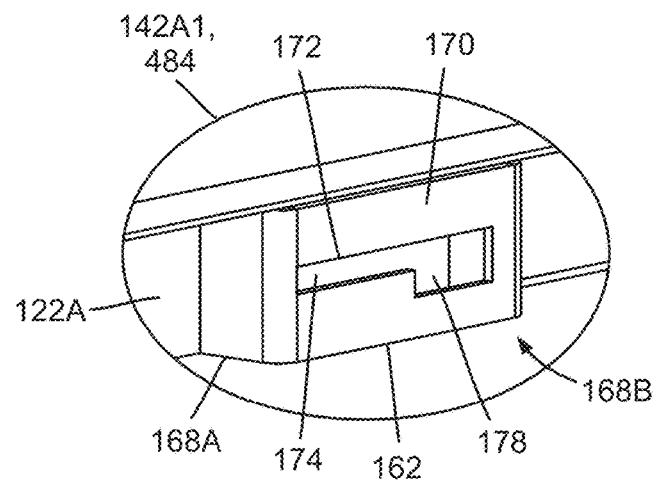
FIG. 30B is a perspective view of a female locking structure.
Figure 30C:
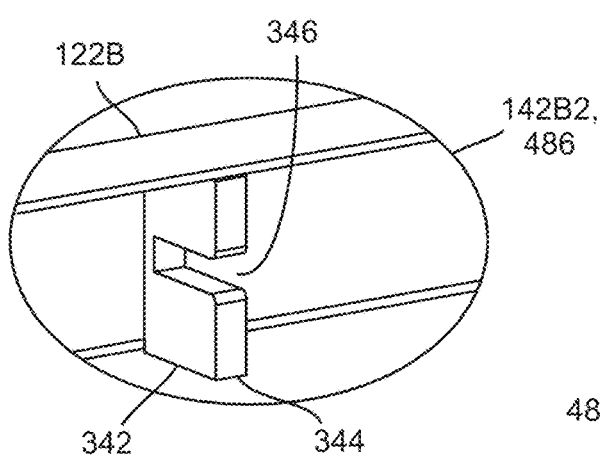
FIG. 30C is a perspective view of a female delimiting structure.
Figure 30D:
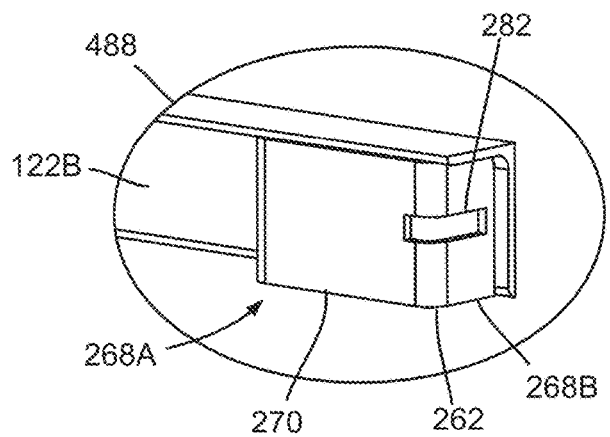
FIG. 30D is a perspective view of another female delimiting structure.
Figure 30E:
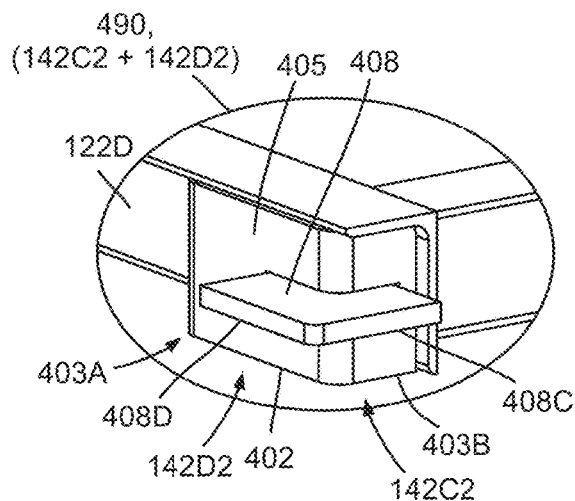
FIG. 30E is a perspective view of a delimiting-plate corner structure.
Figure 30F:
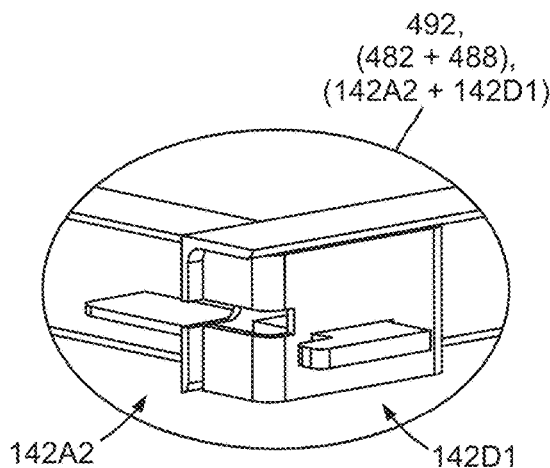
FIG. 30F is a perspective view of a composite corner structure.
Figure 30G:
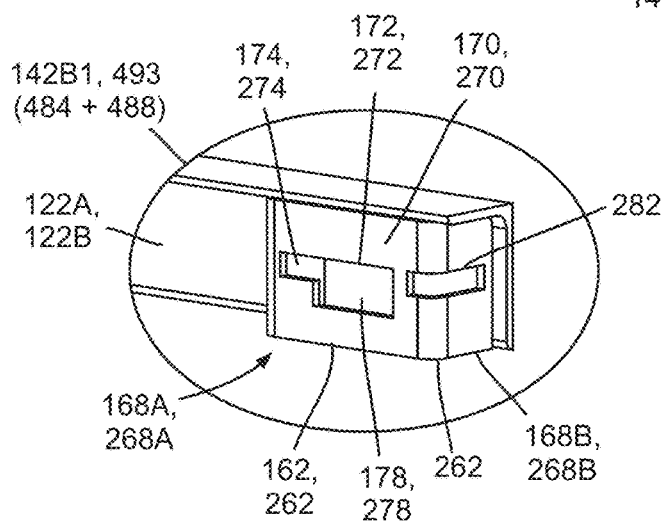
FIG. 30G is a perspective view of a female locking and delimiting structure.

In above embodiments, various types of male locking structures, female locking structures, male delimiting structures (also denoted "delimiting tongue structures" hereinafter), and female delimiting structures are used, which are summarized in FIGS. 30A to 30F (using new reference numbers), including:

a male locking structure 142C1 (also identified using reference numeral 482 hereinafter) comprising a U-shape bracket 362 having two legs 364A and 364B thereof coupled to a structural bar (for example, the structural bar 122C), and a plate-form hook 374 coupled to the structural bar 122C at a position between the two legs 364A and 364B of the U-shape bracket 362 and extending out of the body 366 of the U-shape bracket 362 (FIG. 30A) such that the U-shape bracket 362 provides support to the plate-form hook 374 for improved strength;

a female locking structure 142A1 (also identified using reference numeral 484 hereinafter) comprising a U-shape bracket 162 having two legs 168A and 168B thereof coupled to a structural bar (for example, the structural bar 122A), wherein the body 170 of the U-shape bracket 162 comprises a "step"-structured window or receptacle 172 on the body 170 thereof, wherein the receptacle 172 comprises a receiving groove 174 and a locking notch 178 under the receiving groove 174, the notch 178 has a width smaller than that of the receiving groove 174 (FIG. 30B);

a female delimiting structure 142B2 (also identified using reference numeral 486 hereinafter) comprising a vertical plate 342 extending from a structural bar (for example, the structural bar 122B) and having a delimiting notch 346 on the outer edge 344 thereof forming a delimiting receptacle (FIG. 30C);

a female securing structure 488 (which is used in composite structures described below) comprising a U-shape bracket 262 having two legs 268A and 268B thereof coupled to a structural bar (for example, the structural bar 122B) with a securing window, groove, or receptacle 282 extending from the body 270 of the U-shape bracket 488 to an outer leg 268B thereof (FIG. 30D);

a delimiting-plate corner structure 490 (which is a combination of the male delimiting structures 142C2 and 142D2) comprising a U-shape bracket 402 having two legs 403A and 403B thereof coupled to a structural bar (such as the structural bar 122D) about or at an end thereof, and a plate 408 coupled to the structural bar 122D and longitudinally outwardly and laterally outwardly extending out of the U-shape bracket 402 (from the body 405 and an outer leg 403B thereof) forming two delimiting tongue structures 408C and 408D on the longitudinal and lateral sides of the delimiting-plate corner structure 490 (FIG. 30E).

a composite corner structure 492 (which is a combination of the male locking structure 482 and the female delimiting structure 488, or a combination of the female delimiting structure 142A2 and the male locking structure 142D1) comprises a U-shape bracket about or at an end of a structural bar with a hook coupled to a structural bar and extending out of the body of a U-shape bracket forming a hook structure at one side of the corner structure 492, and a delimiting notch or window on the end of the structural bar forming a delimiting receptacle at the other side of the composite corner structure 492 and adjacent a horizontal guide (FIG. 30F); and a composite female locking and delimiting structure 142B1 (also identified using reference numeral 493 hereinafter), which is a combination of the female locking structure 484 and the female delimiting structure 488, and comprises a U-shape bracket 262 having two legs 268A and 268B thereof coupled to a structural bar (for example, the structural bar 122B), wherein the body 270 of the U-shape bracket 142A1 comprises a "step"-structured window or receptacle 272 and a securing window or receptacle 282 on the body 270 thereof, wherein the receptacle 272 comprises a groove or receiving groove 274 and a notch or locking notch 278 under the receiving groove 274, the locking notch 278 has a width smaller than that of the receiving groove 274, and wherein the components 262, 268A, 268B, 270, 272, 274, and 278 are equivalent to the components 162, 168A, 168B, 170, 172, 174, and 178 shown in FIG. 30B.

Those skilled in the art will appreciate that, in various embodiments, other types of hook structures, locking receptacles, delimiting tongues, and delimiting receptacles are readily available.

Figure 31A:
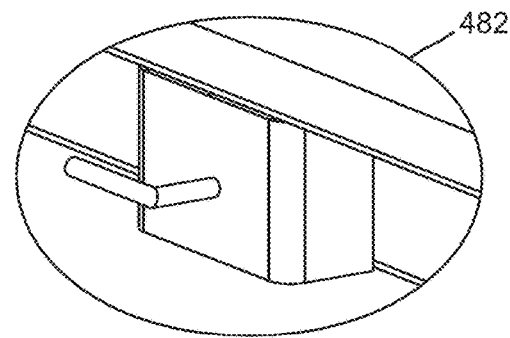
FIG. 31A is a perspective view of a male locking structure, according to some embodiments of this disclosure.

For example, instead of using a plate-form hook, the male locking structure 482 in some embodiments shown in FIG. 31A comprises a hook made of a bent rod with a round cross-section.

Figure 31B:
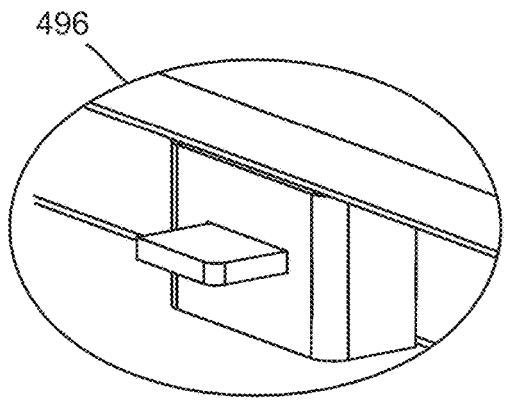
FIG. 31B is a perspective view of a male delimiting structure, according to some embodiments of this disclosure.

FIG. 31B shows a male delimiting structure 496 in some embodiments (which may be used to replace the male delimiting structure 142D2) which comprises a U-shape bracket and a plate hook coupled to a structural bar and extending out of the body of the U-shape bracket thereby forming a delimiting tongue.

Figure 31C:
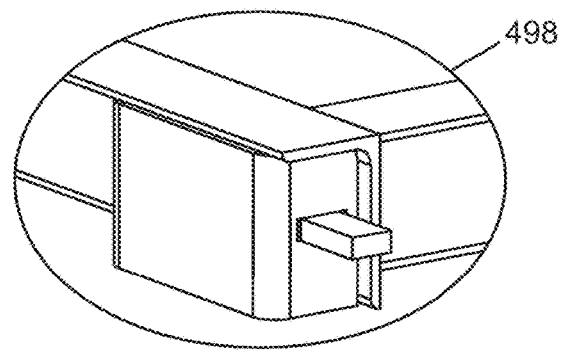
FIG. 31C is a perspective view of another male delimiting structure, according to some embodiments of this disclosure.

FIG. 31C shows a male delimiting structure 498 in some embodiments (which may be used to replace the male delimiting structure 142C2) which comprises a U-shape bracket and a plate hook coupled to a structural bar and extending out of an outer leg of the U-shape bracket thereby forming a delimiting tongue.

The combination of the male delimiting structures 496 and 498 may be used to replace the plate 408.

Figure 31D:
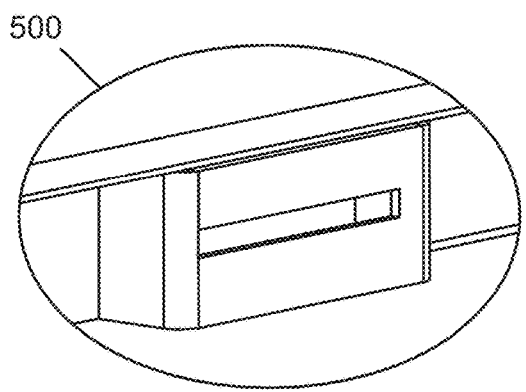
FIG. 31D is a perspective view of a female delimiting structure, according to some embodiments of this disclosure.

FIG. 31D shows a female delimiting structure 500 in some embodiments which comprises a U-shape bracket and a window or receptacle horizontally extending on the body of the U-shape bracket.

Figure 31E:
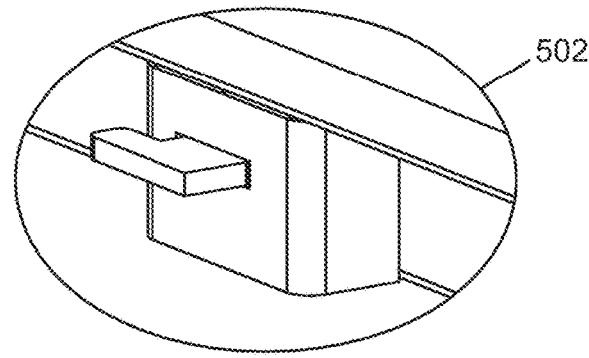
FIG. 31E is a perspective view of another male delimiting structure, according to some embodiments of this disclosure.
Figure 32A:
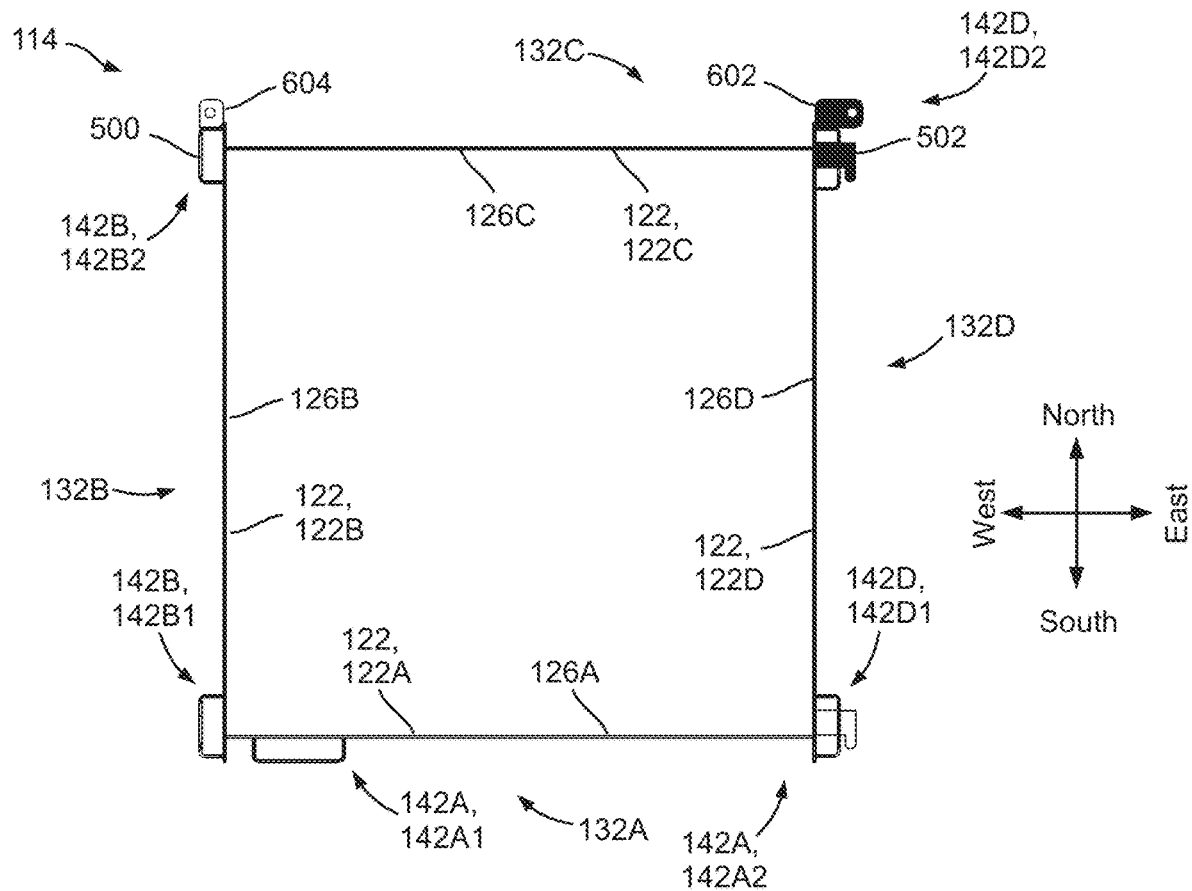
FIG. 32A is a cross-sectional view of a floor-tile frame structure, according to some embodiments of this disclosure.
Figure 32B:
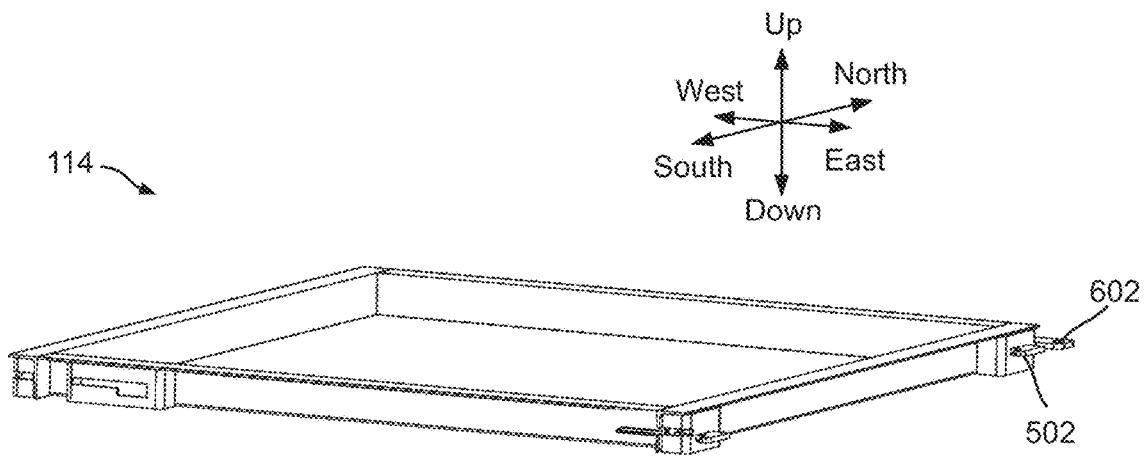
FIGS. 32B to 32D are perspective views of the floor-tile frame structure shown in FIG. 32A, view from different corners thereof.
Figure 32C:
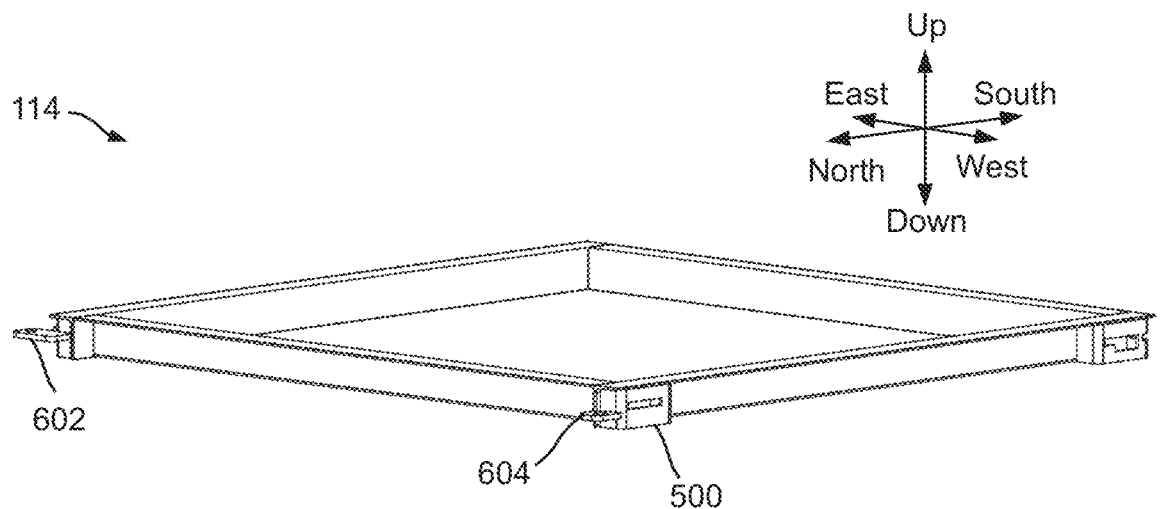
Figure 32D:
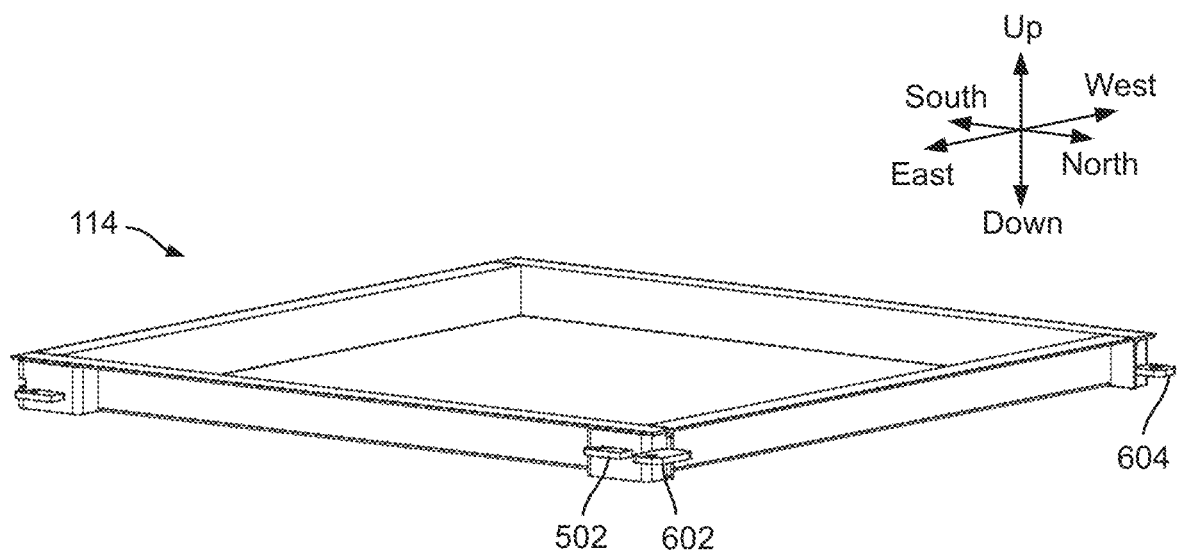

FIG. 31E shows a male delimiting structure 502 with the locking functionality, according to some embodiments of this disclosure. The male delimiting structure 502 comprises a U-shape bracket and a plate-form hook coupled to a structural bar and extending out of the body of the U-shape bracket thereby forming a hook-style delimiting tongue with a locking function. Compared to the male locking structure 482, the hook-style delimiting tongue is located at an elevation higher than the hook of the male locking structure 482.

Those skilled in the art will appreciate that various types of male locking structures, female locking structures, delimiting tongue structures, and female delimiting structures may be combined as needed. Moreover, floor tiles with different locking and delimiting configurations may be used in a mixed manner for assembling a floor.

For example, FIGS. 32A to 32D show a floor-tile frame structure 114 in some embodiments. The Southwest and Southeast corners of the floor tile frame 114 are the same as those shown in FIG. 4. The Northeast corner comprises a male delimiting structure 502 on the East side with the locking functionality, and a bolting anchor 602 on the North side for bolting together neighboring frame structures 114 and/or bolting the floor tile to a mounting structure. The Northwest corner comprises a female delimiting structure 500 on the West side for receiving and engaging the male delimiting structure 502 and a bolting anchor 604 on the North side for bolting together neighboring frame structures 114 and/or bolting the floor tile to a mounting structure.

Figure 33A:
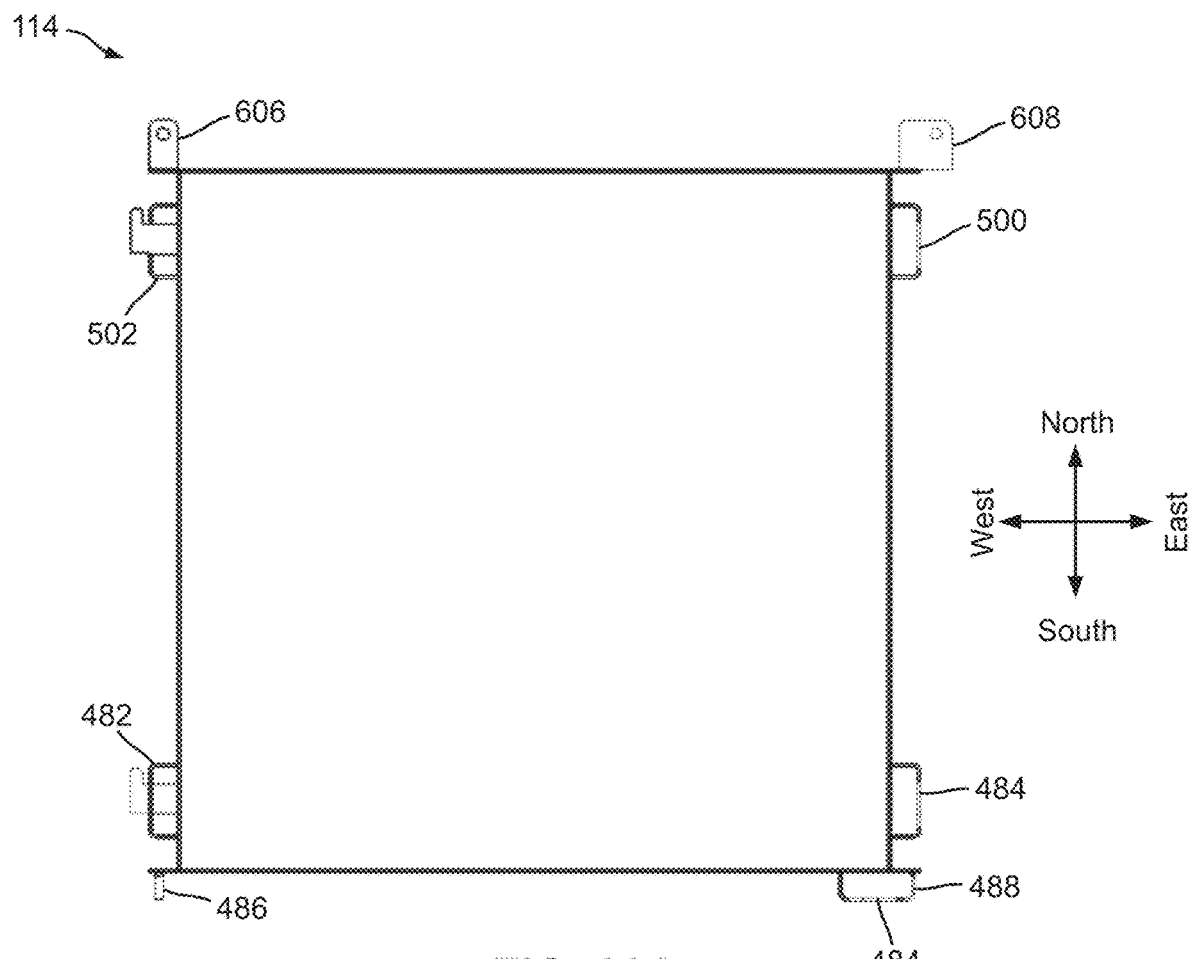
FIG. 33A is a cross-sectional view of a floor-tile frame structure, according to some embodiments of this disclosure.
Figure 33B:
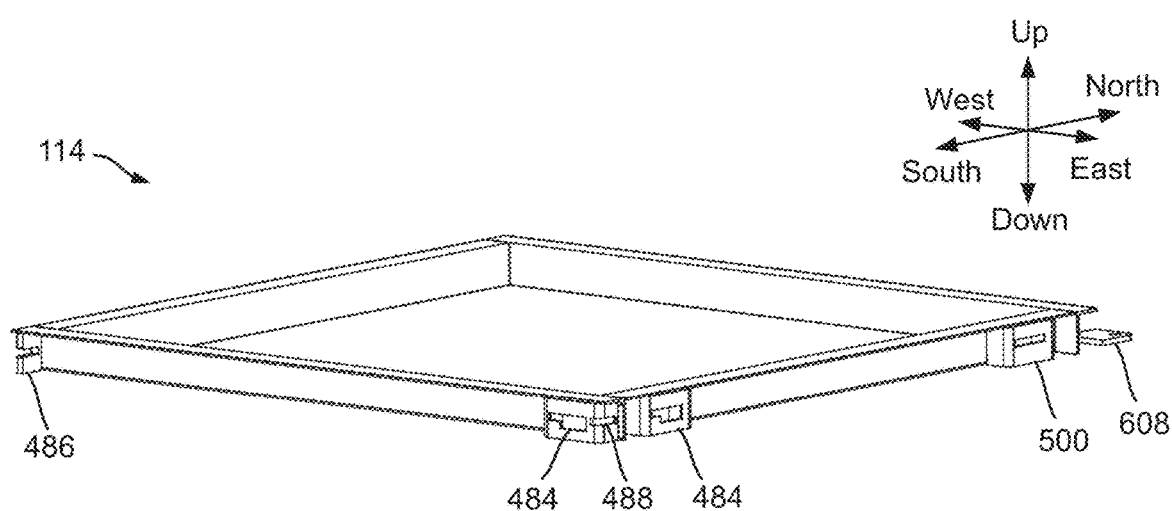
FIGS. 33B and 33C are perspective views of the floor-tile frame structure shown in FIG. 33A, view from different corners thereof.
Figure 33C:
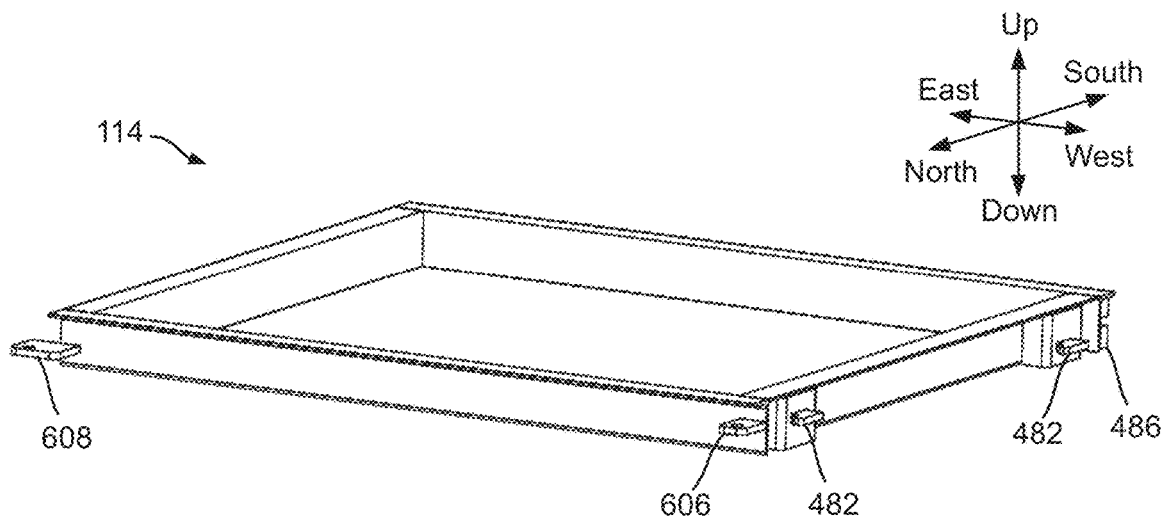

FIGS. 33A to 33C show a frame structure 114 in some other embodiments. In these embodiments, the Southeast corner of the frame structure 114 comprises a combination of a female locking structure 484 and a female delimiting structure 488 on the South side thereof and a female locking structure 484 on the East side. The Southwest corner of the frame structure 114 comprises a female delimiting structure 486 on the South side thereof and a male locking structure 482 on the West side. The Northwest corner of the frame structure 114 comprises a delimiting tongue structure 502 on the West side and a bolting anchor 606 on the North side. The Northeast corner of the frame structure 114 comprises a bolting anchor 608 on the North side and a female delimiting structure 500 on the East side.

Figure 34A:
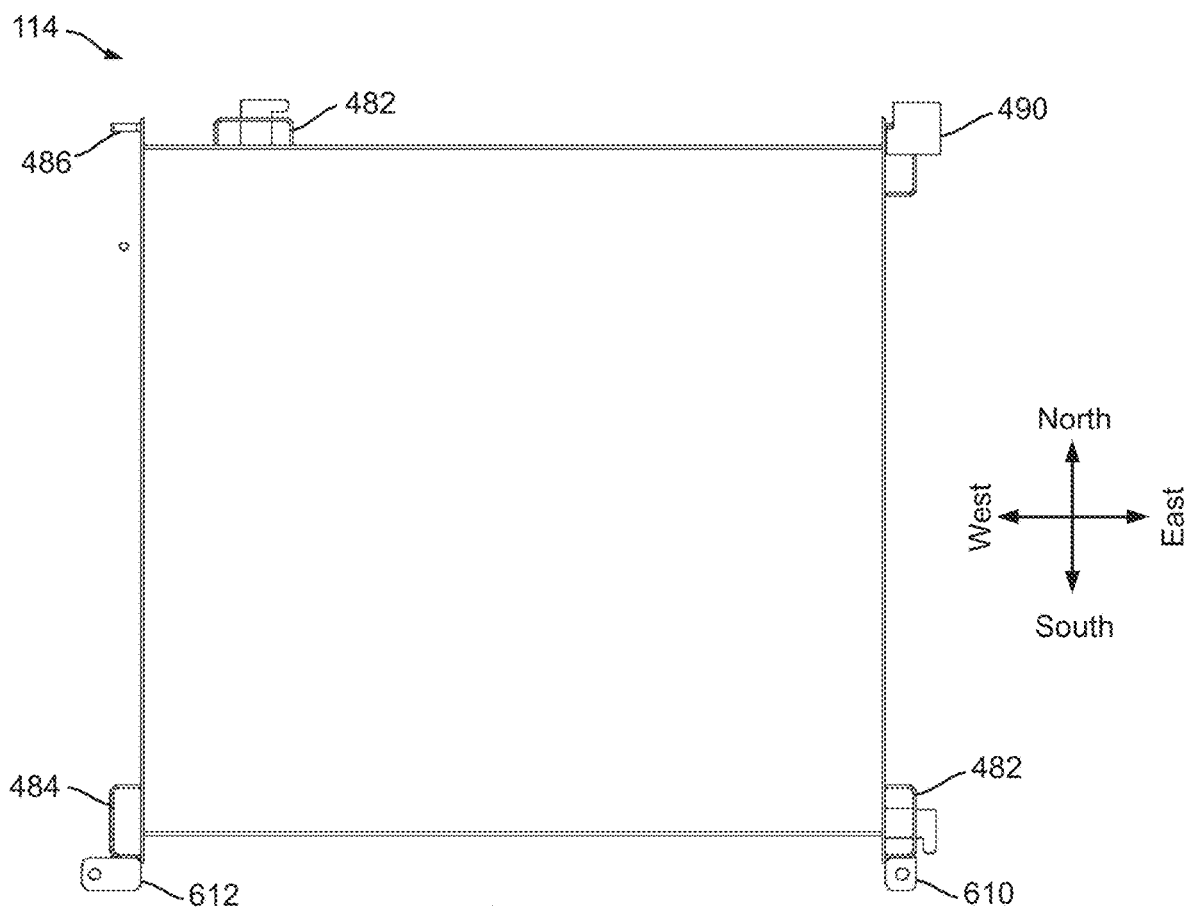
FIG. 34A is a cross-sectional view of a floor-tile frame structure, according to some embodiments of this disclosure.
Figure 34B:
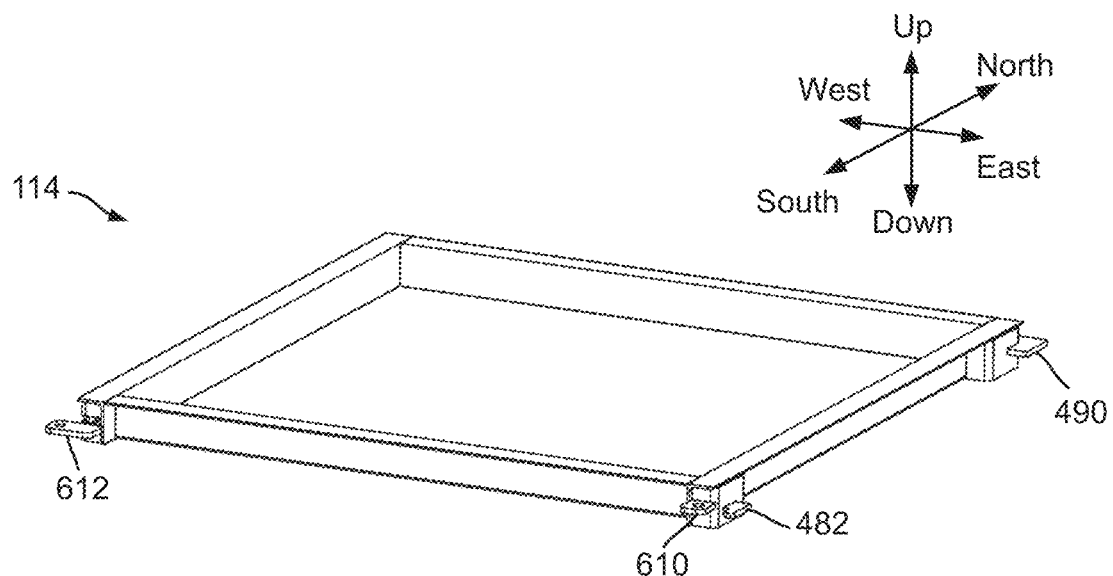
FIGS. 34B and 34C are perspective views of a floor-tile frame structure shown in FIG. 34A, view from different corners thereof.
Figure 34C:
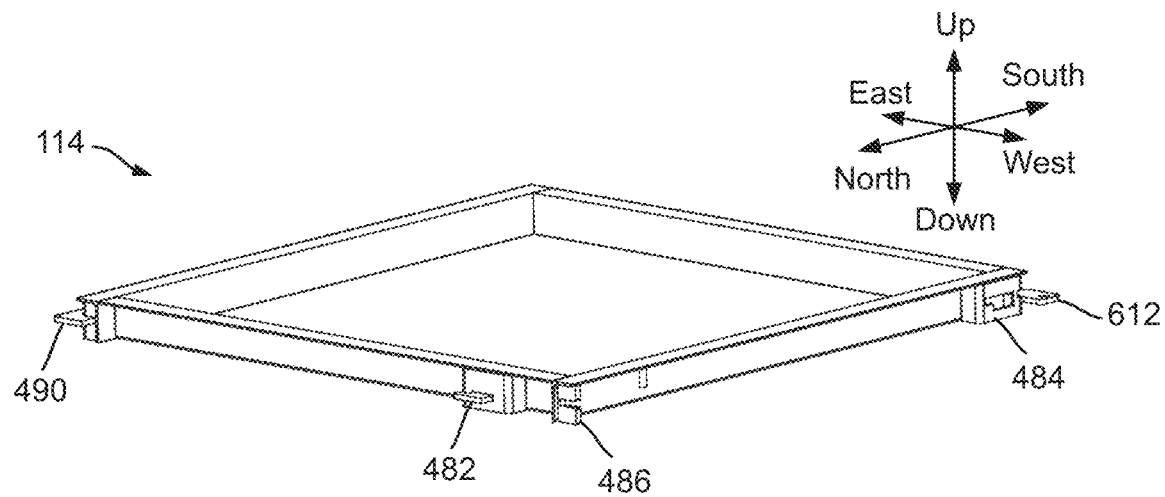

FIGS. 34A to 34C show a frame structure 114 in some other embodiments. In these embodiments, the Southeast corner of the frame structure 114 comprises a bolting anchor 610 on the South side thereof and a male locking structure 482 on the East side. The Southwest corner of the frame structure 114 comprises a bolting anchor 612 on the South side and a female locking structure 484 on the West side. The Northwest corner of the frame structure 114 comprises a female delimiting structure 486 on the West side and a male locking structure 482 on the North side. The Northeast corner of the frame structure 114 comprises a delimiting-plate corner structure 492.

Figure 35A:
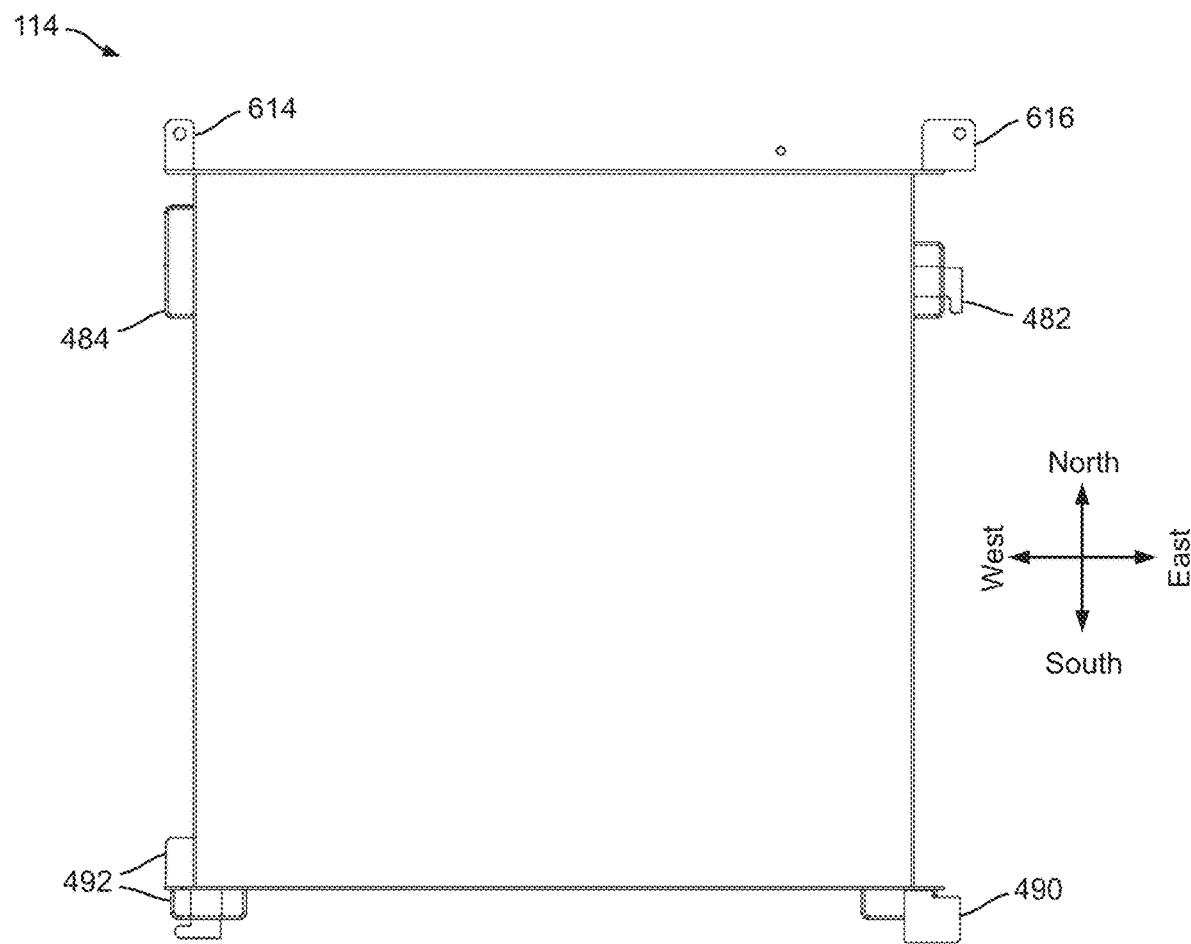
FIG. 35A is a cross-sectional view of a floor-tile frame structure, according to some embodiments of this disclosure.
Figure 35B:
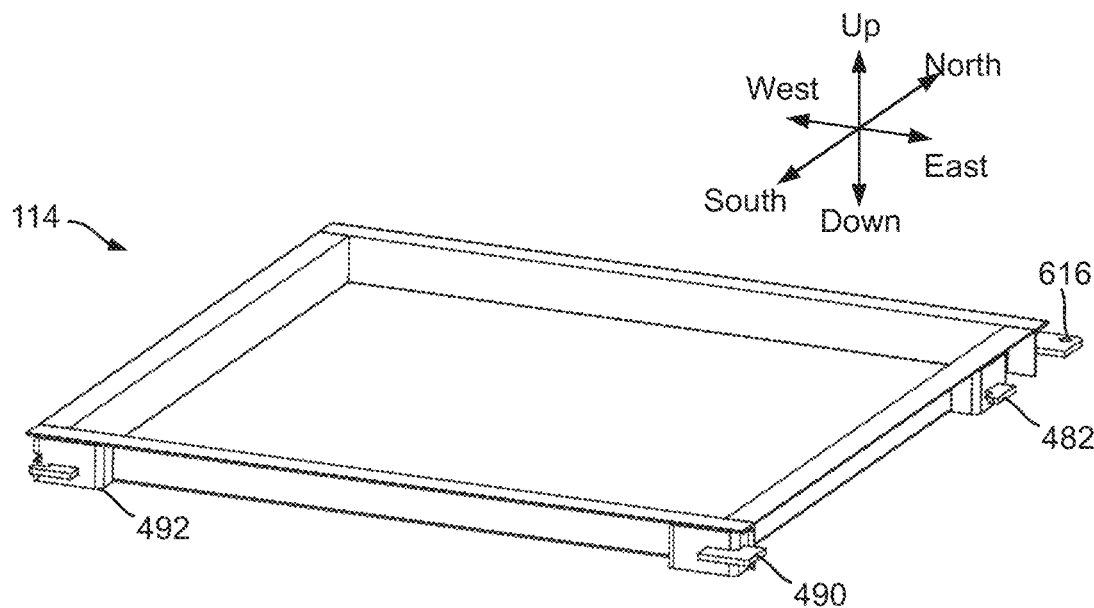
FIGS. 35B and 35C are perspective views of the floor-tile frame structure shown in FIG. 35A, view from different corners thereof.
Figure 35C:
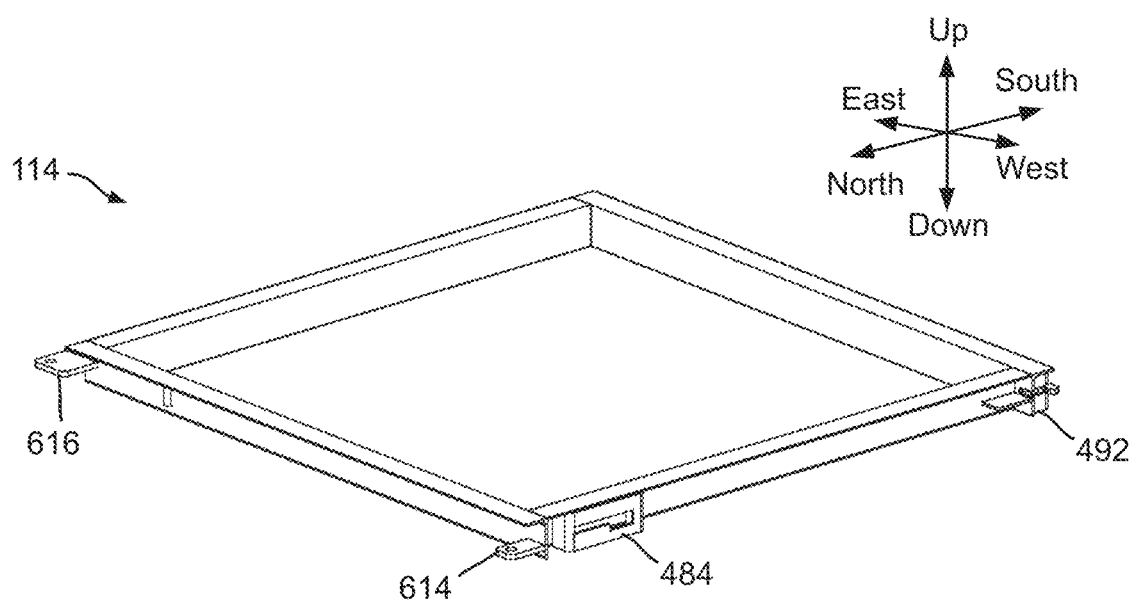

FIGS. 35A to 35C show a frame structure 114 in some other embodiments. In these embodiments, the Southeast corner of the frame structure 114 comprises a delimiting-plate corner structure 492. The Southwest corner of the frame structure 114 comprises a composite corner structure 492. The Northwest corner of the frame structure 114 comprises a female locking structure 484 on the West side and a bolting anchor 614 on the North side. The Northeast corner of the frame structure 114 comprises a bolting anchor 616 on the North side thereof and a male locking structure 482 on the East side.

Those skilled in the art will appreciate that the floor tiles shown in FIGS. 32A to 35C may be used to form the rows and/or columns along the edges of the floor 100.

Those skilled in the art will also appreciate that the floor tiles do not have to be rectangular. In some embodiments, the floor tile 102 may be of a triangular shape comprising a pair of adjacent and orthogonal sides (i.e., a pair of adjacent structural bars 122) corresponding to any pair of adjacent sides of above-described rectangular-shape floor tile, and a third structural bar coupled thereto and forming the hypotenuse side of the floor tile 102.

Figure 36A:
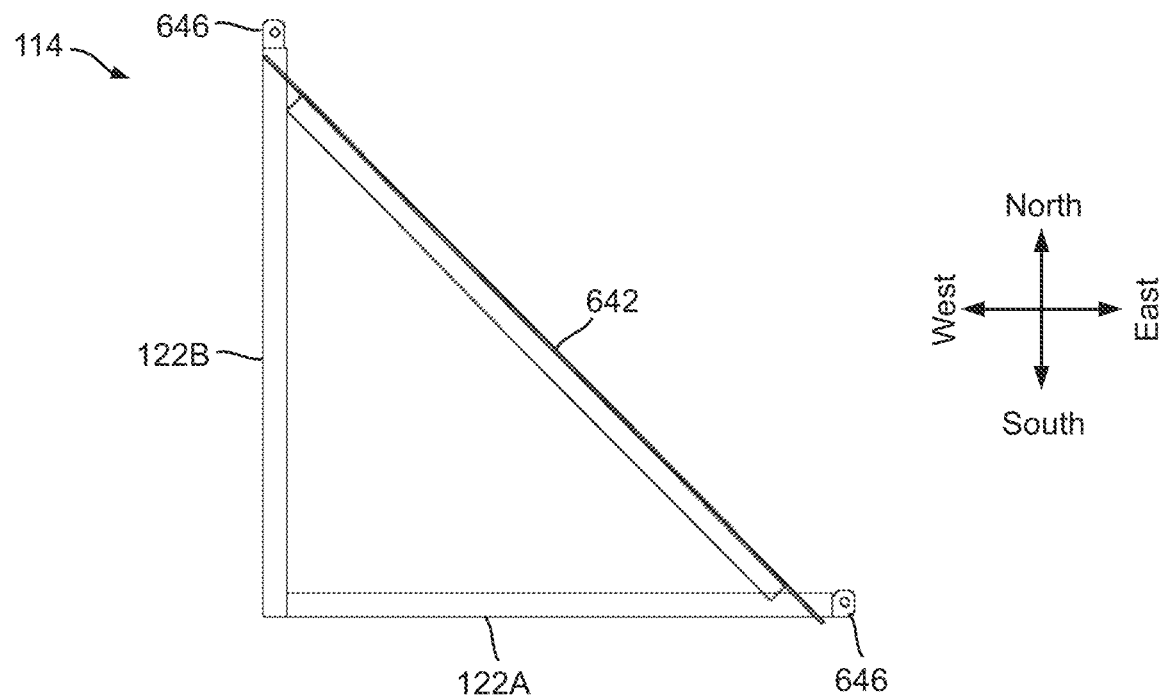
FIG. 36A is a plan view of a triangular-shape frame structure, according to some embodiments of this disclosure.
Figure 36B:
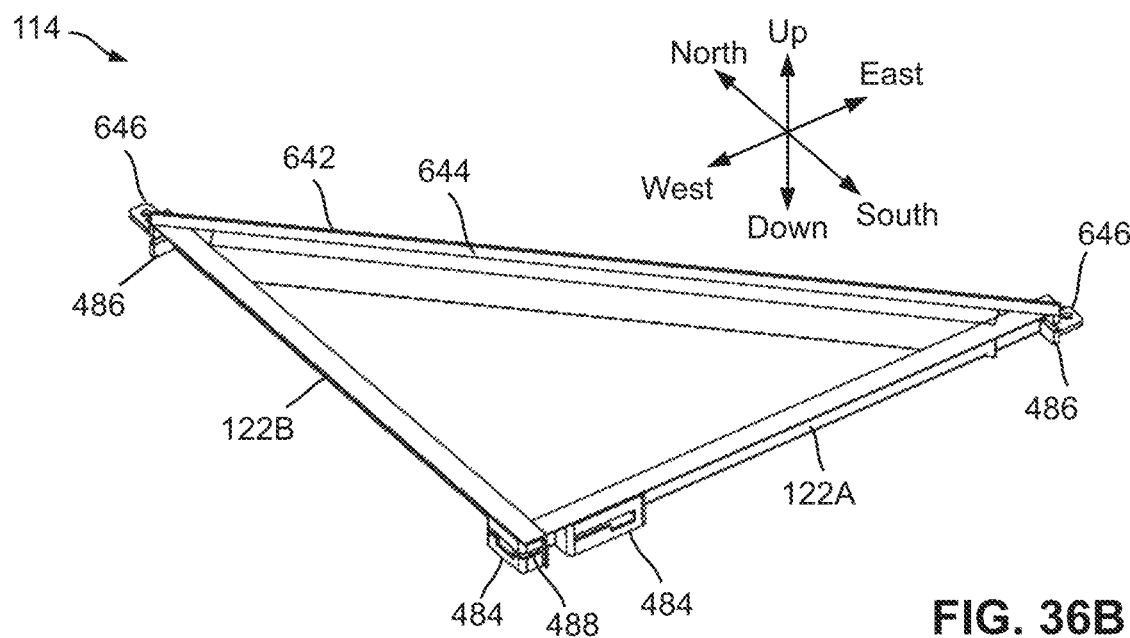
FIG. 36B is a perspective view of the triangular-shape frame structure shown in FIG. 36A.

For example, FIGS. 36A and 36B show a triangular-shape floor-tile frame structure 114 in some embodiments, which comprises a pair of adjacent structural bars 122A and 122B forming the South and West sides of the frame structure 114, and a structural bar 642 coupled to the distal ends of the structural bars 122A and 122B and forming the hypotenuse side of the frame structure 114. The structural bar 642 comprises a raised outer edge 644 for engaging the floor panel component (not shown).

The Southeast corner of the frame structure 114 comprises a female delimiting structure 486 on the South side thereof and a bolting anchor 646 on the East side. The Southwest corner of the frame structure 114 comprises a female locking structure 484 on the South side thereof and a combination of a female locking structure 484 and a female delimiting structure 488 on the West side. The Northwest corner of the frame structure 114 comprises a female delimiting structure 486 on the West side thereof and a bolting anchor 646 on the North side.

Figure 37:
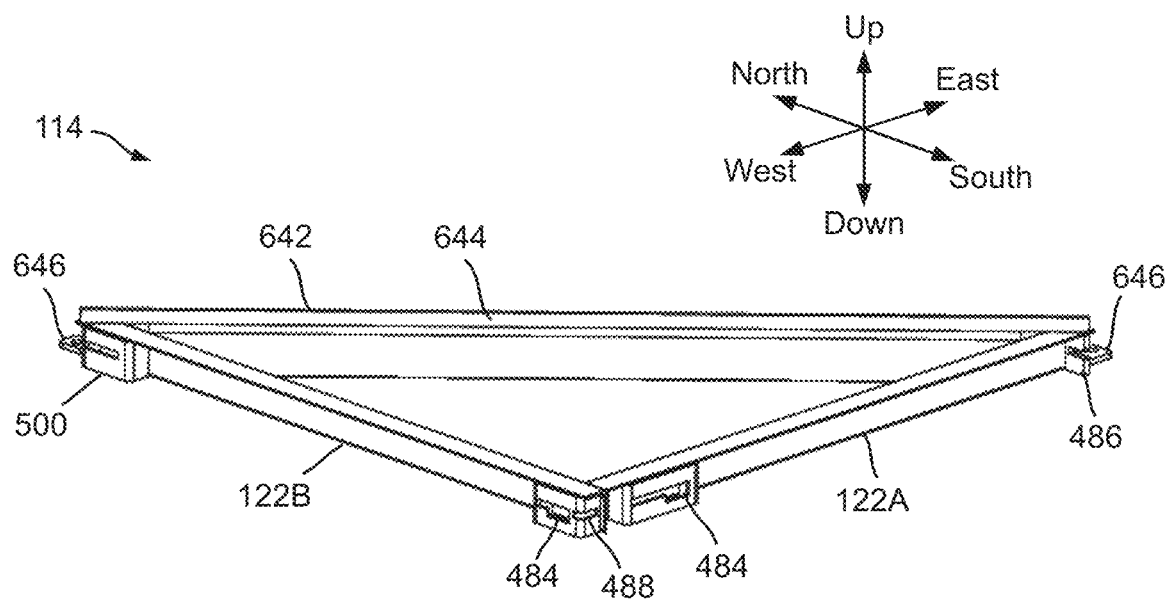
FIG. 37 is a perspective view of a triangular-shape frame structure, according to some embodiments of this disclosure.

FIG. 37 shows a triangular-shape floor-tile frame structure 114 in some embodiments. The frame structure 114 in these embodiments is similar to that shown in FIGS. 36A and 36B except that in these embodiments, the Northwest corner of the frame structure 114 comprises a female delimiting structure 500 (instead of the female delimiting structure 486) on the West side thereof and a bolting anchor 646 on the North side.

Figure 38:
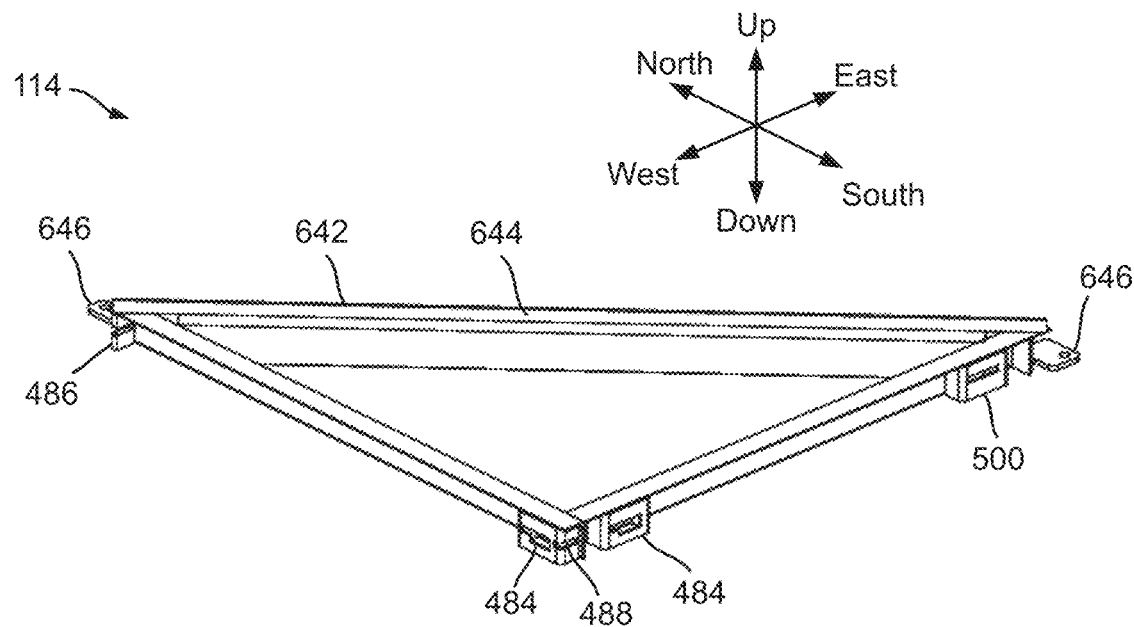
FIG. 38 is a perspective view of a triangular-shape frame structure, according to some other embodiments of this disclosure.

FIG. 38 shows a triangular-shape floor-tile frame structure 114 in some embodiments. The frame structure 114 in these embodiments is similar to that shown in FIG. 37 except that in these embodiments, the Northwest corner of the frame structure 114 comprises a female delimiting structure 486 on the West side thereof and a bolting anchor 646 on the North side, and the Southeast corner of the frame structure 114 comprises a female delimiting structure 500 on the South side thereof and a bolting anchor 646 on the East side.

Figure 39A:
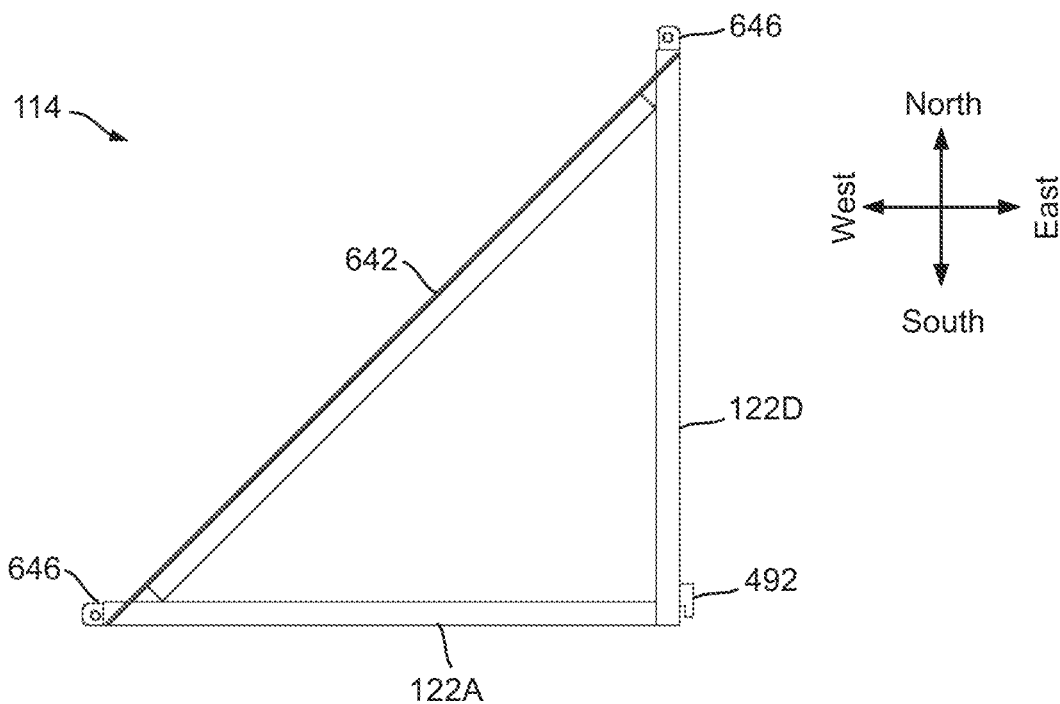
FIG. 39A is a plan view of a triangular-shape frame structure, according to some embodiments of this disclosure.
Figure 39B:
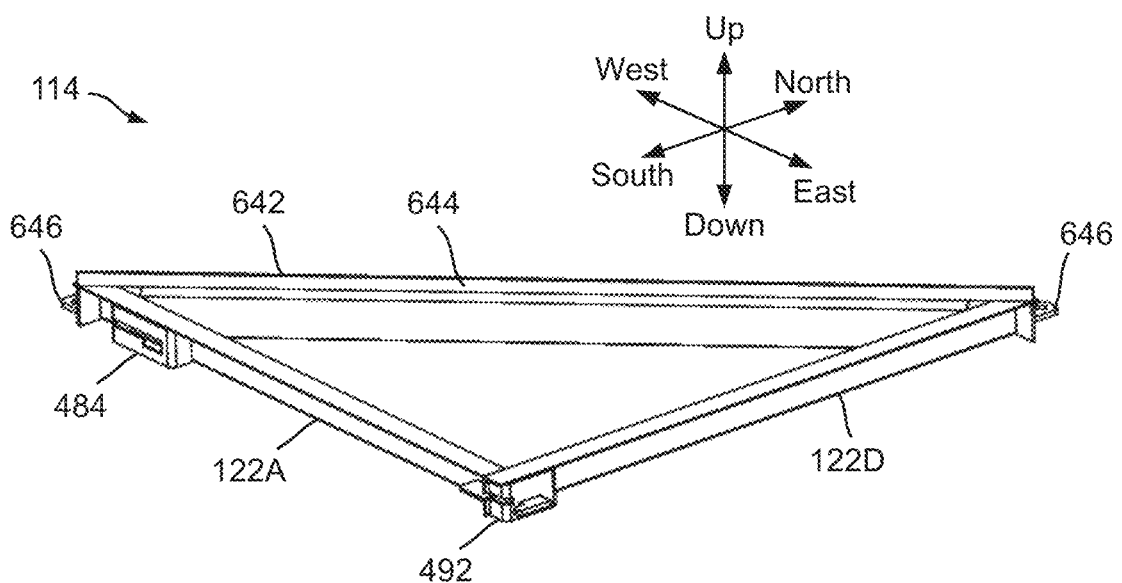
FIG. 39B is a perspective view of the triangular-shape frame structure shown in FIG. 39A.

FIGS. 39A and 39B show a triangular-shape floor-tile frame structure 114 in some embodiments, which comprises a pair of adjacent structural bars 122A and 122D forming the South and East sides of the frame structure 114, and a structural bar 642 coupled to the distal ends of the structural bars 122A and 122D and forming the hypotenuse side of the frame structure 114. The structural bar 642 comprises a raised outer edge 644 for engaging the floor panel component (not shown).

The Southeast corner of the frame structure 114 comprises a composite corner structure 492. The Southeast corner of the frame structure 114 comprises a bolting anchor 646 on the West side thereof and a female locking structure 484 on the South side. The Northeast corner of the frame structure 114 comprises a bolting anchor 646 on the North side.

Figure 40:
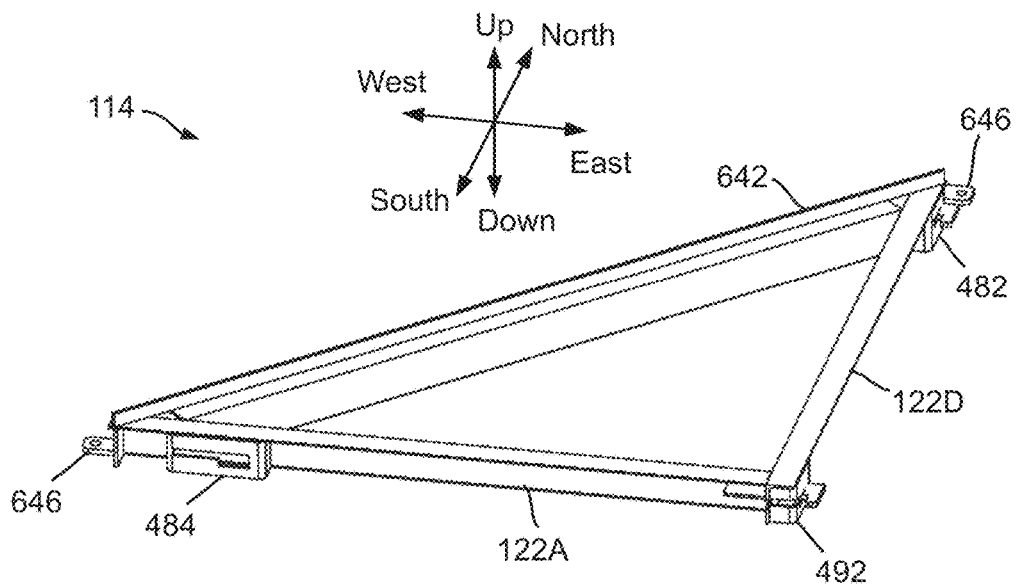
FIG. 40 is a perspective view of a triangular-shape frame structure, according to some embodiments of this disclosure.

FIG. 40 shows a triangular-shape floor-tile frame structure 114 in some embodiments. The frame structure 114 in these embodiments is similar to that shown in FIG. 39A except that in these embodiments, the Northeast corner of the frame structure 114 comprises a bolting anchor 646 on the North side thereof and a male locking structure 482 on the East side.

In above embodiments, the locking structure comprises a male locking structure 482 for engaging with a female locking structure 484. In the hook structure, the hook comprises a tip coupled to a neck portion. As the tip is generally wider than the neck portion, it requires the male locking structure 482 (and thus the corresponding floor tile 102), after the hook is received into the receiving portion of the female locking structure 484, to move forward (i.e., towards the tip) and then move downward to position the hook into the locking portion of the female locking structure 484 with the neck portion of the hook engaging the shoulder of the receiving portion. Such a forward movement may cause difficulty in assembling the floor 102.

Figure 41A:
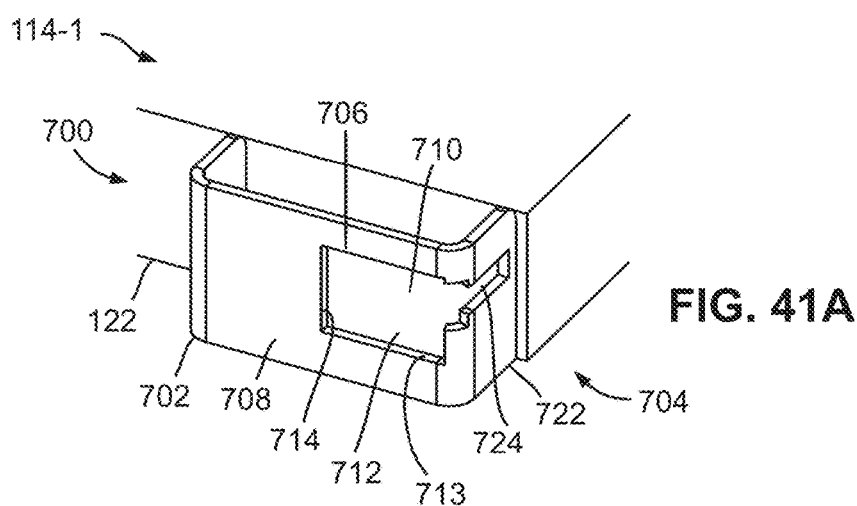
FIG. 41A is a perspective view of a female locking structure of a first floor-tile frame structure, according to some embodiments of this disclosure.
Figure 41B:
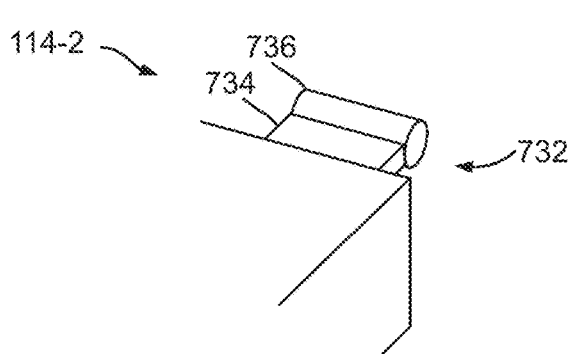
FIG. 41B is a perspective view of a male locking structure of a second floor-tile frame structure for engaging with the female locking structure of the first floor-tile frame structure shown in FIG. 41A.
Figure 41C:
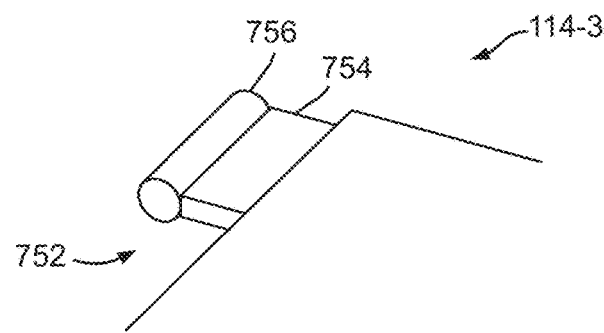
FIG. 41C is a perspective view of a securing structure of a third floor-tile frame structure for engaging with the female locking structure of the first floor-tile frame structure shown in FIG. 41A.

FIGS. 41A to 41C shows a locking mechanism in some embodiments. FIG. 41A shows a female locking structure 700 of a first floor-tile frame structure 114-1 in these embodiments, which comprises a U-shape bracket 702 coupled to a structural bar 122 about or at an end 704 thereof. The U-shape bracket 702 comprises a locking window or receptacle 706 on the body 708 thereof. The locking receptacle 706 comprises a receiving groove 710 and a locking notch 712 thereunder. The bottom edge 713 forms the female locking end of the locking receptacle 706. The width of the receiving groove 710 is greater than that of the locking notch 712 thereby forming a shoulder 714. The receiving groove 710 extends to the outer leg 722 of the U-shape bracket 702 and form a securing window or receptacle 724 (also called a female securing structure) on the outer leg 722 adjacent the locking receptacle 706 of the female locking structure 700.

As shown in FIG. 41B, a second floor-tile frame structure 114-2 comprises a male locking structure 732 at a position suitable for engaging the female locking structure 700 of a first floor-tile frame structure 114-1. The male locking structure 732 comprises a locking tongue 734 with a vertically expanded male locking end 736 on a distal side of the locking tongue 734. The vertically expanded male locking end 736 may be, for example, a rod (such as a cylindrical rod) with a diameter or thickness greater than the thickness of the locking tongue 734 and having a circular or alternatively chamfered side surface coupling to the locking tongue 734, thereby forming one or more circular or alternatively chamfered shoulders between the locking tongue 734 and the vertically expanded male locking end 736. Although not shown, the male locking structure 732 may also comprise a U-shape bracket with the locking tongue 734 extending therethrough.

As shown in FIG. 41C, a third floor-tile frame structure 114-3 comprises a male securing structure 752 at a position suitable for engaging the securing receptacle 724 of the first floor-tile frame structure 114-1. The male securing structure 752 comprises a securing tongue 754 with a vertically expanded securing end 756 on a distal side of the securing tongue 754. The vertically expanded securing end 756 may be, for example, a rod (such as a cylindrical rod) with a diameter or thickness greater than the thickness of the locking tongue 754 and having a circular or alternatively chamfered side surface coupling to the locking tongue 754, thereby forming one or more circular or alternatively chamfered shoulders between the locking tongue 754 and the vertically expanded securing end 756.

Figure 42A:
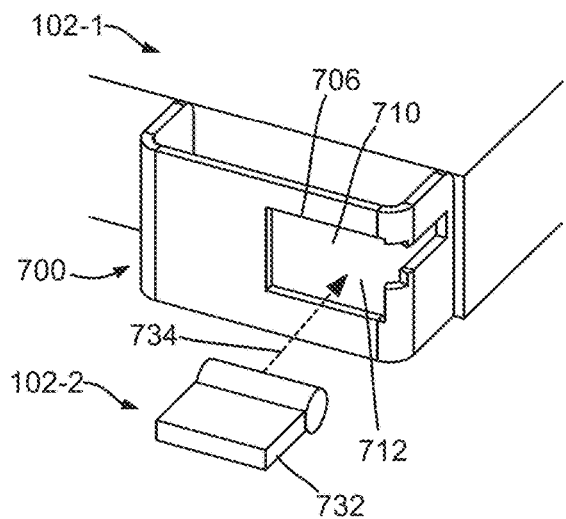
FIGS. 42A to 42D show a process of assembling a floor using the female locking structure, the male locking structure, and the securing structure shown in FIGS. 41A to 41C.

As shown in FIG. 42A, to engage the three floor tiles, the male locking structure 732 of the second floor tile 102-2 is aligned with the section of the receiving groove 710 of the first floor tile 102-1 that is above the locking notch 712. The male locking structure 732 of the second floor tile 102-2 is then moved into the receiving groove 710 of the first floor tile 102-1 as indicated by the arrow 734.

Figure 42B:
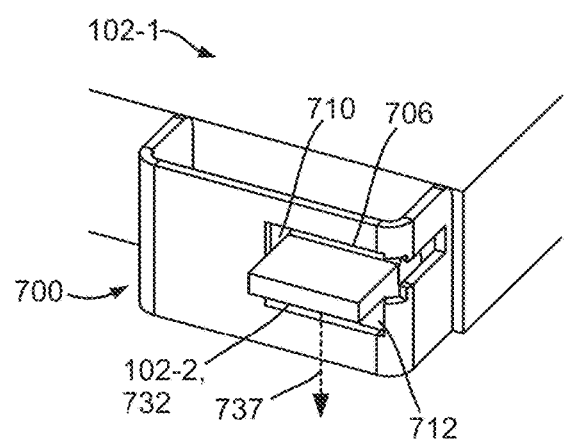

As shown in FIG. 42B, the male locking structure 732 of the second floor tile 102-2 is moved downwardly to position into the locking notch 712 of the first floor tile 102-1 as indicated by the arrow 737. It is noted that the male locking structure 732 of the second floor tile 102-2 would require an upward movement in order to move out of the locking notch 712 of the first floor tile 102-1.

Figure 42C:
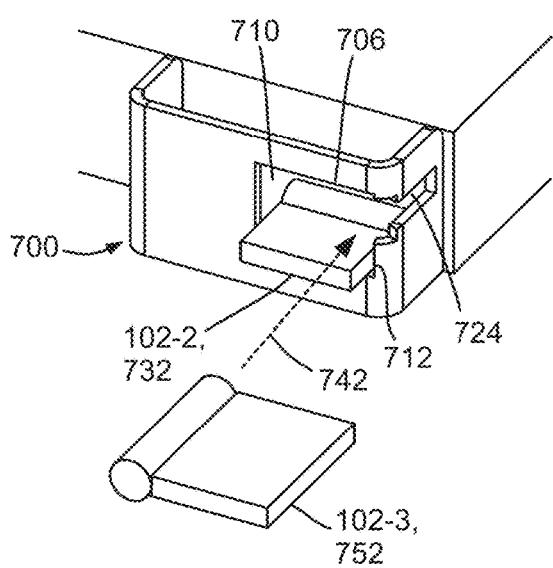

As shown in FIG. 42C, the male securing structure 752 of the third floor tile 102-2 is moved towards the securing receptacle 724 of the first floor tile 102-1 via the receiving groove 710 thereof, as indicated by the arrow 742.

Figure 42D:
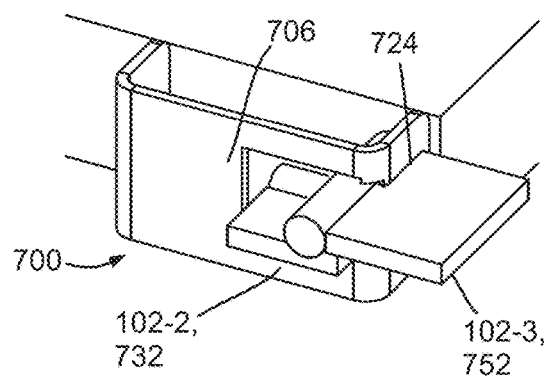

As shown in FIG. 42D, after the male securing structure 752 of the third floor tile 102-2 is received in the securing receptacle 724 of the first floor tile 102-1 and positioned above the male locking structure 732 of the second floor tile 102-2, the male securing structure 752 limits the upward movement of the male locking structure 732 of the second floor tile 102-2 and therefore, preventing the male locking structure 732 of the second floor tile 102-2 from moving out of the locking notch 712 of the first floor tile 102-1.

Figure 43:
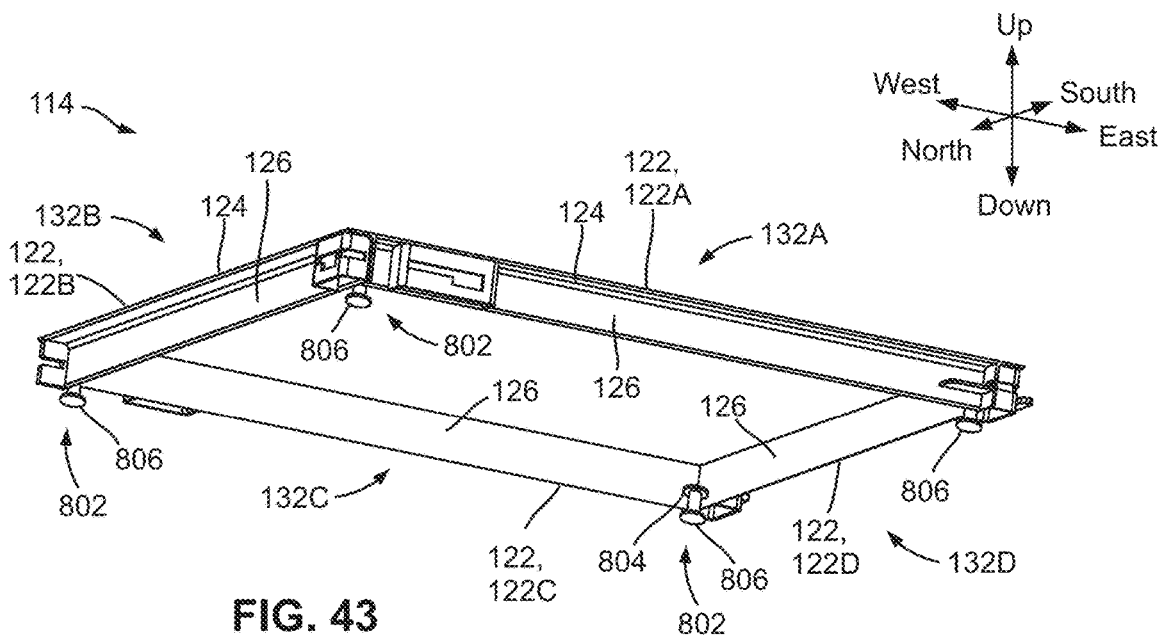
FIG. 43 is a perspective view of the frame structure of the rectangular floor tile shown in FIG. 3, according to some embodiments of this disclosure.

FIG. 43 shows a frame structure 114 in some embodiments. As shown, the frame structure 114 is similar to that shown in FIGS. 4 and 5. However, in these embodiments, the frame structure 114 further comprises a plurality of height-adjustable feet 802 each formed by a nut 804 coupled to a respective inner corner of the frame structure 114 and a threaded bolt 806 engaging with the nut 804. The threaded bolt 806 may be turned to adjust the height of the respective foot for levelling the floor frame 114.

In some embodiments, the frame structure 114 may comprise one or more fixed feet and one or more height-adjustable feet 802 each formed by a nut 804 coupled to a respective inner corner of the frame structure 114 and a threaded bolt 806 engaging with the nut 804.

Figure 44:
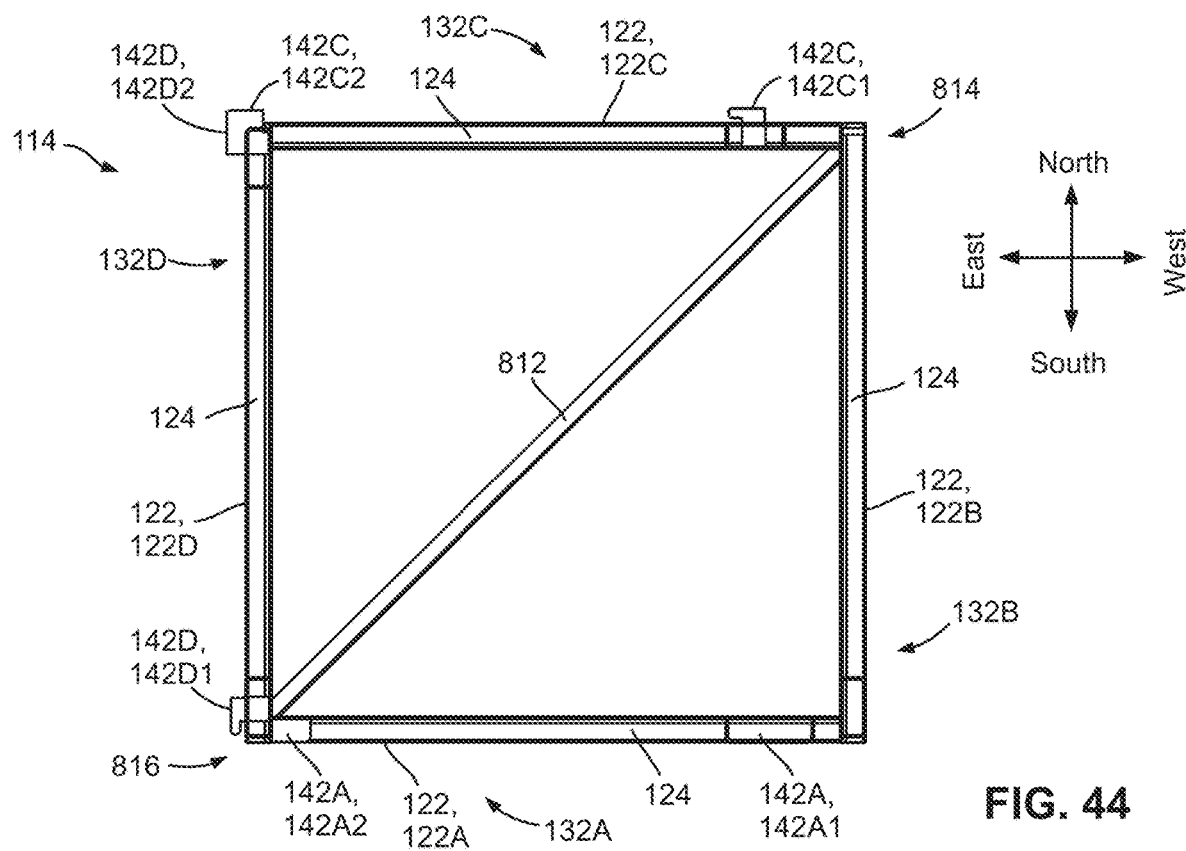
FIG. 44 is a perspective view of the frame structure of the rectangular floor tile shown in FIG. 3, according to some other embodiments of this disclosure.

FIG. 44 is a bottom view of a frame structure 114 in some embodiments. As shown, the frame structure 114 is similar to that shown in FIGS. 4 and 5. However, in these embodiments, the frame structure 114 further comprises a re-bar 812 with an L-shape cross-section coupled to the two diagonal ends 814 and 816 of the frame structure 114 for further reinforcing the strength thereof and resisting deformation. In some embodiments, the a re-bar 812 may also be coupled to the floor panel component 112 thereon using suitable means such as countersunk bolting or screwing, glue, and/or the like, for supporting the floor panel component 112 thereon and for preventing the floor panel component 112 from warping.

Figure 45:
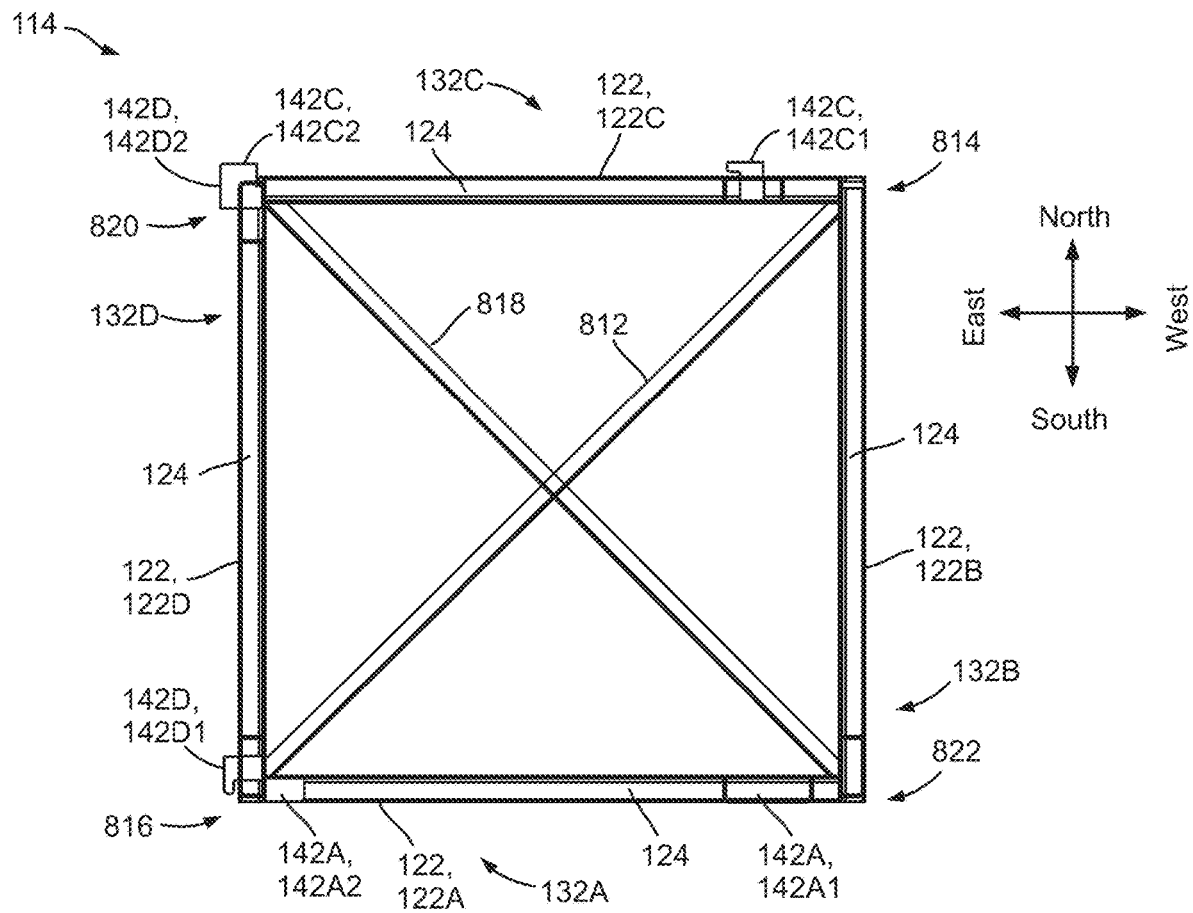
FIG. 45 is a perspective view of the frame structure of the rectangular floor tile shown in FIG. 3, according to yet some other embodiments of this disclosure.

In the embodiments shown in FIG. 45, the frame structure 114 may comprise a pair of re-bars 812 and 818 with an L-shape cross-sections each coupled to a pair of diagonal ends 814/816 and 820/822 of the frame structure 114 for further reinforcing the strength thereof and resisting deformation, and/or for supporting the floor panel component 112 thereon.

Figure 46:
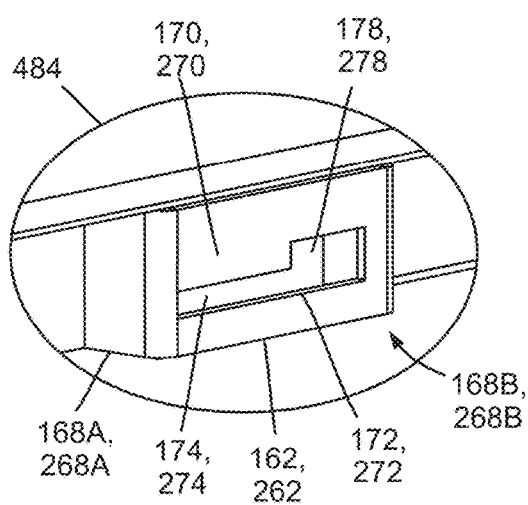
FIG. 46 is a perspective view of a female locking structure, according to yet some other embodiments of this disclosure.
Figure 47A:
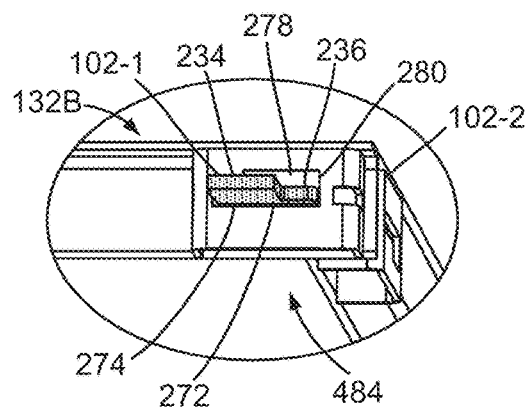
FIGS. 47A to 47D show a process of engaging a hook of a first floor tile with a second floor tile having the female locking structure shown in FIG. 46.
Figure 47B:
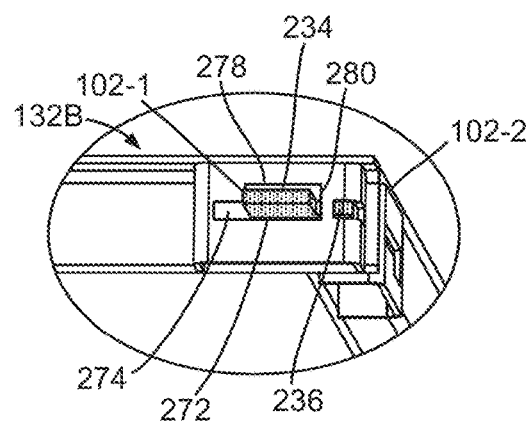
Figure 47C:
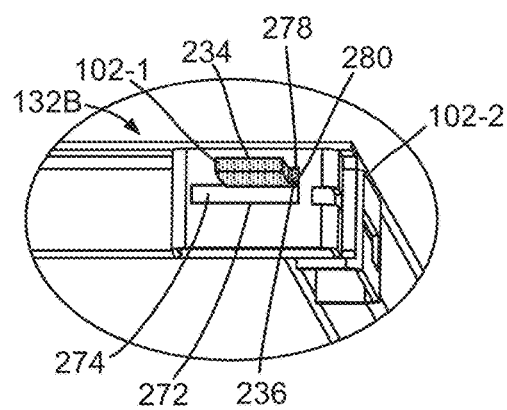
Figure 47D:
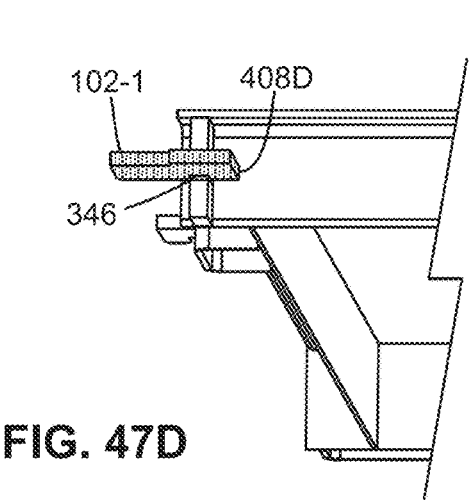
Figure 47D:
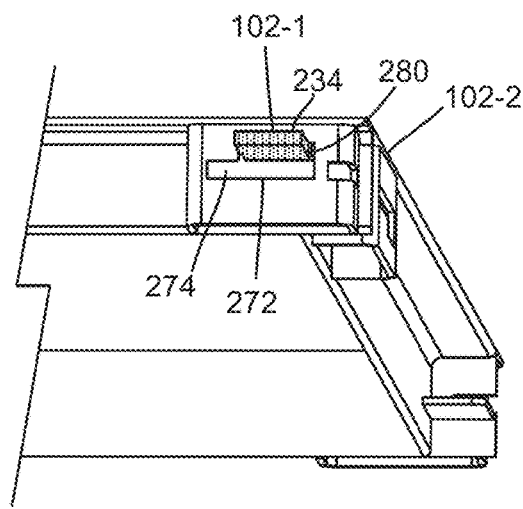

In some embodiments shown in FIG. 46, the locking window or receptacle 172/272 of the female locking structure 484 may comprise a groove or receiving groove 174/274 and a locking notch 178/278 above the receiving groove 174/274.

FIGS. 47A to 47D show a process of engaging a hook of a first floor tile 102-1 with a second floor tile 102-2 having the female locking structure 484 shown in FIG. 46. The process is similar to that shown in FIGS. 28A to 28D, except that the first floor tile 102-1 is laid on to the ground, and then the second floor tile 102-2 is slightly lifted and moves towards the first floor tile 102-1 to receive the hook 234 of the first floor tile 102-1 into the receiving groove 274 of the female locking structure 484 of the second floor tile 102-2. Then, the second floor tile 102-2 is moved downwardly (manually or caused by the gravity) to receive the hook 234 into the locking notch 178. Then, the second floor tile 102-2 is horizontally moved to allow the tip or male locking end 236 of the hook 234 of the first floor tile 102-1 to engage the female locking end 280 of the second floor tile 102-2 while the delimiting tongue 408D of the first floor tile 102-1 also engages the delimiting receptacle 346 of the second floor tile 102-2.

Figure 48A:
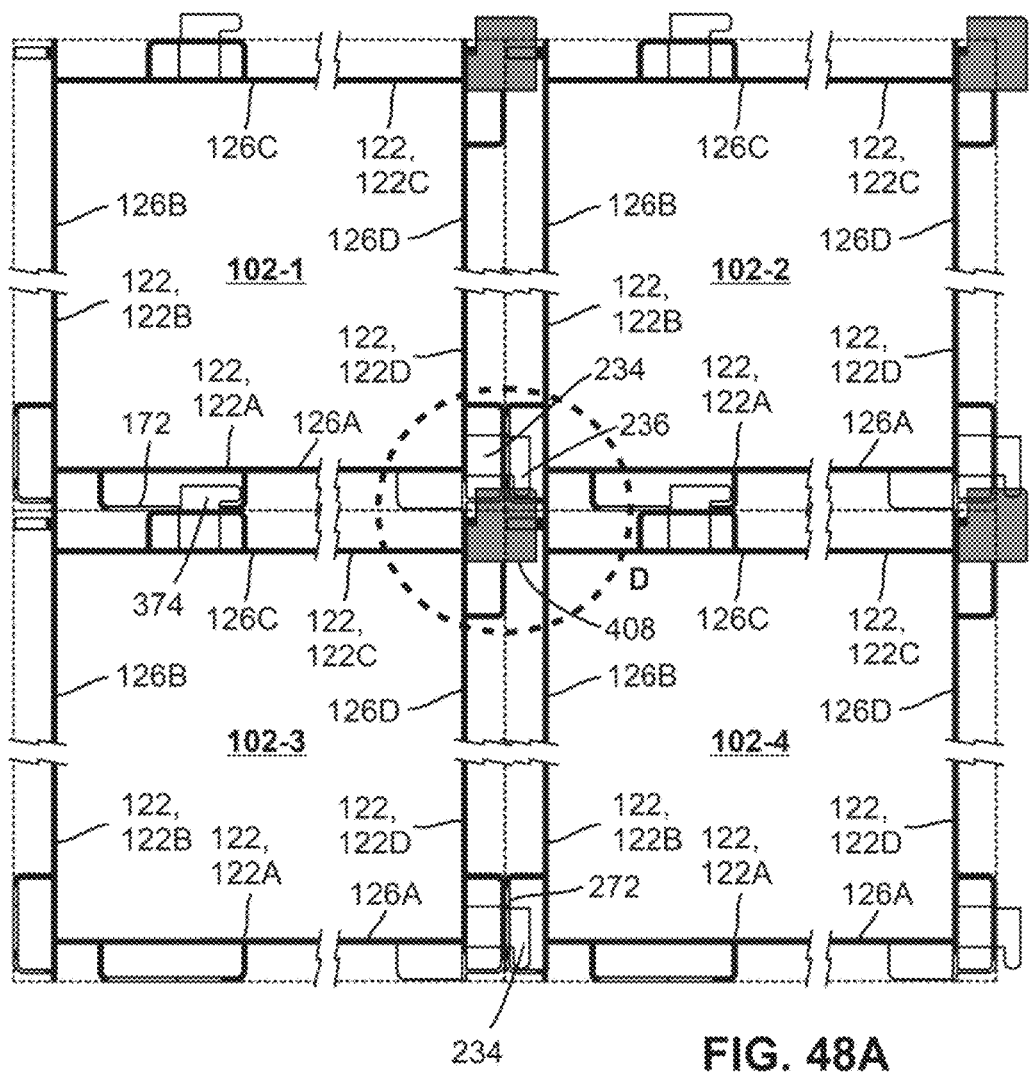
FIG. 48A is a schematic plan view of the assembled floor tiles 102-1 to 102-4, according to some embodiments of this disclosure.
Figure 48B:
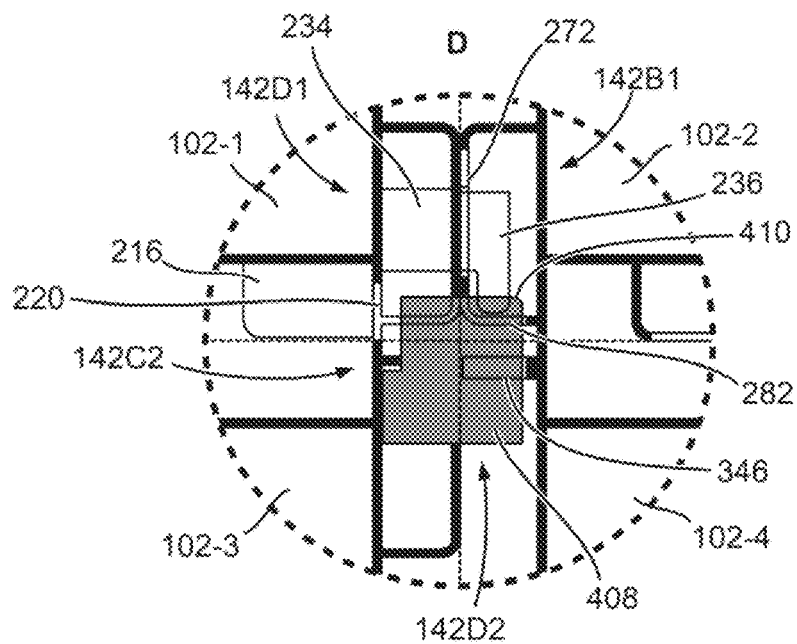
FIG. 48B shows an enlarged portion D of FIG. 48A.

A portion of an assembled floor having four engaged floor tiles 102-1 to 102-4 is shown in FIGS. 48A and 48B, which is similar to that shown in FIGS. 29E and 29F. As shown in FIG. 48B, the securing end 410 of the delimiting plate 408 (of the floor tile 102-3) is inserted through the securing receptacle 282 of the floor tile 102-2 and positioned vertically overlapping (for example, below) the male locking end 236 of the hook 234 of the floor tile 102-1 and thus preventing vertical (for example, downward) movement of the male locking structure 142D1 of the floor tile 102-1 from the locking notch 178 of the locking receptacle 172 of the floor tile 102-1, thereby preventing the male locking end 236 of the male locking structure 142D1 of the floor tile 102-1 vertically moving from the locking notch 278 of the locking receptacle 272 of the floor tile 102-2 into the receiving groove 274 thereof and disengaging with the female locking end 280 of the locking receptacle 272 of the floor tile 102-2.

Although embodiments have been described above with reference to the accompanying drawings, those of skill in the art will appreciate that variations and modifications may be made without departing from the scope thereof as defined by the appended claims.

What is claimed is:

1. A coupling system for coupling a plurality of modular floor tiles together along side edges thereof, each of such modular floor tiles being of a substantially rigid material and substantially non-deformable so as to resist external forces applied to an individual floor tile that might otherwise cause such individual floor tile to deform, each floor tile comprising:
   (i) a rigid and substantially non-deforming male locking structure having a male locking tongue extending outwardly from a first side of a first modular floor tile of the plurality of modular floor tiles; and
   (ii) a rigid and substantially non-deforming female locking structure on a second side thereof, the rigid and substantially-non-deforming female locking structure comprising a locking receptacle, the locking receptacle comprising a horizontal receiving groove, a locking notch therein parallel to and vertically adjacent the horizontal receiving groove and in communication therewith, and a female locking end adjacent the locking notch;
   wherein the male locking tongue of the male locking structure of the first modular floor tile is:
      horizontally insertable into the horizontal receiving groove of the locking receptacle of an adjacent second modular floor tile of the plurality of modular floor tiles; and
      vertically movable from the horizontal receiving groove into the locking notch of the locking receptacle of the adjacent second modular floor tile to engage with the female locking end of the locking receptacle of the adjacent second modular floor tile, thereby
      engaging the male locking structure of the first modular floor tile with the female locking structure of the adjacent second modular floor tile; and
   (iii) means preventing horizontal withdrawal of the male locking tongue from within said locking notch when said male locking tongue of the first modular floor tile has been inserted into the horizontal receiving groove of the locking receptacle of the adjacent second modular floor tile;

wherein the female locking structure comprises a first U-shape bracket having two legs and thereof coupled to the second side of the second modular floor tile; and wherein the locking receptacle of the female locking structure is formed on the first U-shape bracket.

2. The coupling system as claimed in claim 1, wherein the male locking structure comprises a second U-shape bracket and the means preventing horizontal withdrawal of said male locking tongue comprises a male locking end coupled to the locking tongue of the male locking structure;

wherein the second U-shape bracket comprises two legs coupled to the first side of the first modular floor tile;

wherein the locking tongue is coupled to the first side of the first modular floor tile at a position between the two legs of the second U-shape bracket and extends out of a body of the second U-shape bracket such that the second U-shape bracket provides support to the locking tongue; and wherein a distal end of the locking tongue outside the body of the second U-shape bracket forms the male locking end.

3. The coupling system as claimed in claim 1, wherein the male locking structure comprises a hook having a tip, the tip forming the male locking end of the male locking structure for engaging the female locking end of the locking receptacle.

4. The coupling system as claimed in claim 3, wherein the hook is a plate-form hook.

5. The coupling system as claimed in claim 1, wherein the male locking structure and the means preventing horizontal withdrawal of said male locking tongue comprises a locking tongue having a vertically expanded male locking end coupled to a distal end of the locking tongue, the vertically expanded male locking end forming the male locking end of the male locking structure for engaging the female locking end of the locking receptacle.

6. The coupling system as claimed in claim 5, wherein the vertically expanded male locking end of the male locking structure comprises a rod with a diameter or thickness greater than the thickness of the locking tongue and having a circular or chamfered side surface coupled to the locking tongue, thereby forming one or more circular or chamfered shoulders between the locking tongue and the vertically expanded male locking end of the male locking structure.

7. The coupling system as claimed in claim 6, wherein the rod is a cylindrical rod.

8. The coupling system as claimed in claim 1, wherein the male locking tongue comprises a male locking end coupled to the locking tongue at a distal end thereof, and the means preventing horizontal withdrawal of said male locking tongue further comprises:

a male securing structure having a securing end extending outwardly from a corner of a third floor tile of the plurality of modular floor tiles;

wherein, when the male locking end of the male locking structure of the first modular floor tile engages the female locking end of the locking receptacle of the second modular floor tile, the securing end of the male securing structure is insertable to a securing position vertically overlapping the male locking end of the male locking structure of the first modular floor tile and preventing the male locking end of the male locking structure of the first modular floor tile from:

vertically moving from the locking notch of the locking receptacle of the second modular floor tile into the receiving groove of the locking receptacle of the second modular floor tile and from disengaging the male locking structure of the first modular floor tile with the female locking structure modular of the second modular floor tile.

9. The coupling system as claimed in claim 8, wherein the securing end of the male securing structure, when at a securing position, engages the male locking end of the male locking structure of the first modular floor tile.

10. The coupling system as claimed claim 8, further comprising a female securing structure having a securing receptacle on the second side of the second modular floor tile adjacent the female locking structure;

wherein the securing end of the male securing structure is insertable through the securing receptacle to the securing position.

11. The coupling system as claimed in claim 8, wherein the securing position is in the horizontal receiving groove of the locking receptacle of the second modular floor tile.

12. The coupling system as claimed in claim 1, wherein the male locking end of the male locking structure of the first modular floor tile is movable in the locking receptacle of the second modular floor tile between a disengaged position disengaging with the female locking end of the locking receptacle of the second modular floor tile and an engaged position within the locking notch and engaging with the female locking end of the locking receptacle of the second modular floor tile.

13. The coupling system as claimed in claim 1 further comprising:

a first delimiting structure on the first side of the first modular floor tile at a distance to the male locking structure; and a second delimiting structure on the second side of the second modular floor tile at a distance to the female locking structure;

wherein the first and second delimiting structures are respectively a male delimiting structure and a first female delimiting structure, or are the first female delimiting structure and the male delimiting structure;

wherein the male delimiting structure comprises a delimiting tongue;

wherein the first female delimiting structure comprises a delimiting receptacle;

wherein the delimiting tongue of the male delimiting structure is at a disengaged position disengaging with the delimiting receptacle of the first female delimiting structure when the male locking end of the male locking structure is at the disengaged position thereof; and wherein the delimiting tongue of the male delimiting structure is at an engaged position engaging with the delimiting receptacle of the first female delimiting structure when the male locking end of the male locking structure is at the engaged position thereof.

14. The coupling system as claimed in claim 13, wherein the first female delimiting structure further comprises a horizontal guide adjacent the delimiting receptacle for supporting the delimiting tongue of the male delimiting structure when the delimiting tongue of the male delimiting structure is at the disengaged position thereof.

15. The coupling system as claimed in claim 13, wherein the delimiting tongue of the male delimiting structure comprises a male locking end for engaging a corresponding female locking end of the delimiting receptacle of the first female delimiting structure.

16. The coupling system of claim 14, wherein the delimiting tongue of the male delimiting structure comprises a male locking end for engaging a corresponding female locking end of the delimiting receptacle of the first female delimiting structure.

17. The coupling system as claimed in claim 13, further comprising a male securing structure having a securing end extending outwardly from a corner of a third floor tile of the plurality of modular floor tiles;
wherein, when the male locking end of the male locking structure of the first modular floor tile engages the female locking end of the locking receptacle of the second modular floor tile, the securing end of the male securing structure is insertable to a securing position:
(i) vertically overlapping the male locking end of the male locking structure of the first modular floor tile and
(ii) preventing the male locking end of the male locking structure of the first modular floor tile from:
vertically moving from the locking notch of the locking receptacle of the second modular floor tile into the horizontal receiving groove of the locking receptacle of the second modular floor tile and
disengaging the male locking structure of the first modular floor tile with the female locking structure of the second modular floor tile; and
wherein the first female delimiting structure is engaged by the securing end of the male securing structure.

18. The coupling system as claimed in claim 14 further comprising:
a male securing structure having a securing end extending outwardly from a corner of a third floor tile of the plurality of modular floor tiles;
wherein, when the male locking end of the male locking structure of the first modular floor tile engages the female locking end of the locking receptacle of the second modular floor tile,
the securing end of the male securing structure is insertable to a securing position:
vertically overlapping the male locking end of the male locking structure of the first modular floor tile and
preventing the male locking end of the male locking structure of the first modular floor tile from vertically moving from the locking notch of the locking receptacle of the second modular floor tile into the horizontal receiving groove of the locking receptacle of the second modular floor tile and
disengaging the male locking structure of the first modular floor tile with the female locking structure of the second modular floor tile; and
wherein the first female delimiting structure is engaged by the securing end of the male securing structure.

19. The coupling system as claimed in claim 1 further comprising:
a first bolting structure extending outwardly from the first side of the first modular floor tile, the first bolting structure comprising a first bolting hole; and
a second bolting structure extending outwardly from the second side of the second modular floor tile, the second bolting structure comprising a second bolting hole;
wherein the first bolting hole overlaps the second bolting hole for receiving a bolt therethrough when the first side of the first modular floor tile is adjacent the second side of the second modular floor tile and engages therewith.

20. A modular floor tile of a substantially rigid material and substantially non-deformable so as to resist external forces applied thereto that might otherwise cause such floor tile to deform, comprising:
(i) a first side; and
(ii) a second side opposite to the first side;
wherein the first side comprises a first rigid and substantially non-deformable male locking structure, the first rigid and substantially non-deformable male locking structure comprising a male locking end extending outwardly from the first side;
wherein the second side comprises a rigid and substantially non-deformable female locking structure, the female locking structure comprising a locking receptacle; and
wherein the locking receptacle comprises a horizontal receiving groove, a locking notch vertically adjacent the horizontal receiving groove and in communication therewith, and a female locking end adjacent the locking notch, such that the male locking end of the first male locking structure of a first modular floor tile is:
horizontally insertable into the horizontal receiving groove of the locking receptacle of a second modular floor tile, and
vertically movable from the horizontal receiving groove into the locking notch of the locking receptacle of the second modular floor tile to engage with the female locking end of the locking receptacle of the second modular floor tile, thereby
engaging the first male locking structure of the first modular floor tile with the female locking structure of the second modular floor tile and further having
(iii) means preventing horizontal withdrawal of the male locking end from within said locking notch when said male locking end of said first modular floor tile has been moved into the horizontal receiving groove of the locking receptacle of the second one of the modular floor tile;
wherein the female locking structure comprises a first U-shape bracket having two legs thereof coupled to the second side of the second modular floor tile; and
wherein the locking receptacle of the female locking structure is formed on the first U-shape bracket.

21. The modular floor tile as claimed in claim 20, wherein the first male locking structure comprises a second-U-shape bracket and the means preventing horizontal withdrawal of said male locking end comprises a male locking end coupled to a locking tongue of the first male locking structure;
wherein the second-U-shape bracket comprises two legs and coupled to the first side of the first tile;
wherein the locking tongue is coupled to the first side of the first modular floor tile at a position between the two legs and of the second-U-shape bracket and extends out of a body of the second U-shape bracket such that the second-U-shape bracket provides support to the locking tongue; and
wherein a distal end of the locking tongue outside the body of the second-U-shape bracket forms the male locking end.

22. The modular floor tile as claimed in claim 20, wherein the first male locking structure comprises a hook having a tip, the tip forming the male locking end of the first male locking structure for engaging the female locking end of the locking receptacle.

23. The modular floor tile as claimed in claim 22, wherein the hook is a plate-form hook.

24. The modular floor tile as claimed in claim 20, wherein the means preventing horizontal withdrawal of said male locking end comprises a first male locking structure comprises a locking tongue and a vertically expanded male locking end coupled to a distal end of the locking tongue, the vertically expanded male locking end forming the male locking end of the first male locking structure for engaging the female locking end of the locking receptacle.

25. The modular floor tile as claimed in claim 24, wherein the vertically expanded male locking end of the first male locking structure comprises a rod with a diameter or thickness greater than the thickness of the locking tongue and having a circular or chamfered side surface coupled to the locking tongue, thereby forming one or more circular or chamfered shoulders between the locking tongue and the vertically expanded male locking end of the first male locking structure.

26. The modular floor tile as claimed in claim 25, wherein the rod is a cylindrical rod.

27. The modular floor tile as claimed in claim 20, wherein the male locking tongue comprises a male locking end coupled to the locking tongue at a distal end thereof, and the means preventing horizontal withdrawal of said male locking tongue comprises:
 a male securing structure having a securing end extending outwardly from a corner of the first side and a third side extending between the first and second sides thereof such that
 when the male locking end of the first male locking structure of the first one of the modular floor tile engages the female locking end of the locking receptacle of the second modular floor tile,
 the securing end of the male securing structure of a third one of the modular floor tile is insertable to a securing position
  vertically overlapping the male locking end of the first male locking structure of the first one of the modular floor tile and
  preventing the male locking end of the first male locking structure of the first modular floor tile from
   vertically moving from the locking notch of the locking receptacle of the second modular floor tile into the horizontal receiving groove of the locking receptacle of the second modular floor tile and from
   disengaging the first male locking structure of the first modular floor tile with the female locking structure of the second modular floor tile.

28. The modular floor tile as claimed in claim 27, wherein the securing end of the male securing structure, when at the securing position, engages the male locking end of the first male locking structure of the first modular floor tile.

29. The modular tile floor as claimed in claim 27, further comprising a female securing structure having a securing receptacle on the second side adjacent the female locking structure such that
 the securing end of the male securing structure of the third one of the modular floor tile is insertable through the securing receptacle of the second modular floor tile to the securing position.

30. The modular floor tile as claimed in claim 28, further comprising a female securing structure having a securing receptacle on the second side adjacent the female locking structure such that
 the securing end of the male securing structure of the third one of the modular floor tile is insertable through the securing receptacle of the second modular floor tile to the securing position.

31. The modular floor tile as claimed in claim 27, wherein the securing position is in the horizontal receiving groove of the locking receptacle.

32. The modular floor tile as claimed in claim 20, wherein the male locking end of the first male locking structure and the locking receptacle are configured such that
 the male locking end of the first male locking structure of the first one of the modular floor tile is movable in the locking receptacle of the second modular floor tile between a disengaged position disengaging with the female locking end of the locking receptacle of the second modular floor tile and an engaged position within the locking notch engaging with the female locking end of the locking receptacle of the second modular floor tile.

33. The modular floor tile as claimed in claim 20 further comprising:
 a first male delimiting structure on the first side at a distance to the first male locking structure; and
 a first female delimiting structure on the second side at a distance to the female locking structure;
 wherein the first male delimiting structure comprises a delimiting tongue;
 wherein the first female delimiting structure comprises a delimiting receptacle;
 wherein the first male delimiting structure and the first female delimiting structure are configured such that
  the delimiting tongue of the first male delimiting structure of the first one of the modular floor tile is at a disengaged position disengaging with the delimiting receptacle of the first female delimiting structure of the second modular floor tile when the male locking end of the first male locking structure is at the disengaged position thereof; and
  the delimiting tongue of the first male delimiting structure of the first one of the modular floor tile is at an engaged position engaging with the delimiting receptacle of the first female delimiting structure of the second modular floor tile when the male locking end of the first male locking structure is at the engaged position thereof.

34. The modular floor tile as claimed in claim 33 further comprising:
 a male securing structure having a securing end extending outwardly from a corner of the first side and a third side extending between the first and second sides thereof such that
 when the male locking end of the first male locking structure of the first one of the modular floor tile engages the female locking end of the locking receptacle of the second modular floor tile
 the securing end of the male securing structure of a third one of the modular floor tile is insertable to a securing position:
  (i) vertically overlapping the male locking end of the first male locking structure of the first one of the modular floor tile and
  (ii) preventing the male locking end of the first male locking structure of the first one of the modular floor tile from
   vertically moving from the locking notch of the locking receptacle of the second modular floor tile into the horizontal receiving groove of the locking receptacle of the second modular floor tile and disengaging the first male locking structure of the first modular floor tile with the female locking structure of the second modular floor tile; and further comprising:
a second male locking structure on the third side at a distance to the first male delimiting structure; and
a second female locking structure on a fourth side opposite to the third side and at a distance to the first male locking structure such that
the second male locking structure of the first one of the modular floor tile and the second female locking structure of the third one of the modular floor tile are engageable for engaging the first one of the modular floor tile with the third one of the modular floor tile.

35. The modular floor tile as claimed in claim 34 further comprising:
a second male delimiting structure on the third side adjacent the first male delimiting structure, the second male delimiting structure comprising a delimiting tongue; and
a second female delimiting structure on the fourth side adjacent the first male locking structure such that
the second male delimiting structure of the first one of the modular floor tile and the second female delimiting structure of the third one of the modular floor tile are engageable for vertically aligning the first one of the modular floor tile with the third one of the modular floor tile.

36. The modular floor tile as claimed in claim 35, wherein the second female delimiting structure further comprises a horizontal guide adjacent the delimiting receptacle such that
the horizontal guide of the first one of the modular floor tile provides support to the delimiting tongue of the second male delimiting structure of the third one of the modular floor tile when the delimiting tongue of the second male delimiting structure of the third one of the modular floor tile is at a disengaged position.

37. The modular floor tile as claimed in claim 33, wherein the delimiting tongue of the first male delimiting structure comprises a male locking end, and the delimiting receptacle of the first female delimiting structure comprises a corresponding female locking end, such that
the male locking end of the delimiting tongue of the first male delimiting structure of the first one of the modular floor tile is engageable with the corresponding female locking end of the delimiting receptacle of the first female delimiting structure of the second modular floor tile.

38. The modular floor tile as claimed in claim 33, wherein the first female delimiting structure comprises the securing end of the male securing structure.

39. The modular floor tile as claimed in claim 20 further comprising:
a first bolting structure extending outwardly from the first side, the first bolting structure comprising a first bolting hole; and
a second bolting structure extending outwardly from the second side, the second bolting structure comprising a second bolting hole, such that
the first bolting hole of the first one of the modular floor tile overlaps the second bolting hole of the second modular floor tile for receiving a bolt therethrough when the first side of the first one of the modular floor tile is adjacent the second side of the second modular floor tile and engages therewith.

* * * * *